United States Patent
Mori et al.

[11] Patent Number: 5,999,548
[45] Date of Patent: Dec. 7, 1999

[54] WHITE OPTICAL PULSE SOURCE AND APPLICATIONS

[75] Inventors: Kunihiko Mori; Hidehiko Takara; Satoki Kawanishi; Masatoshi Saruwatari, all of Tokyo, Japan

[73] Assignee: Nippon Telegraph and Telephone Corporation, Japan

[21] Appl. No.: 09/098,323

[22] Filed: Jun. 16, 1998

[30] Foreign Application Priority Data

| Jun. 18, 1997 | [JP] | Japan | 9-161603 |
| Oct. 7, 1997 | [JP] | Japan | 9-274593 |
| Mar. 27, 1998 | [JP] | Japan | 10-081176 |
| Mar. 27, 1998 | [JP] | Japan | 10-081177 |

[51] Int. Cl.$^6$ ............................................. H01S 3/10
[52] U.S. Cl. ..................... 372/22; 372/64; 372/18; 372/26; 372/20; 372/27; 372/29; 372/3; 372/6; 372/703
[58] Field of Search ..................... 372/6, 18, 3, 64, 372/26, 20, 27, 29, 703

[56] References Cited

FOREIGN PATENT DOCUMENTS 8-234249  9/1996  Japan.

OTHER PUBLICATIONS

Baldeck et al., "Intensity Effects on the Stimulated Four Photon Spectra Generated by Picosecond Pulses in Optical Fibers," Journal of Lightwave Technology, vol. LT–5, No. 12, pp. 1712–1715, Dec. 1987.

Beaud et al., "Ultrashort Pulse Propagation, Pulse Breakup, and Fundamental Soliton Formation in a Single–Mode Optical Fiber, " IEEE Journal of Quantum Electronics, vol. QE–23, No. 11, pp. 1938–1987, Nov. 1987.

Calvani et al., "Femtosecond Pulses from Filtered Supercontinuum in a Fiber Pumped by a Chirp Compensated Gain–Switched DFB Laser," IOOC'95, vol. 3, Jun. 29, 1995.

Chernikov et et al., "Supercontinuum Self–Q–Switched Ytterbium Fiber Laser," Optical Letters, vol. 22, No. 5, pp. 298–300, Mar. 1, 1997.

Cohen et al., "Low–Loss Quadruple–Clad Single–Mode Lightguides with Dispersion Below 2 ps/km nm Over the 1.28 μm–1.65 μm Wavelength Range," Electronics Letters., vol. 18, pp. 1023–1024, Nov. 25, 1982.

Futami et al., "Supercontinuum Generation in Positive Group–Velocity Dispersion Fibers," '98 General Conference of IEICE, C–4–56, p. 430, Mar. 1998.

Gabriagues et al., "Non Linear Effects for Light Generation and Amplification in Optical Fibers," SPIE Fiber Laser Sources and Amplifiers, vol. 1171, pp. 43–51, 1989.

(List continued on next page.)

*Primary Examiner*—Leon Scott, Jr.
*Attorney, Agent, or Firm*—Pennie & Edmonds LLP

[57] ABSTRACT

The present invention relates to a white pulse source that produces spectrally shaped white pulses of a constant optical output power over a wide wavelength range. The white pulse source includes a pump pulse source for generating pump pulses with a center wavelength $\lambda 0$ and a waveguided nonlinear optical medium with a length L. The waveguided nonlinear optical medium is characterized by two properties: the first property is that chromatic dispersion $D(\lambda 0, z)$ at the center wavelength of pump pulses in ps/nm/km is positive at an input end of said waveguided nonlinear optical medium, where z=0, and decreases towards an output end. The second property is that said chromatic dispersion $D(\lambda, z)$ has a maximum value $D(\lambda p(z), z)$ at a peak wavelength $\lambda p(z)$ within a range of propagation distance given by $L1 \leq z \leq L$ where $0 \leq L1 < L$, and that said chromatic dispersion $D(\lambda, z)$ has two zero-dispersion wavelengths, $\lambda 1(z)$ and $\lambda 2(z)$, where $D(\lambda 1(z), z) = D(\lambda 2(z), z) = 0$ ps/nm/km, within a range of propagation distance z where $D(\lambda p(z), z)$ shows a positive value.

61 Claims, 38 Drawing Sheets

OTHER PUBLICATIONS

Islam et al., "Broad Bandwidths from Frequency–Shifting Solitons in Fibers," Optics Letters, vol. 14, No. 7, pp. 370–372, Apr. 1989.

Kawakami et al., "Optical Fiber and Fiber Device," Baifuu–Kan, 1996.

Kawanishi et al., "1.4 Tbit/s (200 Gbit/s X 7 ch), 50 km OTDM–WDM Transmission Experiment," 2nd Optoelectronics & Communications Conference (OECC '97) Technical Digest, PDP2–2, pp. Jul. 14–15, 1997.

Korogi et al., "50 THz Optical Frequency Comb Generator (Spectral Expansion of Optical Frequency Comb by Self–Phase Modulation)," the 1997 Science Forum of Kanagawa Academy of Science and Technology, Mar. 1997.

Lou et al., "Broader and Flatter Supercontinuum Spectra in Dispersion–Tailored Fibers," OCF (Optical Fiber Communication) '97 Technical Digest, pp. 32–34, Feb. 1997.

Manassah, J.T., "Induced Supercontinuum and Steepening of an Ultrafast Laser Pulse," Physics Letters, vol. 113A, No. 5, pp. 242–247, Dec. 23, 1985.

Mori et al., "Supercontinuum Generating Near Zero Dispersion in Optical Fibers (Pico–second Pulse Generation over Wide Spectral Range)," '92 Fall Conference of IEICE (The Institute of Electronics, Information and Communication Engineers), C–255, 1992.

Mori et al., "More–than–100–Nanometer–Range Ultra–Shot Pulse Generation Using Supercontinuum in an Optical Fiber Pumped by Amplified LD Pulses," '93 Fall Conference of IEICE (The Institute of Electronics, Information and Communication Engineers), B–290, 1993.

Mori et al., "Group Velocity Dispersion Measurement Using Supercontinuum Picosecond Pulses Generated in an Optical Fibre," Electronics Letters, vol. 29, No. 11, pp. 287–988, May 27, 1993.

Mori et al., "Continuously Tunable Optical Pulse Generations Utilizing Supercontinuum in an Optical Fiber Pumped by an Amplified Gain–Switched LD Pulses," OAA (Optical Amplifiers and their Applications) '93, pp. 190–193, 1993.

Mori et al., "Dispersion Measurement Using Supercontinuum Generated in an Optical Fiber," '94 Spring Conference of IEICE, 1994.

Mori et al., "1.4–1.7 μm, <2ps White Pulse Generation for Multiwavelength Pulse Source Using Supercontinuum in a Single–Mode Optical Fiber," CPEM (Conference on Precision Electromagnetic Measurements) '94, pp. 497–498, 1994.

Mori et al., "Ultrawide Spectral Range Group–Velocity Dispersion Measurement Utilizing Supercontinuum in an Optical Fiber Pumped by a 1.5 μm Compact Laser Source," IEEE Transactions on Instrumentation and Measurement, vol. 44, No. 3, pp. 712–715, Jun. 1995.

Mori et al., "Flatly Broadened Supercontinuum Spectrum Generated in a Dispersion Decreasing Fibre with Convex Dispersion Profile," Electronics Letters, vol. 33, No. 21, pp. 1806–1807, Oct. 8, 1997.

Mori et al., "Mechanism of Supercontinuum Generation in a Singlemode Optical Fiber," Technical Report of IEICE, pp. 55–59, Nov. 1997.

Mori et al., "The Effect of Pump Fluctuation in Supercontinuum Pulse Generation," Nonlinear Guided Waves & Their Applications '98, pp. 276–278, Mar. 1998.

Mori et al., "Ultra–wide Spectral Range Group Velocity Dispersion Measurement of Single–Mode Fibers Using LD–Pumped Supercontinuum in an Optical Fiber," IEEE, IMTC '94, THAM 9–4, pp. 1036–1039, May 10–12, 1994.

Morioka et al., "More Than 100–Wavelength–Channel Picosecond Optical Pulse Generation From Single Laser Source Using Supercontinuum in Optical Fibres," Electronics Letters, vol. 29, No. 10, pp. 862–863, May 13, 1993.

Morioka et al., "Multi–WDM–Channel, Gbit/s Pulse Generation from a Single Laser Source Utilizing LD–Pumped Supercontinuum in Optical Fibers," IEEE Photonics Technology Letters, vol. 6, No. 3, pp. 365–368, Mar. 1994.

Morioka et al., "Nearly Penalty–Free, <4ps Supercontinuum Gbit/s Pulse Generation Over 1535–1560nm," Electronics Letters, vol. 30, No. 10, pp. 790–791, May 12, 1994.

Morioka et al., "Transform–limited, Femtosecond WDM Pulse Generation by Spectral Filtering of Gigahertz Supercontinuum," Electronics Letters, vol. 30, No. 14, pp. 1166–1167, Jul. 7, 1994.

Morioka et al., "Penalty–Free, 100 Gbit/s Optical Transmission of < 2ps Supercontinuum Transform–Limited Pulses Over 40 km," Electronics Letters, vol. 31, No. 2, pp. 124–125, Jan. 19, 1995.

Morioka et al., "Multiwavelength Picosecond Pulse Source with Low Jitter and High Optical Frequency Stability Based on 200nm Supercontinuum Filtering," Electronics Letters, vol. 31, No. 13, pp. 1064–1065, Jun. 22, 1995.

Morioka et al., "Ultra–low Jitter, Multi–wavelength GHz Pulse Source with High Optical Frequency Stability Based on 200 nm Supercontinuum Filtering," NLGW (Nonlinear Guided Waves and their Applications), 1995.

Morioka et al., "100Gbits/s X 4ch, 100km Repeateries TDM–WDM Transmission Using a Single supercontinuum Source," Electronics Letters, vol. 32, No. 5, pp. 486–469, Feb. 29, 1996.

Morioka et al., "1Tbit/s (100Gbit/s X 10 Channel) OTDM/WDM Transmission Using a Single Supercontinuum WDM Source," Electronics Letters, vol. 32, No. 10, pp. 906–907, May 9, 1996.

Morioka et al., Supercontinuum Lightwave Optical Sources for Large Capacity Transmission, European Conference on Optical Communication, Th.A.1.2, pp. 821–828, Sep. 1998.

Nakawaza et al., "Continuum Spectrum Generation in a Multimode Fiber Using Two Pump Beams at 1.3 μm Wavelength Region," Japanese Journal of Applied Physics, vol. 22, No. 4, pp. L239–L241, Apr. 1983.

Nakawaza et al., "Measurement of the Fiber Loss Spectrum Using Fiber Raman Optical–Time–Domain Reflectometry," Applied Optics, vol. 22, No. 12, Jun. 15, 1983.

Nakazawa et al., "Coherence Degradation in the Process of Supercontinuum Generation in an Optical Fiber," '98 General Conference of IEICE, C–4–57, p. 431, Mar. 1998.

Nisioka et al., "Ultra–Broad–Band Coherent Light: Generation and Applications," 17th Annual Meeting of the Laser Society of Japan, pp. 80–83, Jan. 1997.

Okuno et al., "Study of Optical Fibers for Generating Supercontinuum," Technical Report of IEICE on Optical Fiber Applications, Jul. 1996.

Okuno et al., "Study on Optical Fibers Suitable for Generating Supercontinuum Pulses with High Efficiency," ACOFT (Australian Conference on Optical Fiber Technology) '96, pp. 121–124, 1996.

Okuno et al., "Study on Optimum Designs of Optical Fiber for Generating Supercontinuum Pulses," 17th Annual Meeting of the Laser Society of Japan, p. 247, Jan. 1997.

Okuno et al., "Study about Optical Fibers for Generating Supercontinuum Pulses with High Efficiency," '97 General Conference of IEICE, SB–13–6, pp. 851–852, Mar. 1997.

Okuno et al., The Optical Fiber for Generating Supercontinuum Pulses with Ultra–broad Bandwidth, The 1997 Communications Society Conference of IEICE, p. 251, Sep. 1997.

Okuno et al., "Dispersion–Flattened and Decreasing Fiber for Ultra–Broadband Supercontinuum Generation," ECOC, No. 448, pp. 77–80, Sep. 22–25, 1997.

Okuno et al., "Highly Nonlinear Dispersion Shifted Fiber and Its Application to Wavelength Conversion," The Institute of Electronics, Information and Communication Engineers, Technical Report of IEICE OCS97–89 (1997–11), pp. 25–30, Nov. 1997.

Okuno et al., "Generation of Ultra–Broad–Band Supercontinuum by Dispersion–Flattened and Decreasing Fiber," IEEE Photonics Technology Letters, vol. 10 No. 1, Jan. 1998.

Sasaki et al. "UV Light Generation by Multi–Channel Self–Trapping in Solid State Media," 17th Annual Meeting of the Laser Society of Japan, p. 91, Jan. 1997.

Sone et al., "Analysis of Supercontinuum Generation and Pulse Compression Effects in a Singlemode Optical Fiber with Decreasing Group Velocity Characteristics," '98 General Conference of IEICE, C–4–54, p. 428, Mar. 1998.

Sotobayashi et al., "Supercontinuum Generation Using Dispersion–Flattened Normal Dispersion Fiber Along with Pulse Compression Technique," '98 General Conference of IEICE, C–4–55, p. 429, Mar. 1998.

Takushima et al., "Analysis of Super–Continuum Generation in Positive Group–Velocity Dispersion Fibers," The 1997 Communication Society Conference of IEICE, C–4–4. Sep. 1997.

Tamura et al., "Generation of 10 GHz Pulse Trains at 16 Wavelengths by Spectrally Slicing a High Power Femtosecond Source," Electronics Letters, vol. 32, No. 18, Aug. 29, 1996.

Tateno et al., "Ultra–Broad–Band Spectroscopy Using Coherent White Light," 17th Annual Meeting of the Laser Society of Japan, p. 84, Jan. 1997.

Vodop'yanov et al., "Generation of Pulses of 100–200 Fsec Duration by Stimulated Raman Scattering in a Single–Mode Fiber Waveguide at Wavelengths 1.5–1.7 $\mu$". Sov. J. Quantum Electron, pp. 1311–1313, Oct. 17 (10), 1987.

Yanovsky et al., Nonlinear Propagation of High–Power, Sub–100–fs Pulses Near the Zero–Dispersion Wavelength of an Optical Fiber, Optics Letters, vol. 19, No. 19, pp. 1547–1549, Oct. 1, 1994.

Mori et al,"1.4–1.7 m,<2ps White pulse generation for Multiwavelength pulse souirce using Supercontinium in a singl e mde Optical Fiber"; NTT Transmission Systems Laboratories,pp. 497–498.

More et al;"Ultrawide Spectral Range Group–Velocity Dispersion Measurement Utilizing Supercontinioum in an Optical Fiber Pumped by a 1,5 m Compact Laser Source"; IEEETransactions on Instrumentation and Measurement, vol. 44,No. 3, Jun.

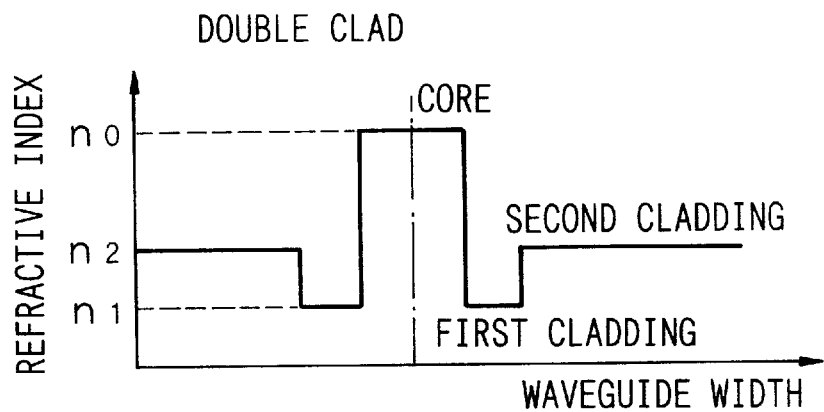
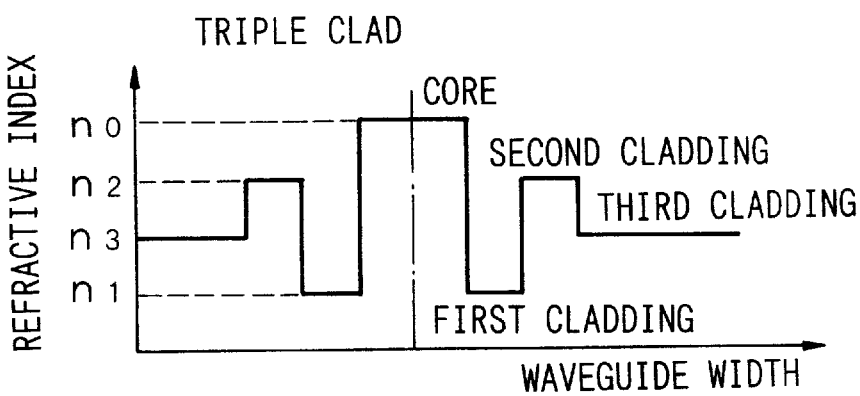
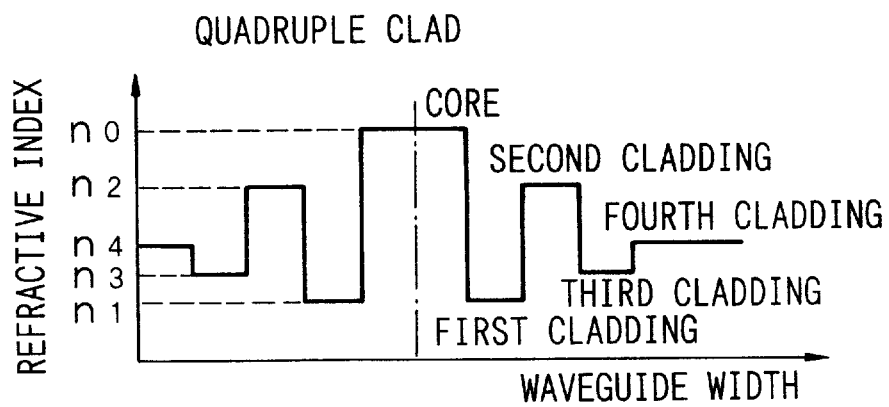

PUMP PULSES

NOISE COEFFICIENT, −13dB

NOISE COEFFICIENT, 35dB

100
WHITE OPTICAL PULSE SOURCE AND APPLICATIONS

BACKGROUND OF THE INVENTION

1. Field of the Invention

The present invention relates to a white optical pulse source produced by injecting pump pulses into a waveguided nonlinear optical medium to generate white pulses having a flatly broadened spectrum, and applications of the white pulse source to other optical devices.

This application is based on patent application Nos. Hei 9-161603, Hei 9-274593, Hei 10-81176 and Hei 10-81177 filed in Japan, the contents of which are incorporated herein by reference.

2. Description of the Related Art

As shown in FIG. 23, an optical pulse source is comprise by an optical pump pulse source and a waveguided nonlinear optical medium. A pump pulse propagating in the waveguided nonlinear optical medium induces a third order nonlinear optical effect and generates white pulse of a broad bandwidth. The propagation distance from the input end of the waveguided nonlinear optical medium is designated by z such that at the input end z=0 and at the output end z=L.

A reference 1 (a Japanese Patent Application, First Publication, Hei 8-234249, "Coherent white pulse source") disclosed a white pulse source using a single-mode optical fiber as the nonlinear optical medium, and reported a production of white pulses having an excellent spectral flatness over a wide range of wavelengths as illustrated in FIG. 24. Based on a supposition that such white pulses were produced because of the choice of a low dispersion slope of the waveguided nonlinear optical medium, values of the dispersion slope which is defined as the first derivative of chromatic dispersion with respect to wavelength and magnitudes of dispersion are specified. FIG. 24 shows the spectrum of the pump pulse also.

The reference 1 also disclosed that the bandwidth of the white pulse increases by using a waveguided nonlinear optical medium whose chromatic dispersion decreased with propagation distance z.

This effect is also shown in reference 2 (Okuno et. al., "Study about optical fibers for generating supercontinuum pulses with high efficiency", National Convention Record-The Institute of Electronics Information and Communication Engineers, SB-13-6, 1997). As is shown in FIG. 25, by altering the chromatic dispersion at the center wavelength of the pump pulses $\lambda 0$ from positive at the input end (z=0) to negative at the output end (z=L), while suppressing the dispersion slope to be low, broadband white pulses are generated. The spectrum of the white pulse produced by the white pulse source in reference 2 is shown in FIG. 26.

In reference 3 (Tamura et. al., "Generation of 10 GHz pulse trains at 16 wavelengths by spectrally slicing a high power femtosecond source", Electronics Letters, vol. 32, no. 18, pp. 1691–1693, 1996), white pulses are generated by a device to pump a waveguided nonlinear optical medium with optical gain (rare-earth doped optical fiber). This device is able to generate white pulses even when the power of pump pulses is low or the length of the waveguided nonlinear optical medium is short.

Here, it should be reminded that, for communication or instrumentation purpose, it is necessary to be able to reproduce white pulses that are not only broadband but remain flat, i.e., a constant optical power output over a wide range of wavelengths.

The conventional techniques disclosed in references 1 and 2 specify only the first order term (dispersion slope) in the chromatic dispersion to wavelengths in the waveguided nonlinear optical medium. In reference 3, the results are associated mostly with doping effects in the waveguided nonlinear optical medium, and the manner of chromatic dispersion reduction is only minimally specified. Therefore, at the present time, a white pulse such as the one illustrated by the spectral curve in FIG. 24 that satisfy both requirements of wide band-width and spectral flattening have not been reproduced in practice.

Further, conventional white optical pulse sources have not been able to generate white pulses having low noise over a wide spectral range, because of the lack of knowledge regarding the mechanism of noise in white pulse generation process.

Further, because it has not been possible to generate low-noise white pulses, a pulse source that combines a white pulse source with a wavelength filter to produce low-noise optical pulses could not be realized also.

SUMMARY OF THE INVENTION

It is an object of the present invention to provide a white pulse source to produce white pulses having a equalized spectrum over a wide spectral range based on the mechanism of white pulse generation.

The object has been achieved in a white pulse source comprised by a pump pulse source for generating optical pump pulses having a center wavelength $\lambda 0$ and a waveguided nonlinear optical medium with a length of L, wherein the waveguided nonlinear optical medium is characterized by two properties: a first property being that chromatic dispersion $D(\lambda 0, z)$ at the wavelength of pump pulses $\lambda 0$ in ps/nm/km is positive at an input end of the waveguided nonlinear optical medium, where z=0, and decreases towards an output; and a second property being that there are two zero-dispersion wavelengths $\lambda 1(z)$ and $\lambda 2(z)$, where $D(\lambda 1(z), z) = D(\lambda 2(z), z) = 0$, within a range of propagation distance given by $L1 \leq z \leq L$, where $0 \leq L1 < L$, that chromatic dispersion $D(\lambda, z)$ has a local maximum $D(\lambda p(z), z)$ at a peak wavelength $\lambda p(z)$ and that the local maximum $D(\lambda p(z), z)$ has positive values.

White pulses generate via a two stage process: a spectral broadening stage caused by adiabatic soliton compression; and a rectangular-shape forming stage caused by soliton changing into dispersive waves. The result is a generation of a white pulse spectrum showing flatness over a wide range of wavelength.

Another object of the present invention is to provide a stable-output white pulse source to generate white pulses having stable output power and low noise characteristics.

The object has been achieved in a white pulse source, having a pump pulse generating section for producing pump pulses and a waveguided nonlinear optical medium for generating white pulses by being injected with the pump pulses, comprising a power stabilization section for controlling the optical power of pump pulses to be input into the waveguided nonlinear optical medium by reducing a noise component according to a relation of pump pulse power to noise coefficients generated in the course of a white pulse generation.

Accordingly, the white pulse source of the present invention has been applied to produce white pulses having low noise and stable output power.

Another object is to provide a low-noise optical pulse source to produce optical pulses having extremely low noise using the white pulse source of the present invention.

The object has been achieved in an optical pulse source, having a pump pulse generating section for producing pump pulses, a waveguided nonlinear optical medium for generating white pulses by being injected with the pump pulses, and a wavelength filter for filtering the white pulses to produce an optical pulse having a specific wavelength, the optical pulse source comprising a noise reducing section for controlling the optical power of pump pulses to be input into the waveguided nonlinear optical medium by reducing a noise component in the specific wavelength according to a relation of pump pulse power to noise coefficients generated in the course of a white pulse generation.

Accordingly, it is possible to generate low noise optical pulses that are not affected by power fluctuations contained in the pump pulse.

BRIEF DESCRIPTION OF THE DRAWINGS

FIGS. 2A~2C are graphs showing a refractive index profiles of the waveguided nonlinear optical medium.

DESCRIPTION OF THE PREFERRED EMBODIMENTS

Figure 1:
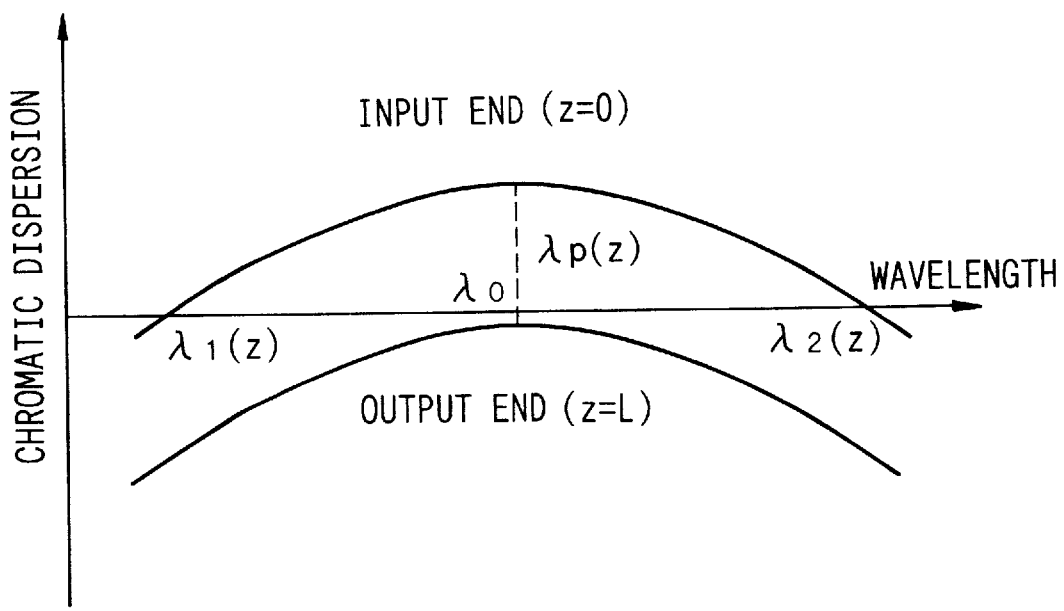
FIG. 1 is a graph showing the first chromatic dispersion characteristic of a waveguided nonlinear optical medium with respect to wavelength for use in a equalized-output white optical pulse source.

In the following, the white pulse source for generating white pulses by inputting pump pluses into the waveguided nonlinear optical medium will be presented under the following three sections dealing with white pulse sources of respective properties as defined below:

Section 1: equalized-output white pulse sources for generating white pulses with flatly broadened spectrum over a wide range of wavelength;

Section 2: stable-output white pulse sources for generating white pulses of highly stable output power and low-noise characteristics; and Section 3: low-noise white pulse sources for generating low-noise optical pulses of extremely low noise from white pulses by the white pulse generation.

Section 1 Equalized-output White Pulse Sources and Evolution of White Pulses

First, some features of the white pulse sources in this section will be explained.

The white pulse sources in this section are comprised by a pump pulse source for generating pump pulses having a center wavelength $\lambda 0$, and the waveguided nonlinear optical medium (shortened to optical medium hereinbelow) having a length of L for generating white pulses by being injected with the pump pulses.

Chromatic dispersion $D(\lambda 0, z)$, in units of ps/nm/km, at the center wavelength $\lambda 0$ of the pump pulses in the optical medium at the input end (z=0) is positive and decreases in the propagation direction of the pump pulses.

Further, within the propagation distance z of the pump pulses, where $L1 \leq z \leq L$ and $0 \leq L1 < L$, the chromatic dispersion $D(\lambda, z)$ has a maximum value of $D(\lambda p(z), z)$ at a peak wavelength $\lambda p(z)$, and within a range of propagation distance z where $D(\lambda p(z), z)$ are positive, chromatic dispersion is zero (ps/nm/km) at two wavelengths $\lambda 1(z)$ and $\lambda 2(z)$.

Next, generation and evolution of the white pulses in the white pulse source will be explained.

A white pulse evolves through a two-stage process: a spectral broadening stage due to adiabatic soliton compression and a stage of rectangular shaping and output power flattening caused by solitons changing into dispersive waves.

A pump pulse injected into the optical medium undergoes spectral broadening in the stage of adiabatic soliton compression within the propagation distance z where the chromatic dispersion $D(\lambda 0, z)$ of the optical medium is positive (anomalous dispersion) at the center wavelength $\lambda 0$. As the chromatic dispersion $D(\lambda 0, z)$ of the optical medium decreases with propagation distance z, and as the two zero-dispersion wavelengths, $\lambda 1(z)$ and $\lambda 2(z)$, approach the center wavelength $\lambda 0$ of the pump pulse, although the both edges of the spectrum of the pulse being compressed enter into the negative (normal dispersion) dispersion region, the pulse being compressed as a whole retains soliton characteristics during spectral broadening stage.

Further, as the chromatic dispersion $D(\lambda 0, z)$ decreases with increasing propagation distance z, soliton characteristics begin to be lost from the both edges of the spectrum towards the pump wavelength $\lambda 0$ and the pulse being compressed make transition from soliton pulse to a dispersive wave. Accordingly, the spectrum stops broadening at the breakdown points where the both edges of the spectrum begins to change to a dispersive wave. On the other hand, in the regions close to the pump wavelength $\lambda 0$ where the chromatic dispersion is still positive (anomalous dispersion), the spectrum still continues to broaden so that optical energy accumulates at the breakdown points to evolve into a rectangular spectral shape. As the two zero-dispersion wavelengths approach the pump wavelength $\lambda 0$, the both break down wavelengths also come near to the pump wavelength $\lambda 0$ to result in a flattened spectrum.

Figure 6:
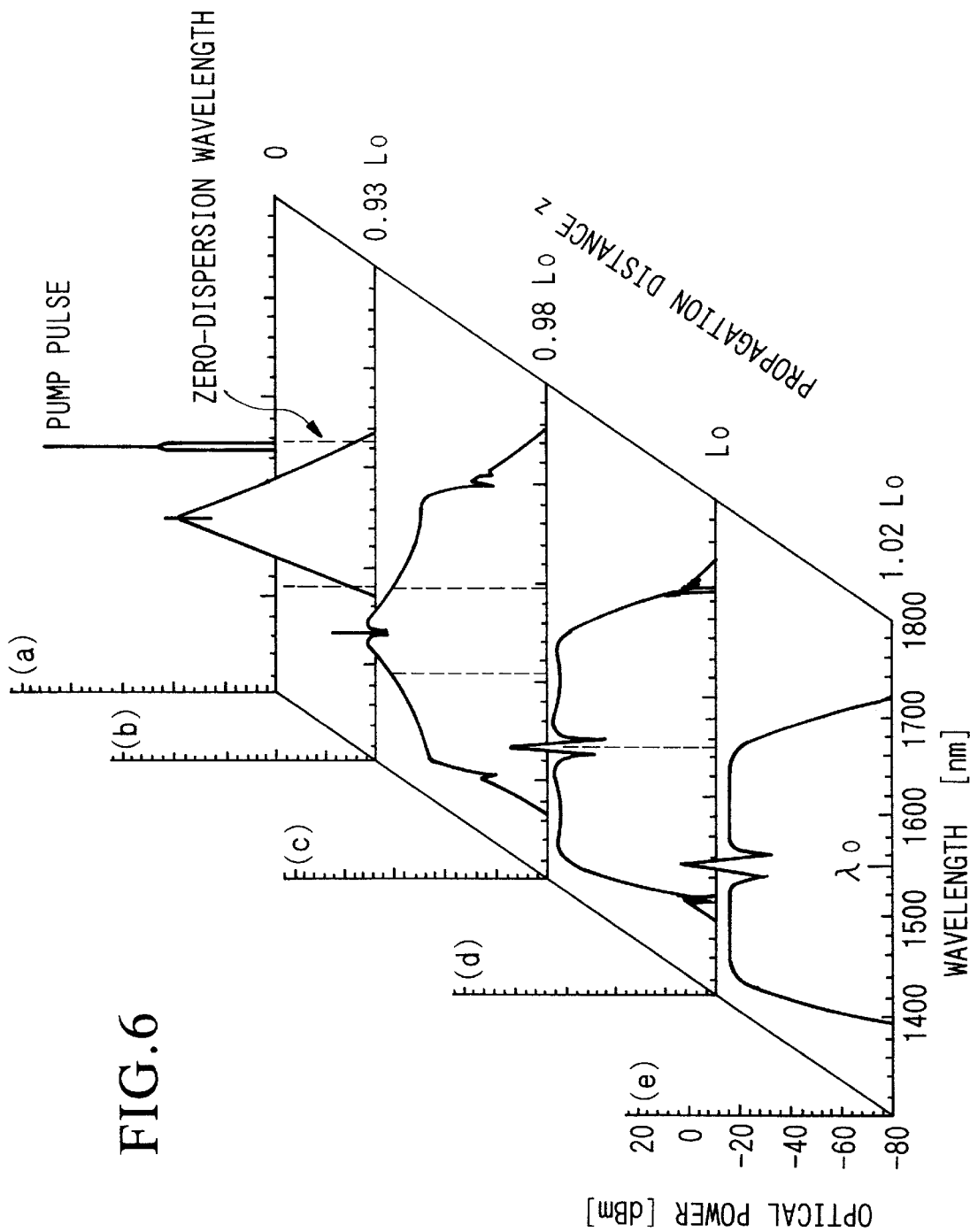
FIG. 6 is a graph showing how a white pulse spectrum evolves along a waveguided nonlinear optical medium having the first chromatic dispersion characteristics shown in FIG. 1.

FIG. 6 illustrates how a white pulse spectrum evolves with propagation distance z. The zero-dispersion wavelengths are indicated by broken lines in FIG. 6, and, at the propagation distance L0, the two zero-dispersion wavelengths become coincident with the pump wavelength $\lambda 0$. In FIG. 6, the spectrums of the pump pulses are indicated by (a) at the input end of the optical medium. As the two zero-dispersion wavelengths approaches the pump pulse wavelength, the spectrum progressively changes to a rectangular shape and, at the output end, a flattened spectrum is obtained as is shown in (e).

In the following, the white pulse source having the features described above will be described in more detail.

S1E1 Embodiment 1 in Section 1

Figure 23:
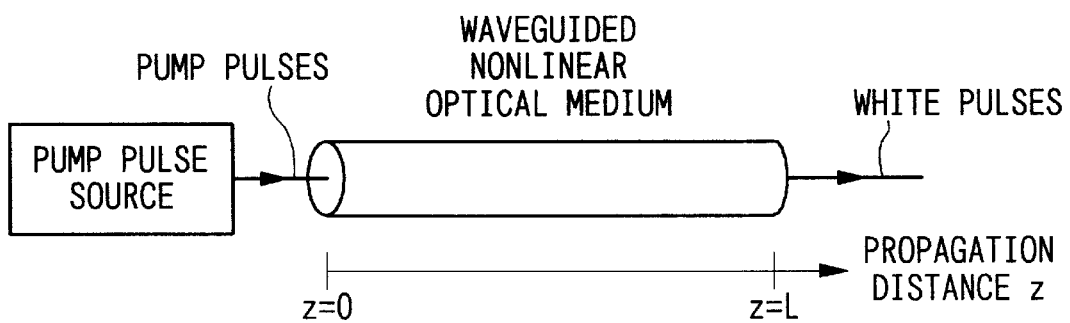
FIG. 23 is a schematic configuration of a conventional white pulse source.
Figure 24:
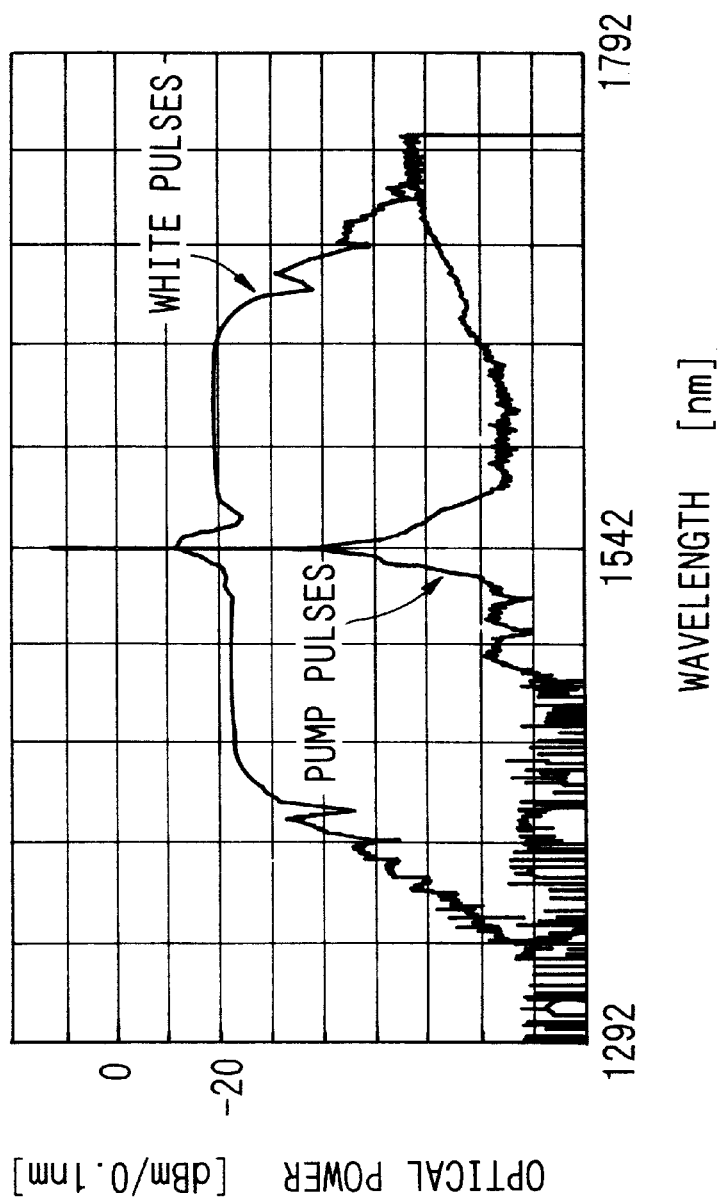
FIG. 24 is an example of a spectrum produced by a white pulse source cited in reference 1.

The first embodiment of the white pulse source is comprised by a pump pulse source similar to the one shown in FIG. 23 and a waveguided nonlinear optical medium (shortened to optical medium hereinbelow). However, the optical medium to be used in the white pulse source in the present invention is distinguished by a special characteristic of a chromatic dispersion with respect to wavelength and distance from the input end.

S1E1-1. A first characteristic of a chromatic dispersion

FIG. 1 illustrates a first characteristic of a chromatic dispersion with respect to wavelength and distance in the optical medium to be used as a white pulse source. In the graph, the vertical axis and the horizontal axis represent chromatic dispersion in ps/nm/km and wavelength in nm.

Chromatic dispersion $D(\lambda 0, z)$ at the center wavelength $\lambda 0$ of pump pulses in the optical medium is positive at the input end (z=0), and decreases towards the output end.

Further, chromatic dispersion $D(\lambda, z)$ shows a maximum value $D(\lambda p(z), z)$ at a wavelength $\lambda p(z)$, and in the vicinity of the peak wavelength $\lambda p(z)$, the graph can be approximated by a quadratic function. In FIG. 1, although it is indicated that $\lambda 0$ is set equal to $\lambda p(z)$, the two wavelengths $\lambda 0$ and $\lambda p(z)$ do not necessarily have to be equal, such that some difference $\Lambda$ in wavelength can be allowed. Also, chromatic dispersion $D(\lambda, z)$ decreases from positive value to negative value with the propagation distance z in the optical medium. These two features will be further explained later.

Within the propagation distance in which the maximum value $D(\lambda p(z), z)$ is positive, chromatic dispersion $D(\lambda, z)$ has two zero-dispersion wavelengths $\lambda 1(z)$ and $\lambda 2(z)$, where $\lambda 1(z)<\lambda 2(z)$. In other words, the chromatic dispersion $D(\lambda, z)$ is more than zero ps/nm/km (anomalous dispersion) when a wavelength $\lambda$ is greater than $\lambda 1(z)$ and less than $\lambda 2(z)$, and becomes less than zero ps/nm/km (normal dispersion) when a wavelength $\lambda$ is less than $\lambda 1(z)$ or more than $\lambda 2(z)$. These two wavelengths $\lambda 1(z)$ and $\lambda 2(z)$ approach towards each other as the chromatic dispersion $D(\lambda p(z), z)$ decreases. Also, these two wavelengths $\lambda 1(z)$ and $\lambda 2(z)$ vanish when the maximum value $D(\lambda p(z), z)$ become negative.

As discussed above, the characteristic of a chromatic dispersion with respect to wavelength and distance in the optical medium for use in the white pulse source of the present invention is characterized by: (1) the chromatic dispersion $D(\lambda 0,z)$ at the pump wavelength $\lambda 0$ decreases from a positive value to negative value with propagation distance z, and also (2) chromatic dispersion $D(\lambda 0, z)$ has a maximum value $D(\lambda p(z), z)$ and within the range of propagation distance z where the maximum value is positive, there are two zero-dispersion wavelengths $\lambda 1(z)$ and $\lambda 2(z)$.

Such characteristics of the chromatic dispersion discussed in the above paragraph can be realized in a double-clad, triple-clad or quadruple-clad waveguide having a refractive index profile such as those illustrated in FIGS. 2A~2C. In the double-clad waveguide, average refractive indexes, n0, n1 and n2 for a core, a first cladding and a second cladding, respectively, are related by:

n0>n2>n1.

Also, in the triple-clad waveguide having refractive indexes n0, n1, n2 and n3, for a core, a first cladding, a second cladding and a third cladding, respectively, the relation among the refractive indexes is:

n0>n2>n3>n1.

Also, in the quadruple-clad waveguide having refractive indexes n0, n1, n2, n3 and n4 for a core, a first cladding, a second cladding, a third cladding and a fourth cladding, respectively, the relation is:

n0>n2>n4>n3>n1.

Or, it may also be such that n0>n2>n4>n3=n1. These types of refractive index profiles are known, for example, as indicated in reference 4 (Kawakami et. al., "Optical fibers and fiber devices", Baifukan, pp114-115, 1966) or in reference 5 (L. G. Cohen et. al., "Low-loss quadruple-clad single-mode lightguides with dispersion value of less than 2 ps/nm/km over the 1.28 to 1.65 $\mu$m wavelength range", Electron. Lett., vol. 18, p. 1023, 1982).

Chromatic dispersion along the longitudinal propagation direction in such waveguides can be altered by changing the core or cladding diameters, or by changing the refractive index of the core or the claddings.

Figure 3:
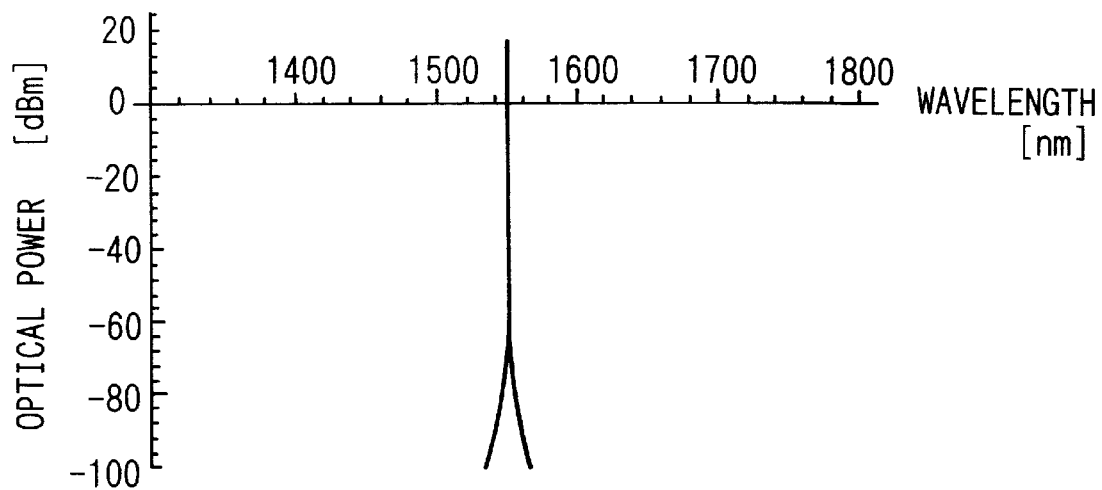
FIG. 3 is a graph showing a spectrum of pump pulses input into the waveguided nonlinear optical medium.
Figure 4:
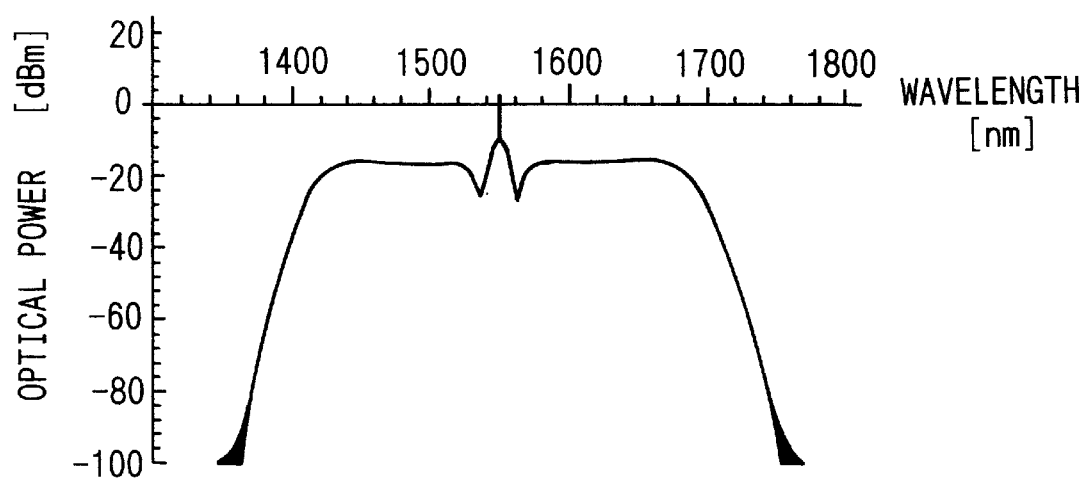
FIG. 4 is a graph showing a spectrum of white pulses generated by the waveguided nonlinear optical medium having the first chromatic dispersion characteristics shown in FIG. 1.

An example of the spectrum of a white pulse obtained by numerical analysis is shown in FIG. 4, which is obtained by inputting a pump pulse whose spectrum is shown in FIG. 3 into an optical medium having the characteristic of chromatic dispersion shown in FIG. 1. As is shown in FIG. 4, a white pulse whose spectrum shows high flatness over a wide range of wavelength can be obtained by use of an optical medium fulfilling the requirements (1) and (2) in the optical medium mentioned above. The peak in the white pulse spectrum in FIG. 4 corresponds to the pedestal of the pump pulse which were not converted to white pulse.

Figure 25:
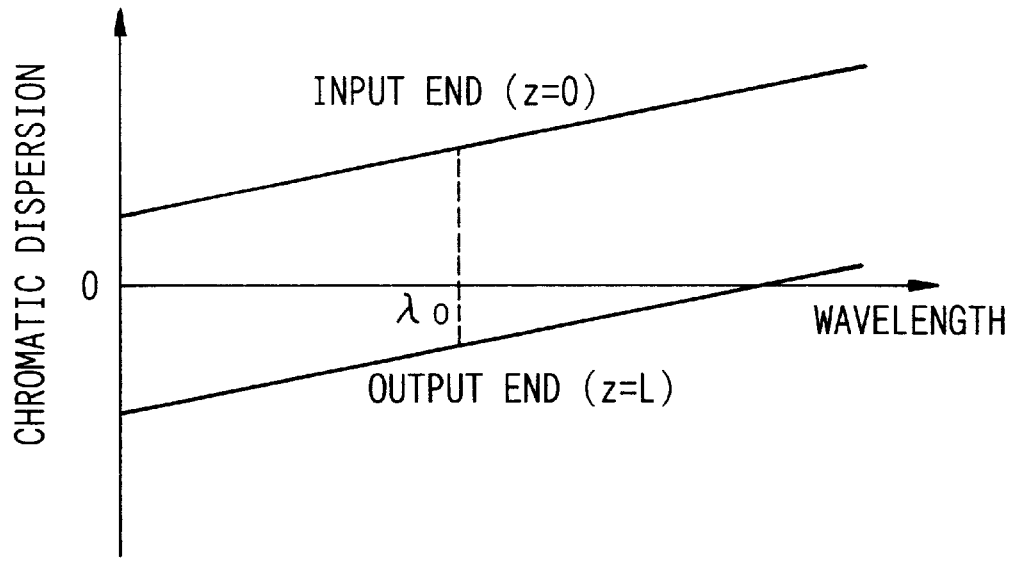
FIG. 25 is a graph showing the chromatic dispersion characteristics of the waveguided nonlinear optical medium used in the white pulse source cited in reference 2.
Figure 26:
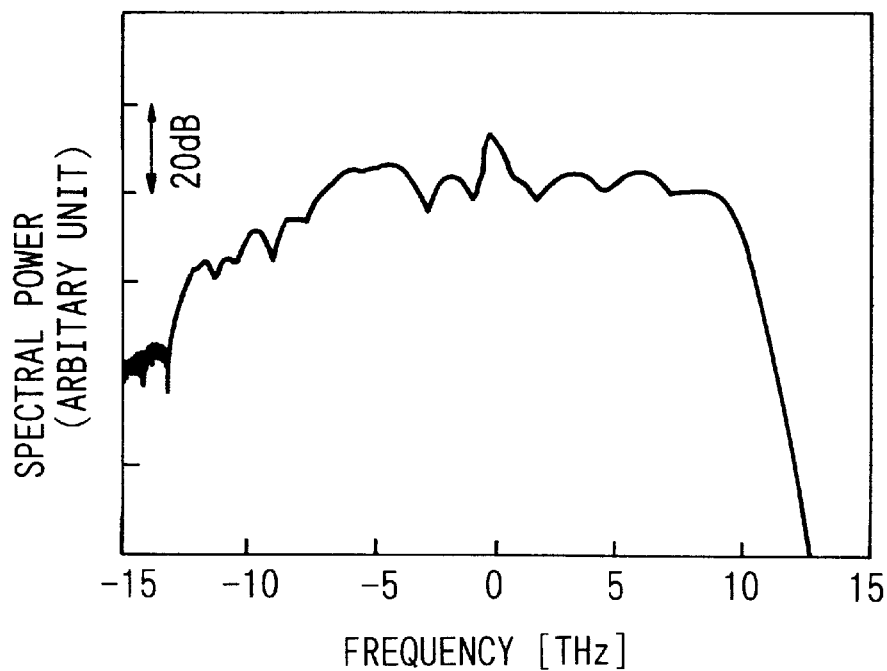
FIG. 26 is an example of a spectrum produced by a white pulse source cited in reference 2.

It should be noted that, if only the requirement (1) is satisfied, that is, for an optical medium in which the decrease in chromatic dispersion is present but there is only one zero-dispersion wavelength as in the conventional optical medium (cf. FIG. 25), then optical energy accumulates at only one breakdown point on the side near the zero-dispersion wavelength with respect to the pump wavelength, so that a symmetrical evolution of the spectrum cannot be achieved, resulting in producing a spectrum of white pulse having inadequate flatness as illustrated in FIG. 26.

Figure 5:
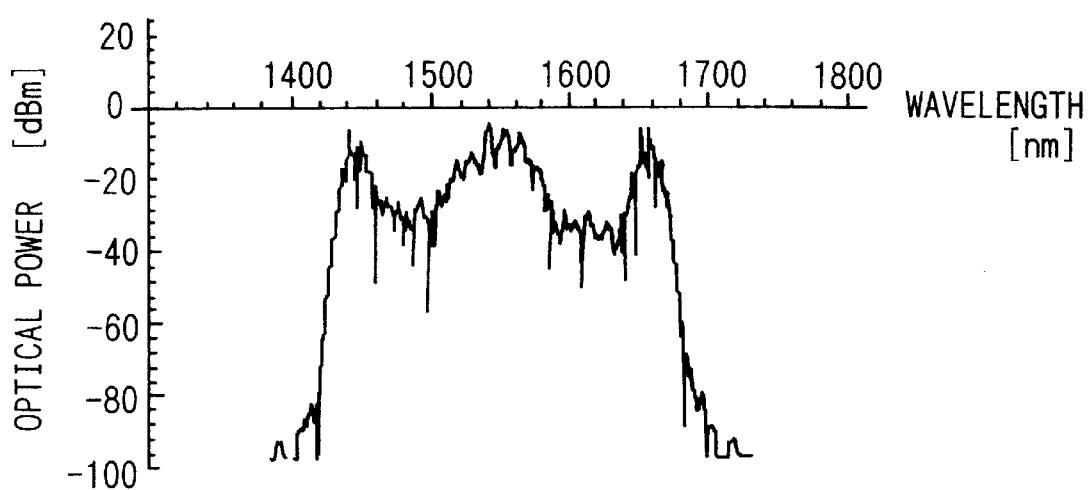
FIG. 5 is an example of the output spectrum from a waveguided nonlinear optical medium whose chromatic dispersion has two zero-dispersion wavelengths but does not decrease with propagation distance.

On the other hand, when only the requirement (2) is satisfied, that is, there are two zero-dispersion wavelengths but the chromatic dispersion does not decrease with the propagation distance, then, optical energy accumulates at the two breakdown points on both sides of the pump wavelength, but the breakdown points do not approach the pump wavelength, such that the rectangular shape of the spectrum cannot be evolved in the propagation direction. Such a case is illustrated in FIG. 5, which does not achieve sufficient flatness as well.

Requirements for the Optical Medium and the Pump Pulse to Generate White Pulses

In the following, characteristics required for the optical medium for use in white pulse source and those for the input pump pulse will be discussed in terms of specific examples under five sub-sections 1a~1e, in Section 1, Embodiment 1.

S1E1-1a Chromatic dispersion $D(\lambda 0, 0)$ at the input end and chromatic dispersion $D(\lambda 0, L)$ at the output end of the optical medium Chromatic dispersion $D(\lambda 0, z)$ at the center wavelength $\lambda 0$ of the pump pulse is positive at the input end (z=0) for the pump pulse and decreases with propagation distance z along the optical medium. In this case, the spectrum of the white pulses, generated within the wavelength region in which the chromatic dispersion $D(\lambda 0, z)$ is positive (normal dispersion) in the optical medium, begins to become rectangular at a propagation distance z=Lf where the chromatic dispersion $D(\lambda 0, Lf)$ becomes less than $\frac{1}{40}$ of the chromatic dispersion $D(\lambda 0, 0)$ at the input end. It follows that:

$D(\lambda 0,Lf)<D(\lambda 0, 0)/40$.

As shown in the spectra (d) and (e) in FIG. 6, the spectrum of a white pulse still evolves for a while even after propagation distance $z \geq L0$ where chromatic dispersion is always negative (normal dispersion) for all wavelengths. Moreover, flattening effect improves when the pulse wave is propagated further in the normal dispersion region rather than outputting the pulse wave at propagation distance z=L0 where $D(\lambda p(L0), L0)$=ps/nm/km. Therefore, the chromatic dispersion $D(\lambda 0, L)$ at the output end (z=L) for optimum flattening is given by:

$D(\lambda 0, L) \leq -D(\lambda 0, 0)/40$.

S1E1-1b The effective medium length L0 of the optical medium and spectral width of the white pulse The effective medium length of the optical medium is defined as a propagation distance z=L0 where a relation $D(\lambda p(L0),L0)=0$. In case of chromatic dispersion characteristic shown in FIG. 1, at the propagation distance z=L0, the zero-dispersion wavelengths become identical to the wavelength $\lambda 0$ of the pump pulse.

Figure 7:
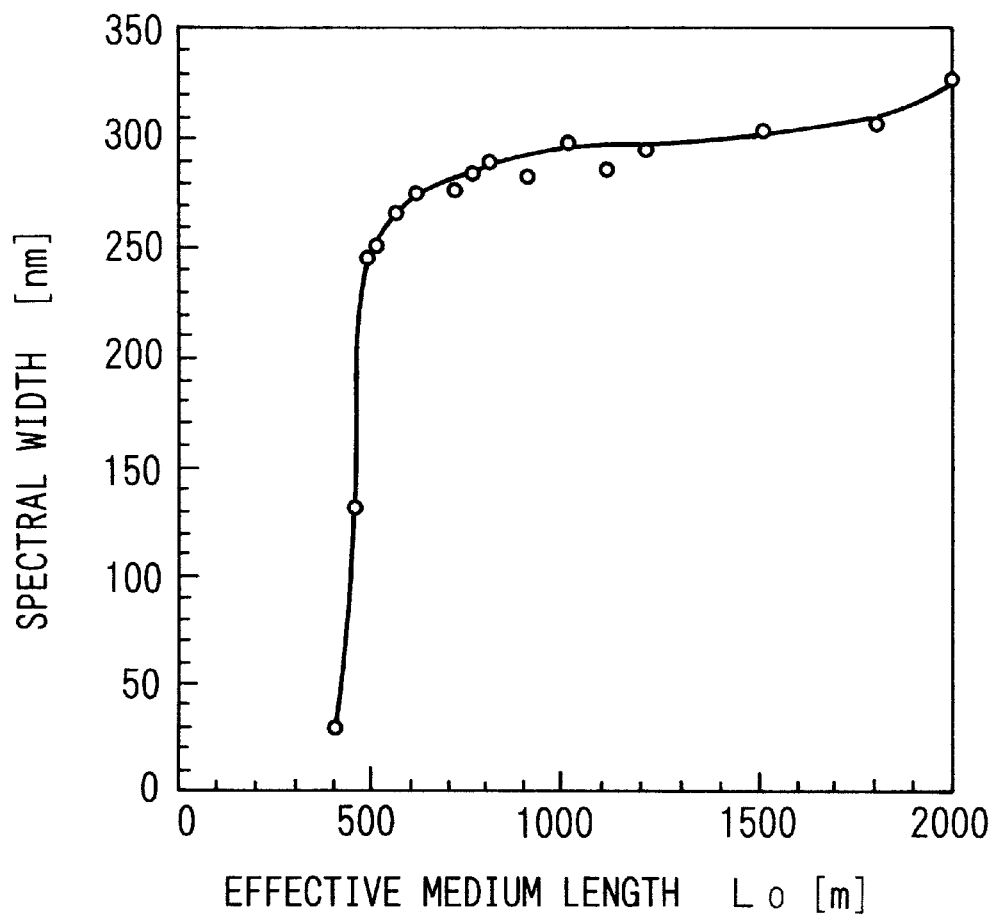
FIG. 7 is a graph showing an example of the dependence of the spectral width of the white pulse on the effective medium length L0.

FIG. 7 shows an typical example of the dependence of the spectral width of the white pulse on the effective medium length L0 of the optical medium. As seen in this example, there is a particular effective medium length L0 in an optical medium at which the spectral width begins to increase suddenly. This is termed the threshold value Lth of the effective medium length L0.

Figure 8:
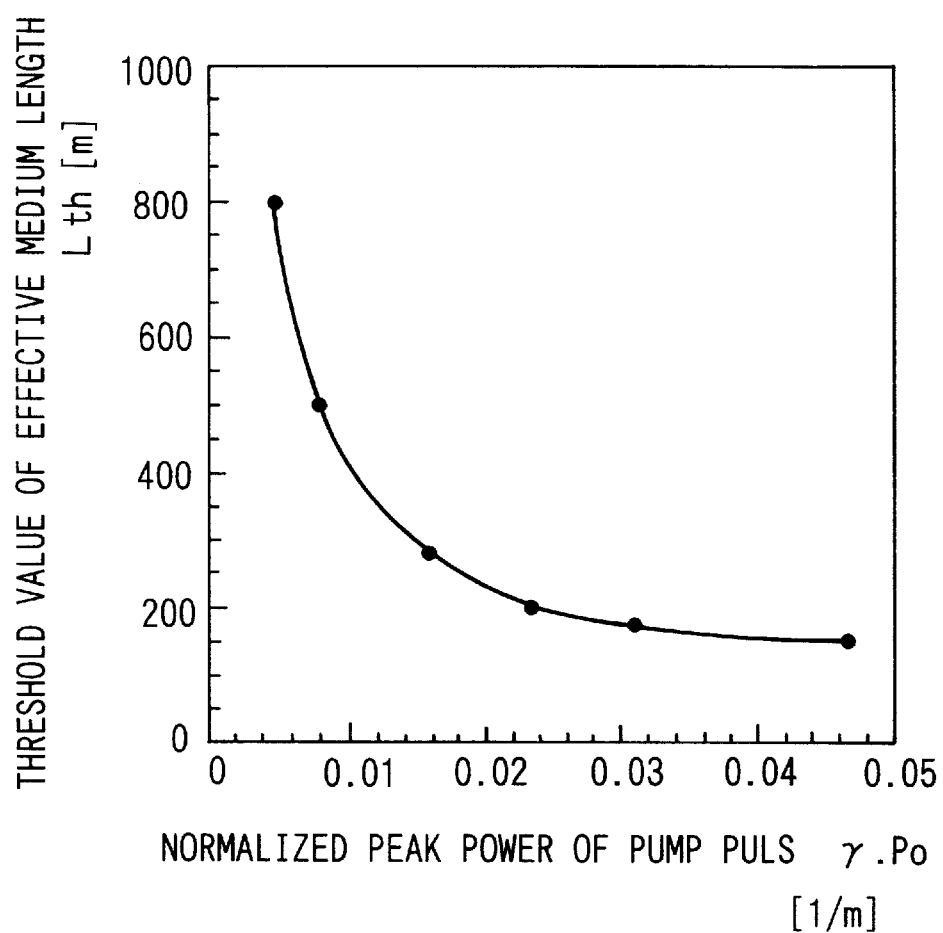
FIG. 8 is a graph showing an example of the relation of the threshold value Lth of the effective medium length L0 for generating white pulses to the peak power of the pump pulses.

S1E1-1c Threshold value Lth of the effective medium length L0 and the peak power of the pump pulse FIG. 8 shows an typical example of the dependence of the threshold value Lth of the effective medium length L0 on the normalized peak power $\gamma P0$ of the pump pulse where P0 is a peak power in W and a nonlinear coefficient $\gamma$ is defined as $(\omega 0 \, nNL)/(c0 \, A)$; $\omega 0 = 2\pi c0/\lambda 0$ is an angular frequency of the pump pulse and c0 is the speed of light in a vacuum; nNL is a nonlinear refractive index of the optical medium in m2/W; and A is a mode field area in m2 of the optical medium at the center wavelength $\lambda 0$. The threshold value Lth becomes smaller as the peak power of the pump pulse increases according to the following expression:

$\gamma P0 Lth = 4.6$

Therefore, by choosing the peak power P0 a the pump pulse and the effective medium length L0 so as to satisfy a relation:

$\gamma P0 L0 \geq 4.6$, it is possible to generate white pulse having a wide spectral width. For example, when $\gamma P0 = 0.00775 \, m^{-1}$, the medium length should be longer than 600 m.

Figure 9:
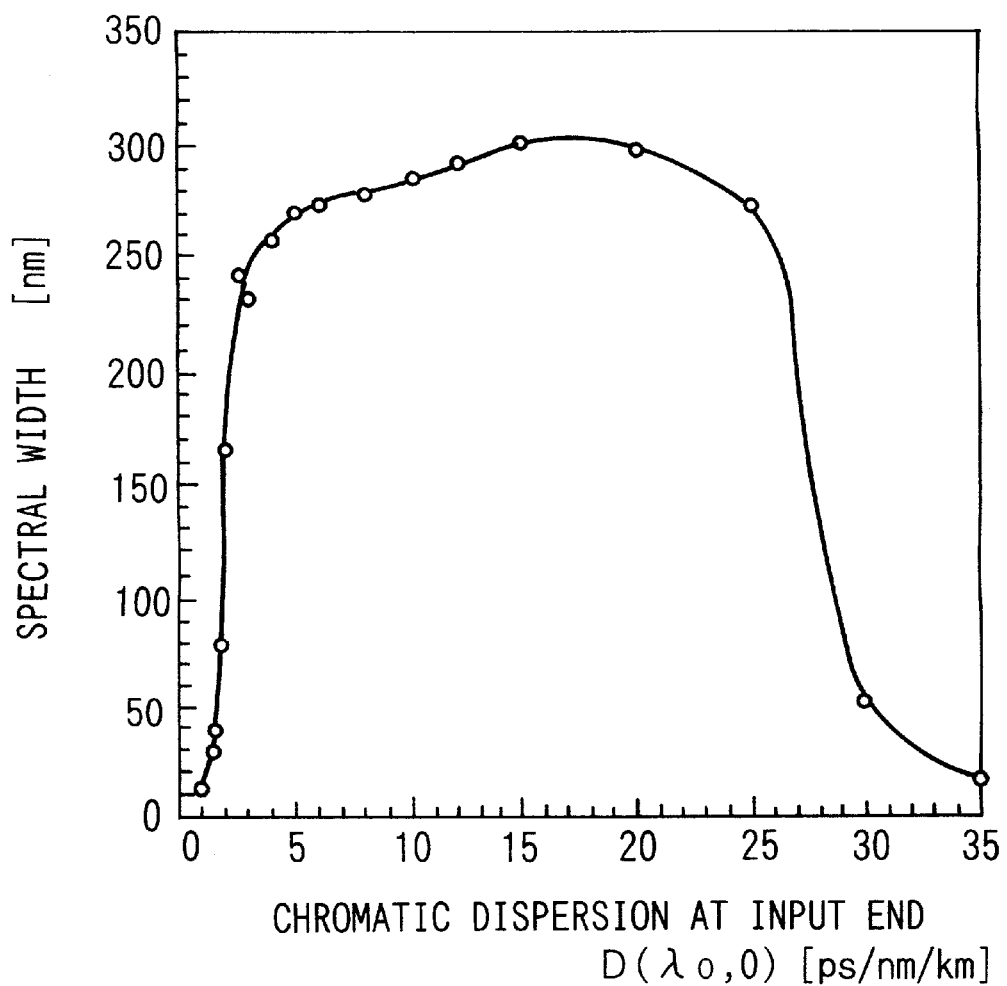
FIG. 9 is a graph showing an example of the dependence of the spectral width of the white pulse on chromatic dispersion D($\lambda$0, 0) at the input end of the waveguided nonlinear optical medium.

S1E1-1d Chromatic dispersion $D(\lambda 0, 0)$ and spectral width of the white pulse FIG. 9 shows a typical example of the dependence of the spectral width of the white pulse on a chromatic dispersion $D(\lambda 0, 0)$ at the input end of a optical medium. As seen in this example, the chromatic dispersion $D(\lambda 0, 0)$ to generate white pulse having a wide spectral width is found to have a lower limit (2 ps/nm/km) of $D(\lambda 0, 0)$ and an upper limit (27 ps/nm/km).

S1E1-1e Pulse width of the pump pulse and spectral width of the white pulse

Figure 10:
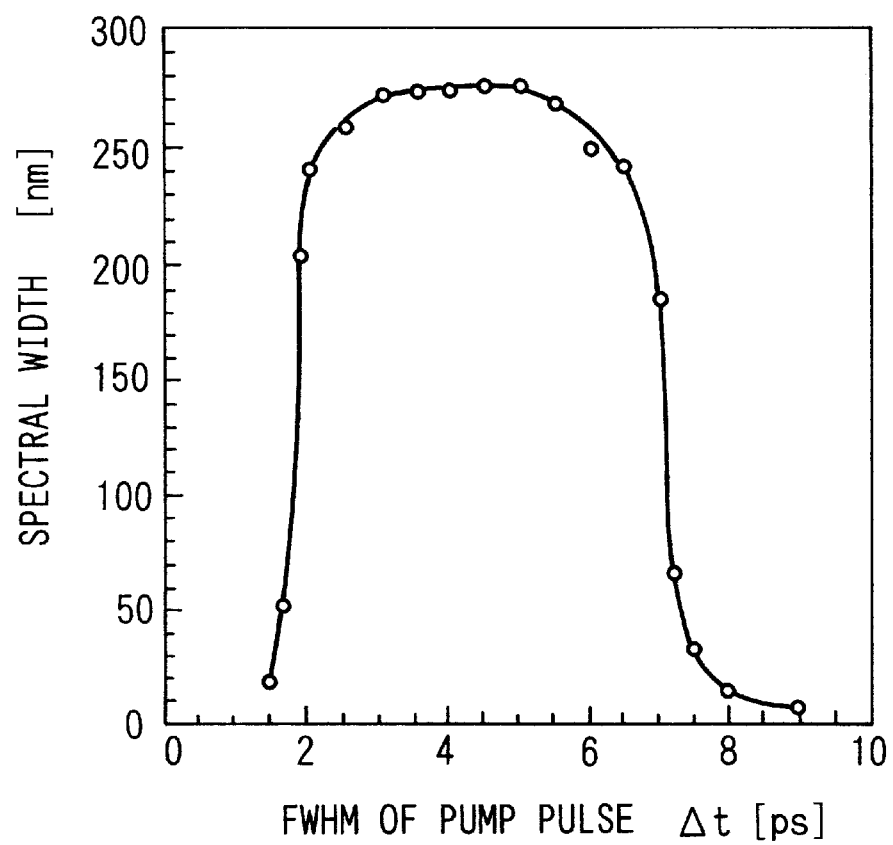
FIG. 10 is an example of the dependence of spectral width of the white pulse on the pulse width of the pump pulse.

FIG. 10 shows a typical example of the dependence of the spectral width of the white pulse on the pulse width of a pump pulse. As seen in this example, a pulse width (full width half maximum, FWHM) to generate white pulse having a wide spectral width is found to have a lower limit (2 ps) and an upper limit (8 ps).

Figure 11:
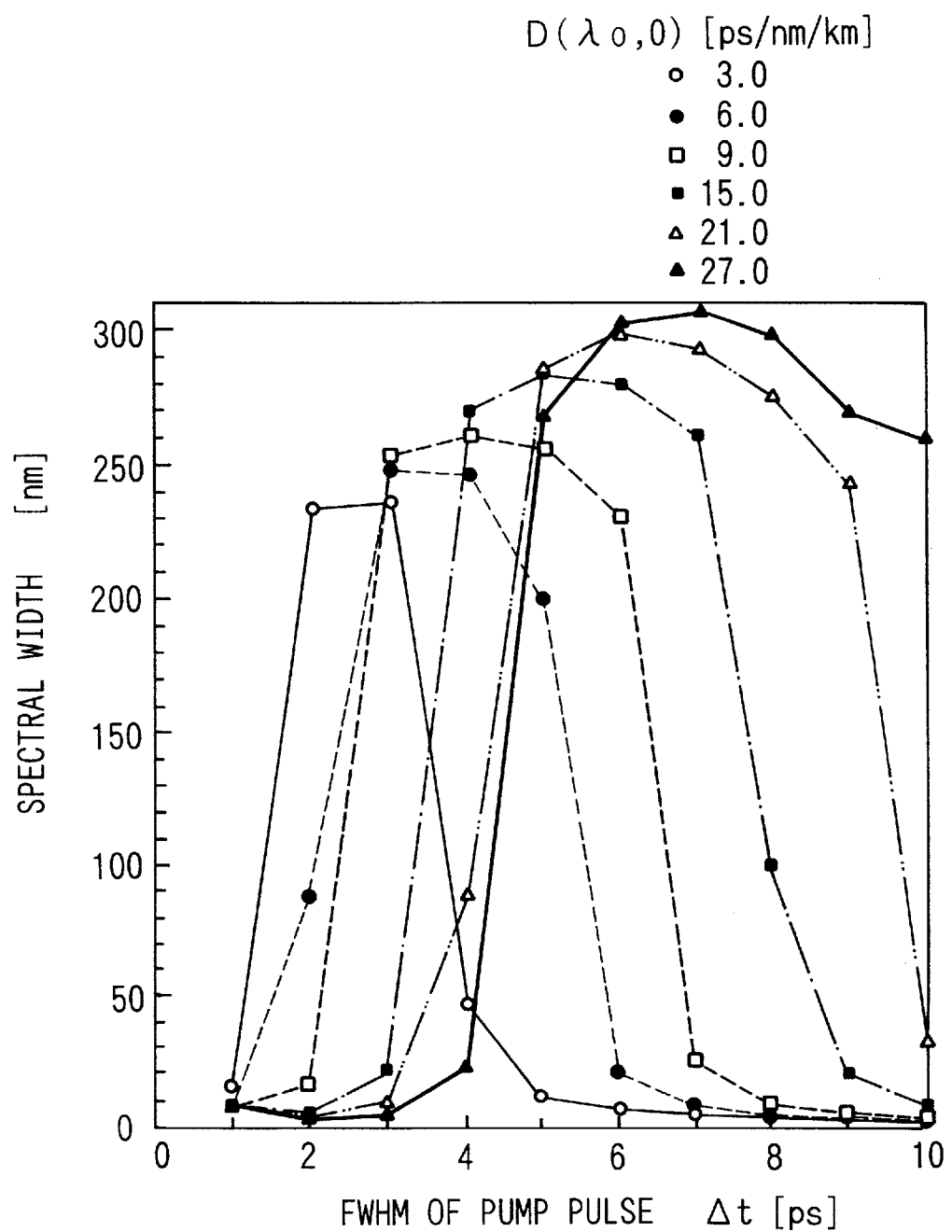
FIG. 11 is an example of the dependence of the spectral width of the white pulse on the pump pulse width, in which chromatic dispersion D($\lambda$0, 0) is a parameter.

FIG. 11 shows a typical example of the dependence of spectral width of the white pulse on the pulse width of a pump pulse and a chromatic dispersion $D(\lambda 0, 0)$ at the input end of a optical medium. As the chromatic dispersion $D(\lambda 0, 0)$ is set higher, a lower and an upper limits for FWHM of pump pulse shift towards higher to generate white pulse having a wide spectral width.

Specific examples are as follows. If the relation between the peak power P0 of a pump pulse and the effective medium length L0 is:

$\gamma P0 \, L0 \geq 4.6$ then, the chromatic dispersion $D(\lambda 0, 0)$ at the input end and the FWHM of the pump pulse $\Delta t$ of the pump pulse should satisfy the following expression:

$0.05 \, \Delta t^2 \leq D(\lambda 0, 0) \leq 3.0 \, \Delta t^2$.

Also, when $\gamma P0 \, L0 \geq 3.5$.

then, the chromatic dispersion $D(\lambda 0, 0)$ at the input end and the FWHM of the pump pulse $\Delta t$ of the pump pulse should satisfy the following expression:

$0.2 \, \Delta t^2 \leq D(\lambda 0, 0) \leq 1.2 \, \Delta t^2$

For example, when $\gamma P0=0.00775 \, m^{-1}$, $L0 \leq 600$ m and $\Delta t=4$ ps and chromatic dispersion should satisfy a relation 2 ps/nm/km $\leq D(\lambda 0, 0) \leq 27$ ps/nm/km.

Figure 27:
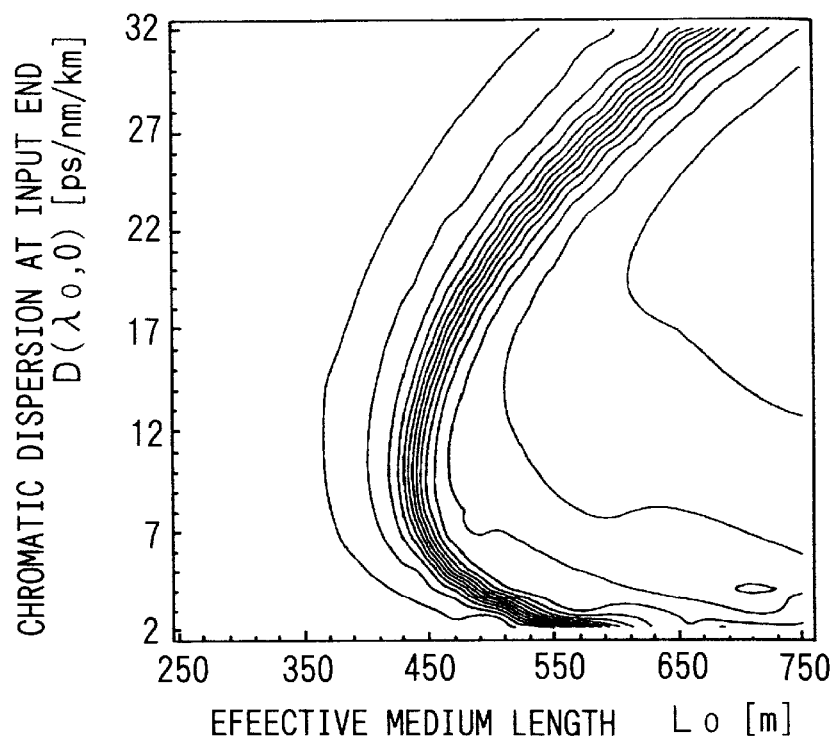
FIG. 27 is a map showing a contour curves of spectral widths of output from the waveguided nonlinear optical medium with respect to chromatic dispersion at the input end D($\lambda$0, 0) on the vertical axis and effective medium lengths L0 on the horizontal axis.

The requirements for a waveguided nonlinear optical medium to generate white pulses are expressed in a general expression as follows:

$Ln \geq a/Dn + b + c \, Dn + d \, Dn^2$ where Ln is a normalized effective medium length defined as $Ln = \gamma P0 \, L0$; Dn is a normalized chromatic dispersion at z=0 defined as $Dn = D(\lambda 0, 0)/(\gamma P0 \, \Delta t^2)$; $a=0.30 \times 10^{20}$, $b=2.9$, $c=-0.17 \times 10^{-20}$ and $d=0.40 \times 10^{40}$. For example, when the peak power is 0.5 W and the pulse width is 4 ps, the spectral widths of the white pulse output from the optical medium are represented by a contour graph with respect to effective medium length L0 on the horizontal axis and chromatic dispersion $D(\lambda 0, 0)$ on the vertical axis as shown in FIG. 27. The spacing between the contour curves corresponds to a spectral width of 25 nm.

In this case, the requirements for the optical medium to generate white pulses are expressed by:

$L0 \geq 473/D(\lambda 0, 0) + 374 - 1.8 \, D(\lambda 0, 0) + 0.34 \, D(\lambda 0, 0)^2$ where L0 is in meter and $D(\lambda 0, 0)$ is in ps/nm/km.

Figure 28:
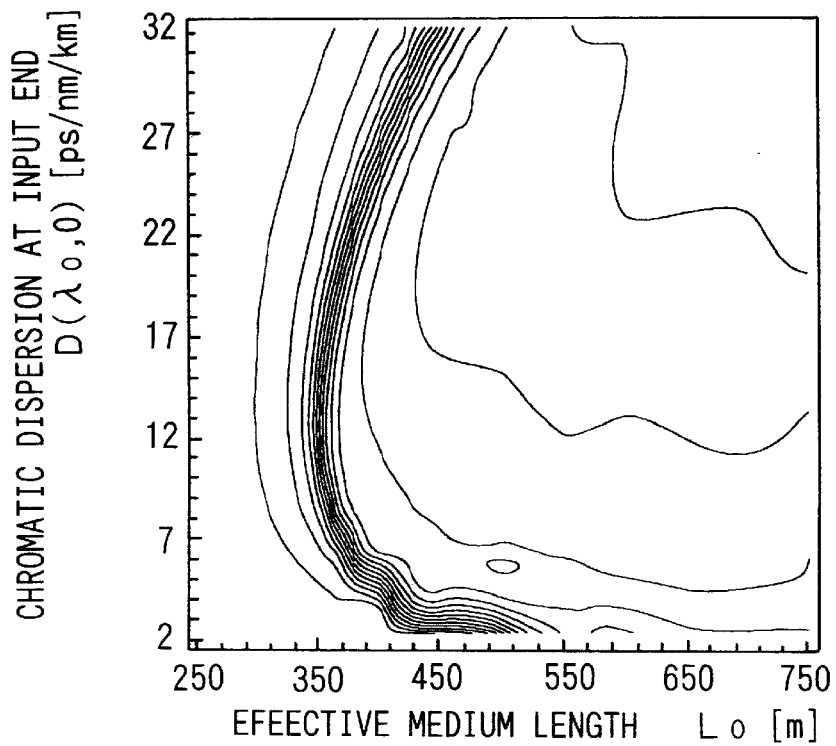
FIG. 28 is a map showing a contour curves of spectral widths of output from the waveguided nonlinear optical medium with Raman effect with respect to chromatic dispersion at the input end D($\lambda$0, 0) on the vertical axis and effective medium lengths L0 on the horizontal axis.

Many of the optical materials used for nonlinear waveguides are susceptible to Raman effect. FIG. 28 shows a contour graph for spectral widths in a typical optical material, fused silica, with respect to effective medium length L0 on the horizontal axis and chromatic dispersion $D(\lambda 0, 0)$ on the vertical axis. The values of peak power P0 and the FWHM of a pump pulse $\Delta t$ were the same as those in FIG. 27, respectively, at 0.5 W and 4 ps.

In the case shown in FIG. 28, the requirements to produce white pulses are expressed as:

$L0 \geq 426/D(\lambda 0, 0) + 308 - 1.7 \, D(\lambda 0, 0) + 0.18 \, D(\lambda 0, 0)^2$ where L0 is in meter and $D(\lambda 0, 0)$ is in ps/nm/km. Threshold value for the effective medium length L0 to generate white pulses has been reduced compared with the results in FIG. 27. A general expression for normalized effective medium length Ln and normalized chromatic dispersion Dn at z=0, with respect to the peak power P0 and the FWHM of a pump pulse $\Delta t$, is expressed as:

$Ln \geq a/Dn + b + c \, Dn + d \, Dn^2$ where $a=0.26 \times 10^{20}$, $b=2.3$, $c=-0.16 \times 10^{-20}$ and $d=0.21 \times 10^{-40}$.

S1E1-2 A second dispersion characteristic of chromatic dispersion

Figure 12:
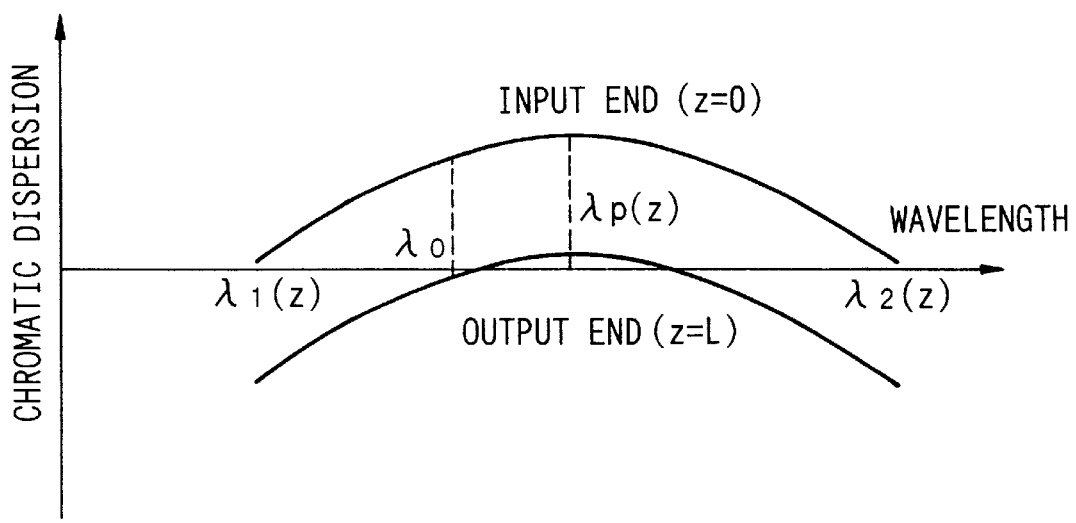
FIG. 12 is a graph showing a second chromatic dispersion characteristic of a waveguided nonlinear optical medium with respect to wavelength for use in a equalized-output white optical pulse source.

FIG. 12 shows a second characteristic of chromatic dispersion in the optical medium for use in a white pulse source of the present invention.

A feature of the second dispersion characteristic is that the center wavelength $\lambda 0$ and the peak wavelength $\lambda p(z)$ do not necessarily coincide with each other, but there is some tolerance for deviation in the wavelengths, represented by a wavelength differential $\Lambda$, according to the following expression:

$\lambda p(L0) - \Lambda \leq \lambda 0 \leq \lambda p(L0) + \Lambda$.

Figure 13A:
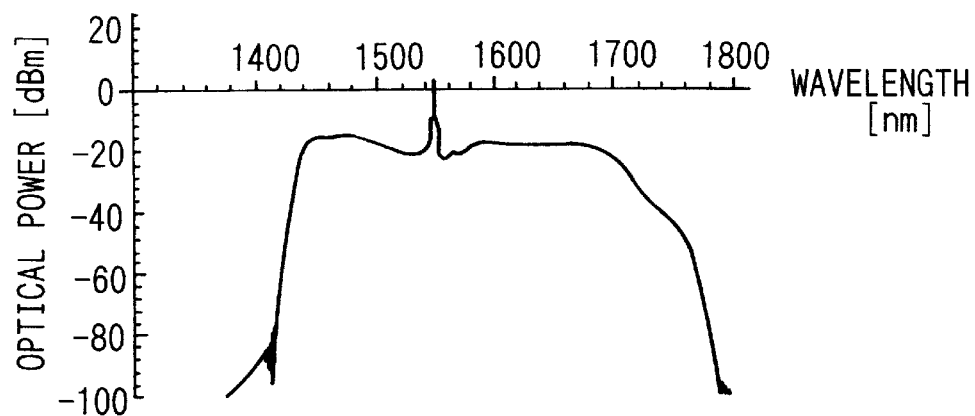
FIGS. 13A~13C are graphs showing a spectra of white pulses generated by the waveguided nonlinear optical medium having the chromatic dispersion characteristics shown in FIG. 12 for different wavelength difference $\Lambda$.
Figure 13B:
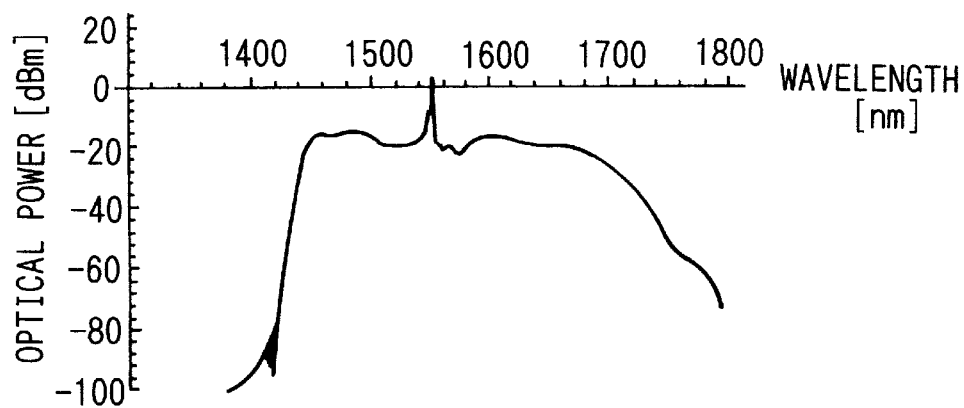
Figure 13C:
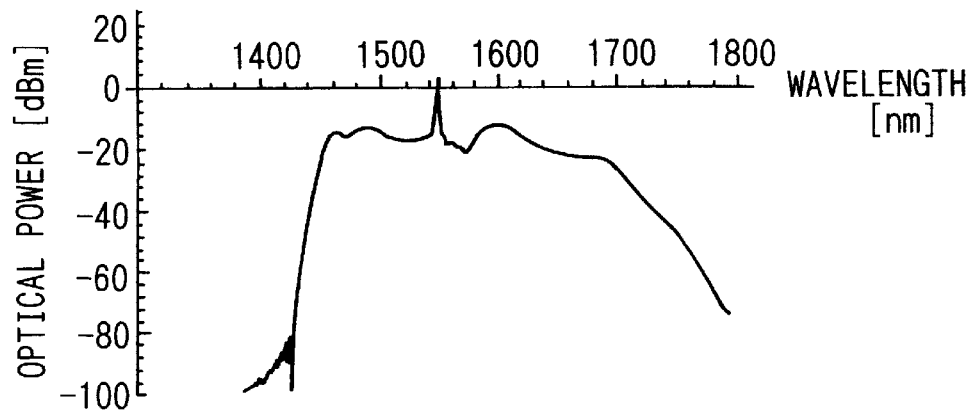

FIGS. 13A~13C show white pulse spectra corresponding to $\Lambda=30$, 40 and 50 nm. VVhen the difference between the center wavelength $\lambda 0$ of the pump pulses and the peak wavelength $\lambda p(L0)$ is 30 or 40 nm, symmetry of the white pulse is somewhat degraded but the degree of flatness is reasonably acceptable. If the difference becomes 50 nm, flat spectrum cannot be obtained.

S1E1-3 A third dispersion characteristic of chromatic dispersion

Figure 14:
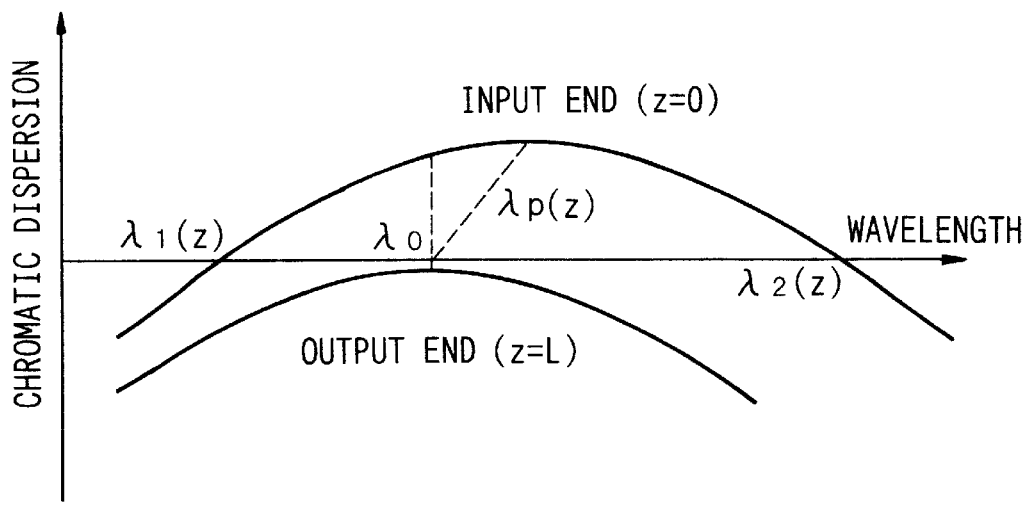
FIG. 14 is a graph showing a third chromatic dispersion characteristic of a waveguided nonlinear optical medium with respect to wavelength for use in a equalized-output white optical pulse source.
Figure 15:
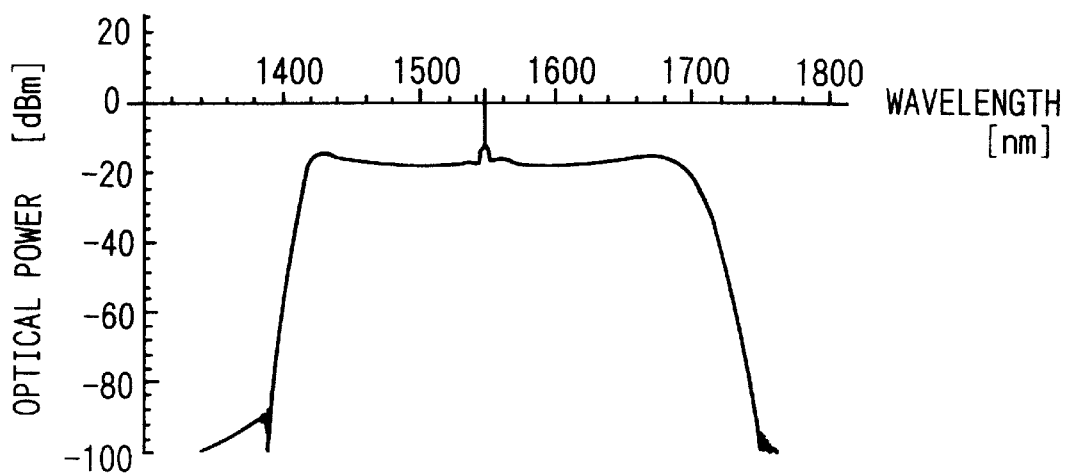
FIG. 15 is a graph showing a spectrum of white pulses generated by the waveguided nonlinear optical medium having the chromatic dispersion characteristics shown in FIG. 14.

In the examples presented above, the peak wavelength $\lambda p(L0)$ stayed at the same wavelength with decrease in the maximum dispersion $D(\lambda p(L0), z)$; however, it is not necessary that the peak wavelength $\lambda p(L0)$ remains unchanged with respect to the propagation distance z. For example, as shown in FIG. 14, the optical medium may allow some shift in the peak wavelength $\lambda p(L0)$ as the maximum dispersion $D(\lambda p(L0), z)$ decreases. This third dispersion characteristic is produced in practice when only the diameters of the core and the cladding(s) in the longitudinal direction are altered. The white pulse spectrum generated from a white pulse source having an optical medium of such dispersion characteristics is shown in FIG. 15. It can be seen that the white pulses having high degree of flatness over a wide range of wavelengths are obtained, as in the case of a medium having the first or second characteristic of chromatic dispersion.

Figure 29:
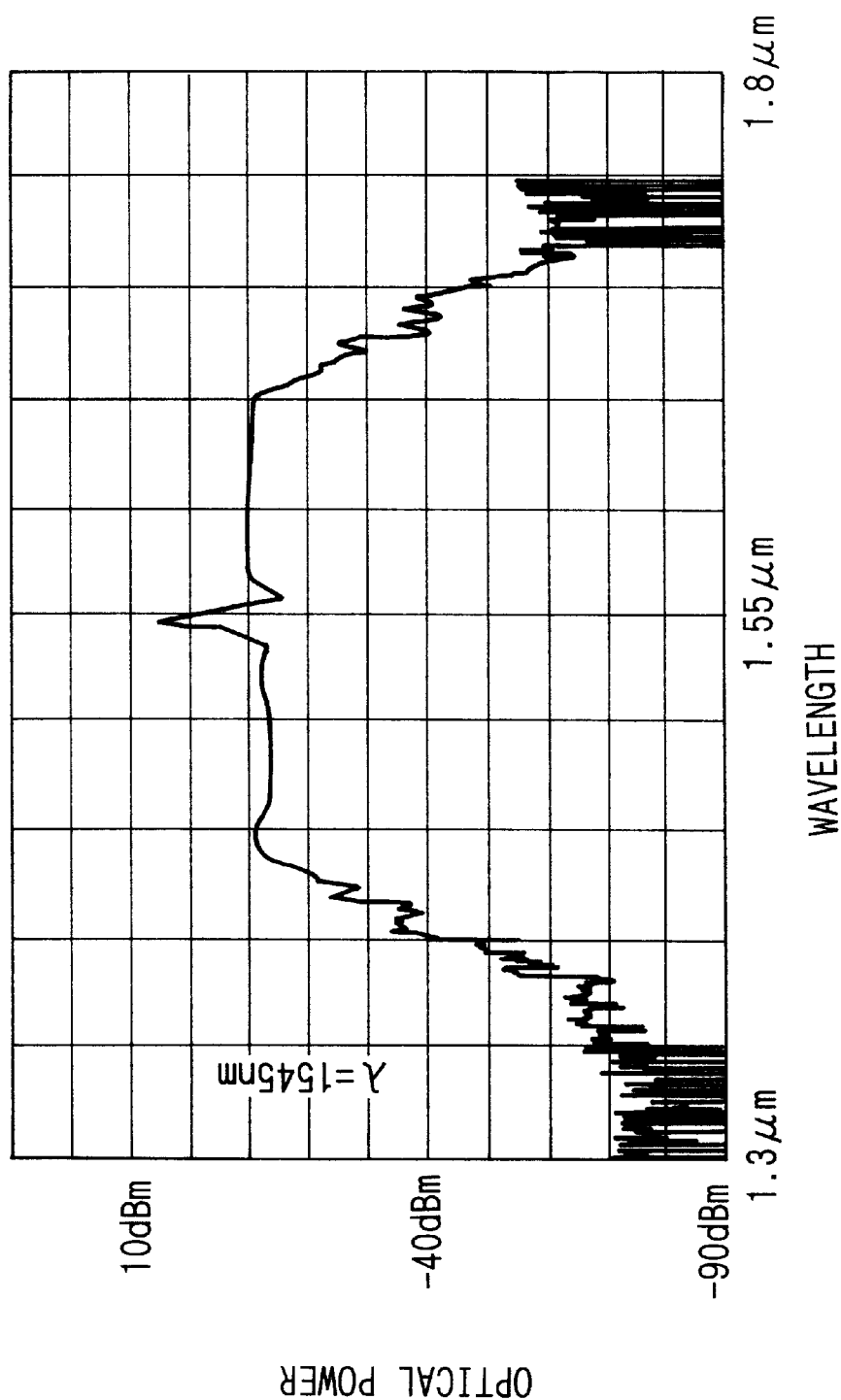
FIG. 29 is a spectrum of white pulses generated from the waveguided nonlinear optical medium designed according to a third relation of wavelengths to chromatic dispersion.

FIG. 29 shows another example of white pulse spectrum experimentally generated from an optical medium designed and manufactured according to the third dispersion characteristic. The optical medium was a single-mode optical fiber which generated white pulses having a equalized spectrum over a spectral range in excess of 200 nm.

S1E2 Embodiment 2

Figure 16:
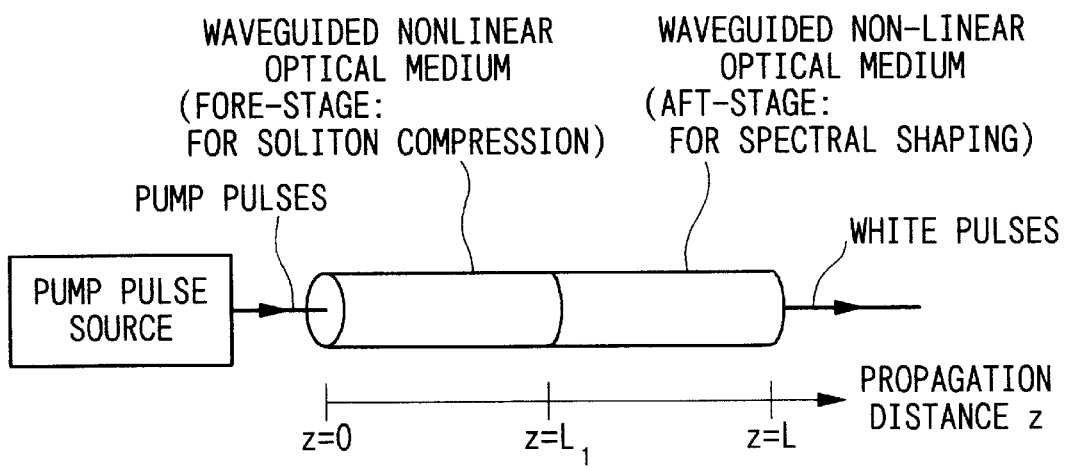
FIG. 16 is a schematic configuration of a equalized-output white pulse source in Embodiment 2.
Figure 17:
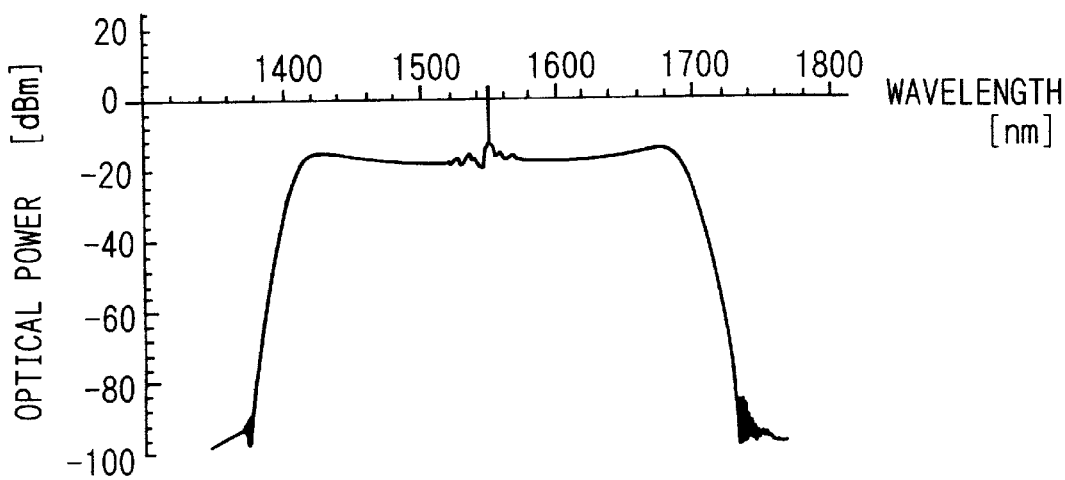
FIG. 17 is an example of a white pulse spectrum produced from a equalized-output white pulse source in Embodiment 2.

Generation of white pulses always passes through a stage of spectral broadening caused by soliton compression, as discussed above. To cause this soliton narrowing, it is not always necessary to use an optical medium having two zero-dispersion wavelengths. That is, it is possible to connect two types of optical media in series, as shown in FIG. 16, in such a way that, in the first stage ($0 \leq z \leq L1$), use an optical medium to satisfy requirement (1) mentioned under E1-1, to cause soliton compression to generate spectral broadening, and in the second stage ($L1 \leq z \leq L$), use an optical medium to satisfy requirements (1) and (2), to cause the spectrum to become rectangular and flat. An example of the white pulse spectrum generated by such a configuration of optical medium is shown in FIG. 17.

S1E3 Embodiment 3

Figure 18:
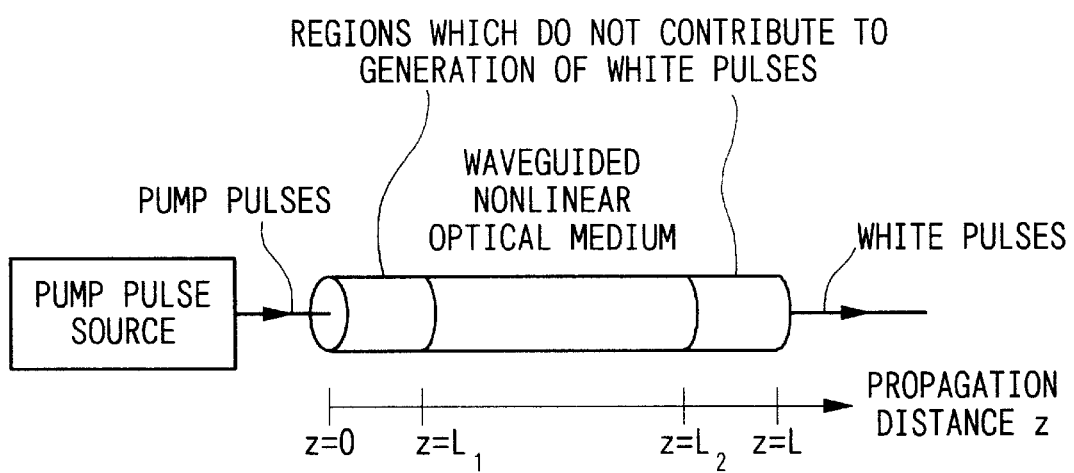
FIG. 18 is a schematic configuration of an equalized-output white pulse source in Embodiment 3.

In manufacturing of waveguided nonlinear optical media, the portion that does not contribute to white pulse generation is sometimes manufactured in addition to the portion that contributes to such a process. In some cases, the optical medium is made so that the portion that contributes to white pulse generation are carried out in a range of propagation distance, $L1 \leq z \leq L2$, as illustrated in FIG. 18. In such a case also, white pulses will be produced when the input pump pulse satisfies the requirements of peak power and pulse width at $z=L1$ to enable white pulses to be generated.

S1E4 Embodiment 4

It is allowable to use an waveguided nonlinear optical medium with optical gain in a white pulse source. Such a white pulse source is able to generate white pulses even with low-power pump pulses that would not produce white pulses in a optical medium with no gain, or in a short length of optical medium.

Figure 19:
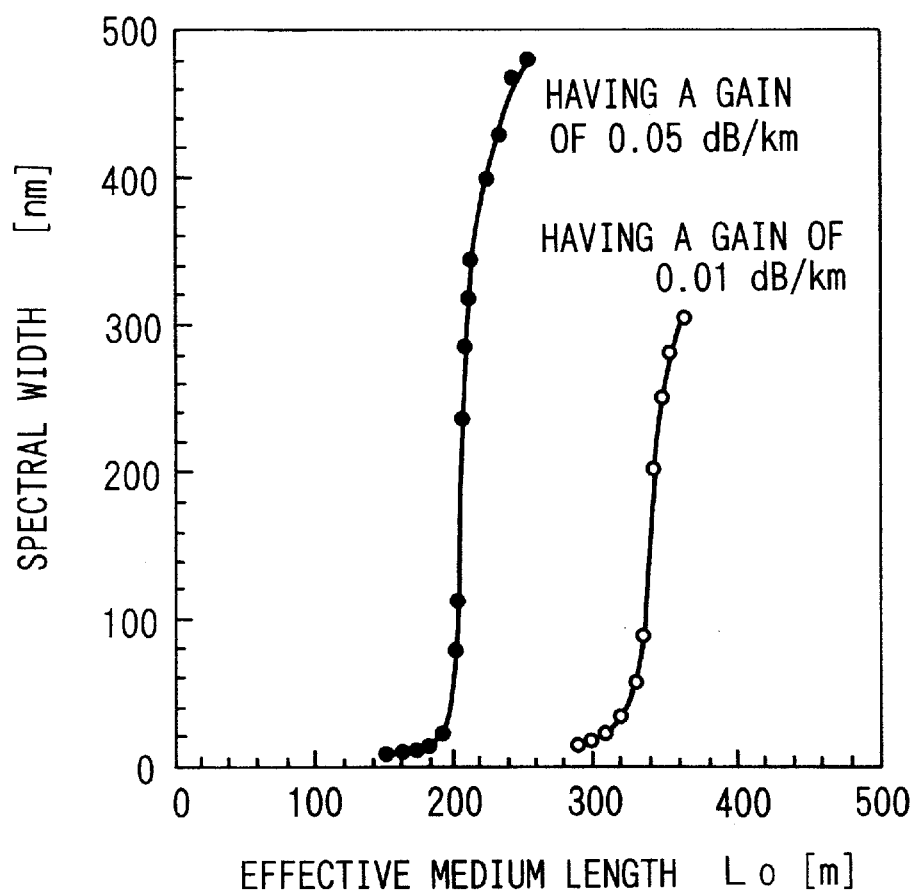
FIG. 19 is a graph showing an example of the dependence of the white pulse spectral width on the effective medium length L0 of the waveguided nonlinear optical medium with gain.

FIG. 19 shows a dependence of the spectral width of the output white pulses on the effective medium length L0 in an optical medium with optical gain. White circles refer to the cases of optical medium having a gain of 0.01 dB/m and filled circles refer to the case of optical medium having a gain of 0.05 dB/m. In this example, the parameters of the pump pulse, such as the peak power and pulse width, and chromatic dispersion $D(\lambda 0, 0)$ at the input end of the optical medium, were kept the same as those in the optical medium with no gain shown in FIG. 7.

Compared with FIG. 7, the threshold value Lth in the effective medium length L0 for optical medium with gain is shortened. Also, the effect of the optical medium with gain is equivalent to that of using a high power pump pulse according to a relation of the threshold value Lth to the peak power of pump pulse shown in FIG. 8. In other words, an amplifying optical medium is able to generate white pulses even if the power of the pump pulse is low or the optical medium is short.

Figure 20:
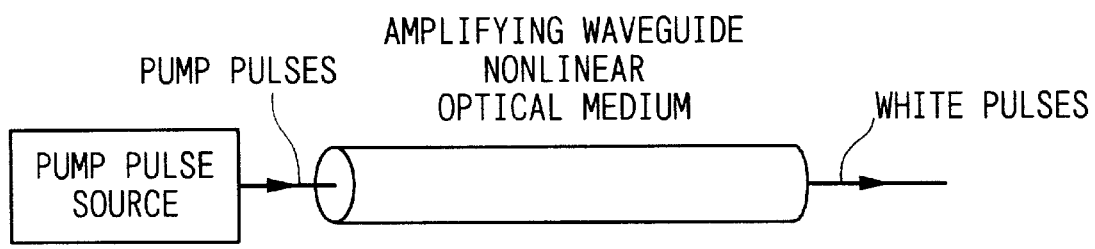
FIG. 20 is a schematic configuration of an equalized-output white pulse source in Embodiment 4.

FIG. 20 is a schematic configuration of a white pulse source in Embodiment 4 comprised by pump pulse source and an amplifying optical medium represented by a semiconductor amplifier and the like.

S1E5 Embodiment 5

Figure 21:
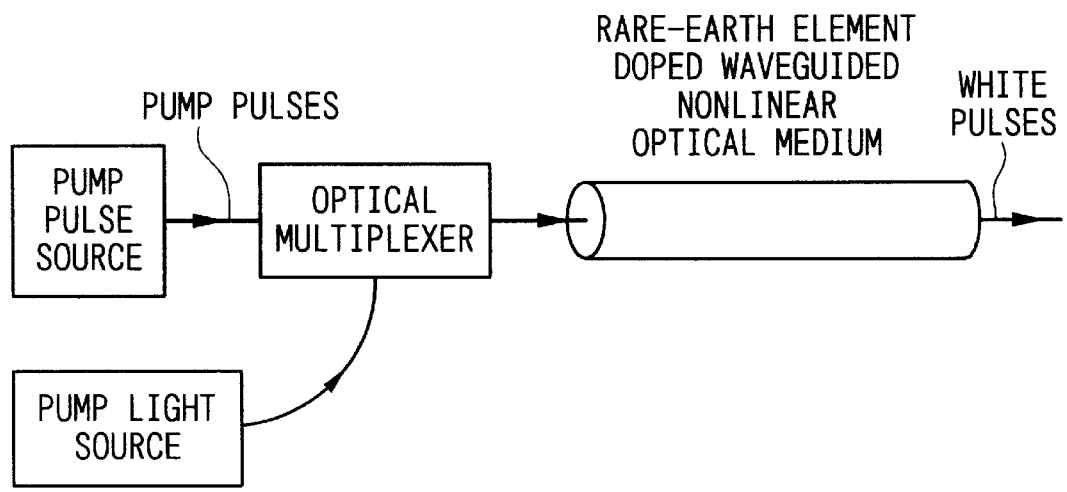
FIG. 21 is a schematic configuration of an equalized-output white pulse source in Embodiment 5.

FIG. 21 is a schematic configuration of a white pulse source in Embodiment 5. The white pulse source is comprised by: a pump pulse source; a rare-earth-doped waveguided nonlinear optical medium; a pump source for generating pump light to cause a population inversion in the rare-earth-doped optical medium; and a wavelength-division optical multiplexer for multiplexing pump light and pump pulse to be input into the rare-earth-doped optical medium.

S1E6 Embodiment 6

Figure 22:
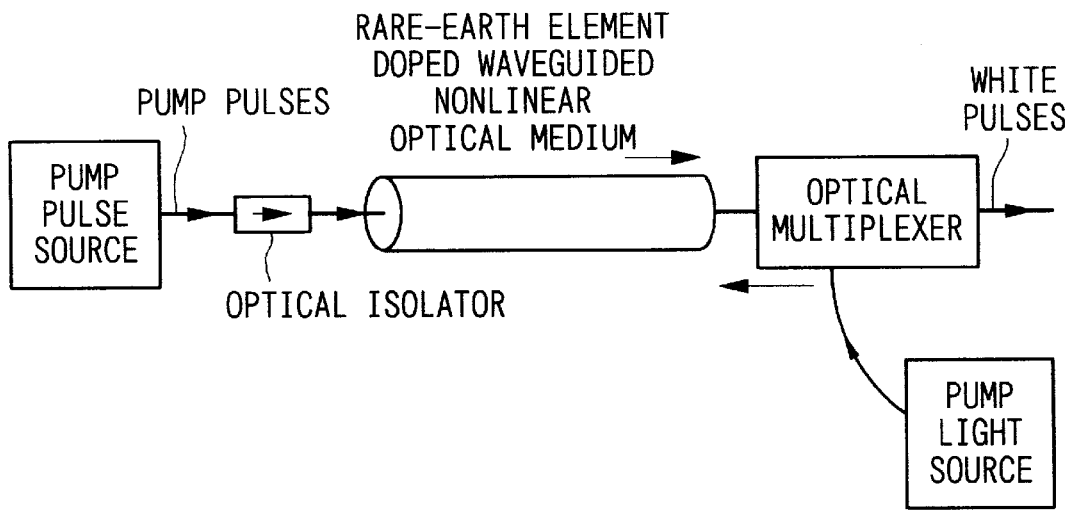
FIG. 22 is a schematic configuration of an equalized-output white pulse source in Embodiment 6.

FIG. 22 is a schematic configuration of a white pulse source in Embodiment 6. The white pulse source is comprised by: a pump pulse source; a rare-earth-doped waveguided nonlinear optical medium; a pump source for generating pump light to cause a population inversion in the rare-earth-dope optical medium; and a wavelength-division optical multiplexer for inputting pump light into an output end of the rare-earth-doped optical medium; and an optical isolator to prevent the pump light which has propagated backward the rare-earth-doped optical medium to be input into the pump pulse source or to prevent the optical medium to oscillate like a laser.

It is permissible to combine Embodiment 5 (forward pumping configuration) with Embodiment 6 (backward pumping configuration). It is also permissible to replace the rare-earth-doped optical medium with an optical medium to produce Raman amplification, and input the pump light into such a Raman gain optical medium.

Also, in the configurations used in Embodiments 4~6, amplification action can be stabilized by providing an optical isolating means to prevent reflection of light back into the pump pulse source or the optical medium which causes laser oscillation in the optical medium.

S1E7 Other Configurations for White Pulse Source

In each of the foregoing embodiments, it is possible to stabilize the polarization of the output white pulses by providing the waveguided nonlinear optical medium with polarization-maintaining property.

Also, in each of the foregoing embodiments, it is permissible to provide an optical amplifier to amplify pump pulses before the input end of the optical medium 2. This will enable to generate white pulses even by using a pump pulse source with low power output.

The peak observed in the white pulse spectrum at the center wavelength $\lambda 0$ of the pump pulse corresponds to the pedestal of the pump pulse which did not convert to white pulses.

In each of the foregoing embodiments, it is permissible to provide a wavelength filter to eliminate or suppress the peak at the pump pulse wavelength at the output end of the optical medium. This enables to eliminate or suppress the peak whose optical power density is higher than that of the white pulse.

Summarizing the fundamentals of the foregoing embodiments, the present white pulse source is characterized by: 1) having an optical medium in which the chromatic dispersion of pump pulses at the center wavelength λ0 diminishes from a positive value to a vicinity of zero ps/nm/km in the direction of propagation of the pump pulse; and 2) the chromatic dispersion characteristic has a maximum value when chromatic dispersion at wavelength λ0 is in the vicinity of zero ps/nm/km, and has two zero-dispersion wavelengths when the maximum value is positive. This structure prompts the spectrum of the input pump pulses to be broadened through soliton compression and to become rectangular and flat through a process in which a soliton pulse changes into a dispersive wave.

By utilizing an optical medium with optical gain for the waveguided nonlinear optical medium, white pulses can be produced under less restrictive conditions of lower power of pump pulse or shorter length of optical medium.

Section 2: Stable-output White Pulse Sources

First, important features of the white pulse sources described in this section will be explained.

The white pulse sources in this sections produce white pulses with low noise by controlling the pump pulse power to reduce the noise coefficient in the course of the white pulse generation, according to a relation of noise coefficient to the pump pulse power.

The relation between the noise coefficient in white pulse generation and the pump pulse power into the optical medium will be explained. The noise coefficient is defined as a ratio of power fluctuation components included in the white pulses (wavelength components) generated from the optical medium to power fluctuation components included in the pump pulse.

Figure 32:
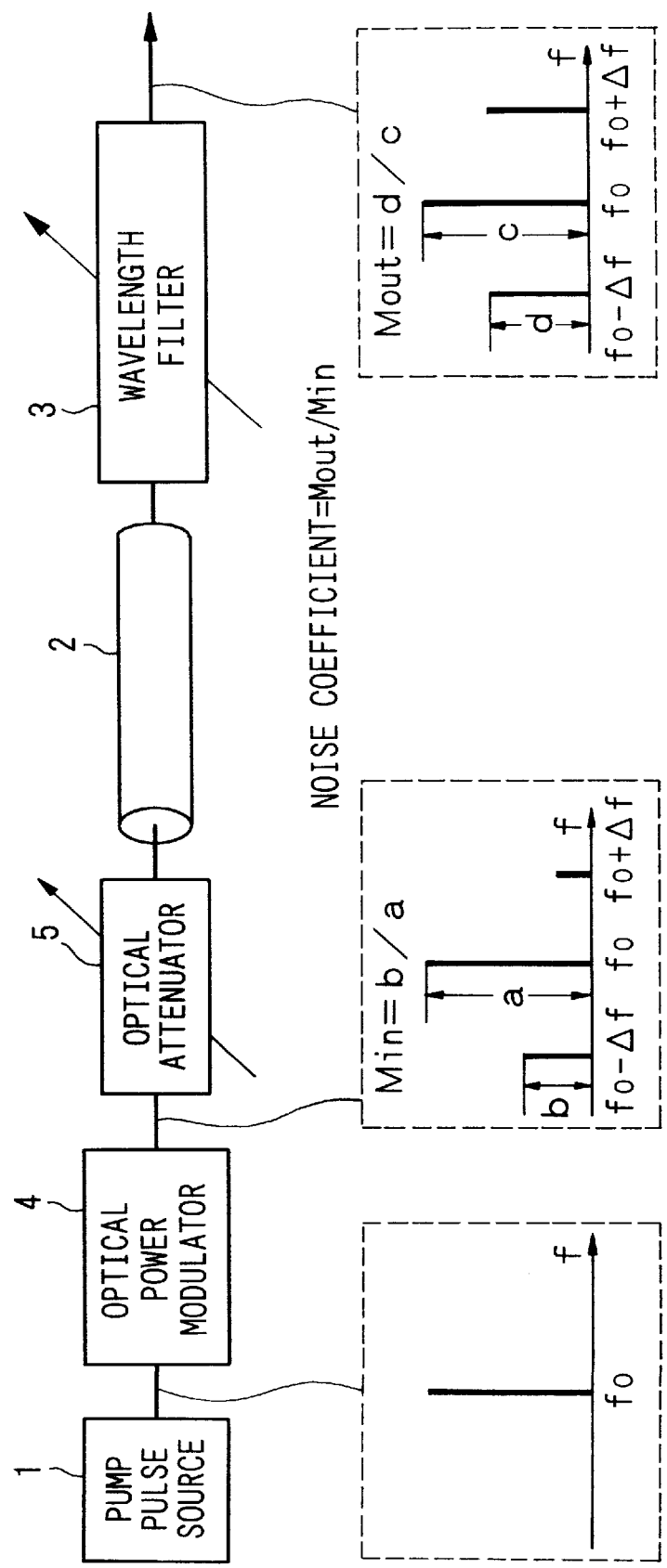
FIG. 32 is a schematic configuration of the experimental setup for measuring the noise coefficient.

FIG. 32 is a schematic configuration for determining the noise coefficient in white pulse generation. The pump pulse source 1 generates pump pulses at a repetition frequency f0. This pump pulse is superimposed with a power fluctuation component (frequency Δf, modulation index $M_{in}$) in an optical power modulator 4, and is input into the optical medium 2 at a given optical power through an optical attenuator 5. When the white pulse output from the optical medium 2 is filtered through a wavelength filter 3, the filtered white pulse contains a fluctuation component (modulation index $M_{out}$). A noise coefficient for each wavelength component in a white pulse is obtained as a ratio, $M_{out}/M_{in}$, of the output modulation index $M_{out}$ to the input modulation index $M_{in}$.

In FIG. 32, it is shown that the modulation index $M_{in}$ is defined as a ratio b/a, where b is the fluctuation component at frequencies f0±Δf and a is the carrier component at repetition frequency f0, and $M_{out}$ is defined as a ratio d/c, where d is the fluctuation component at frequencies f0±Δf and c is the carrier component at repetition frequency f0.

Figure 33:
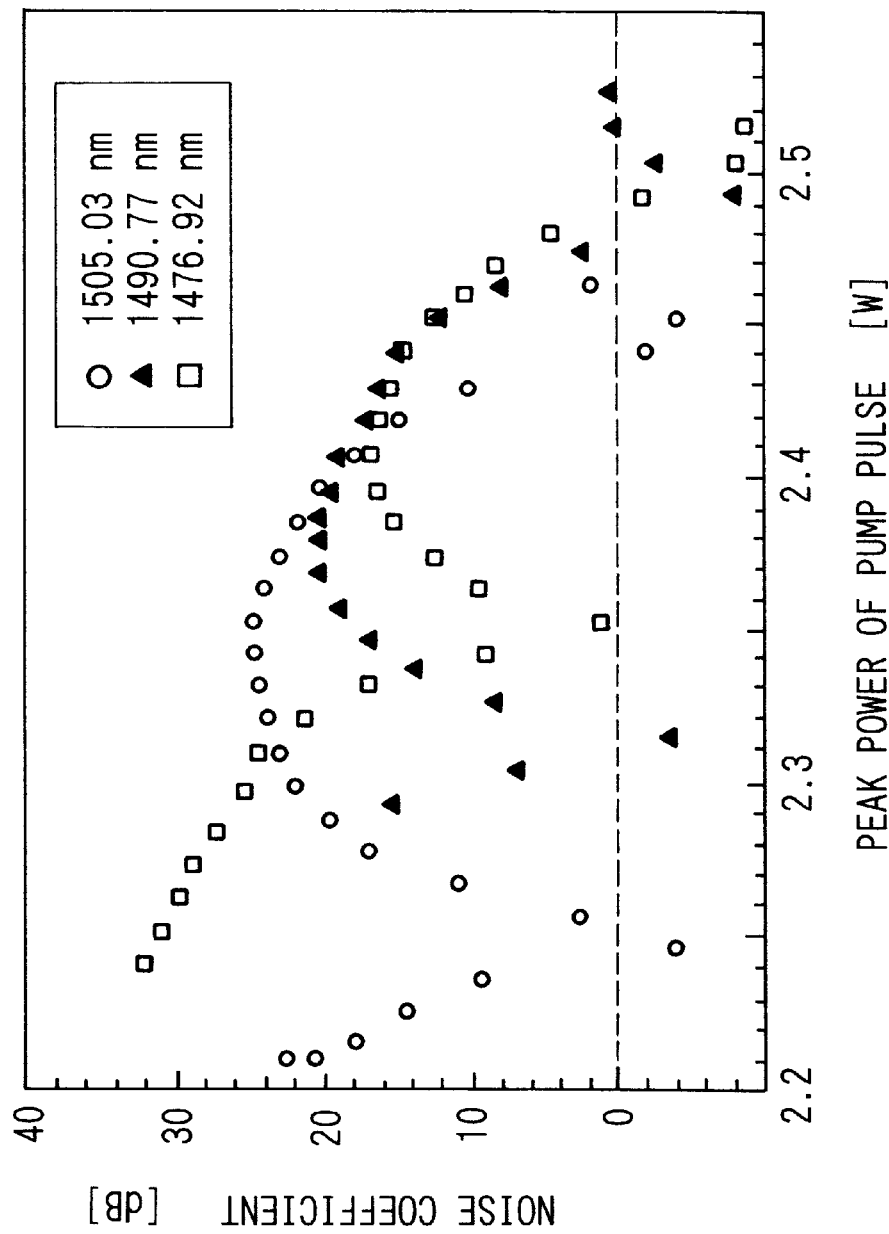
FIG. 33 is an example of the measurement results of the noise coefficient depending on the peak power of pump pulses for different wavelengths.

FIG. 33 is an example of the measurement results of noise coefficient in the white pulses to peak power of pump pulse obtained by the arrangement in FIG. 32. The values shown in FIG. 33 are actual measurements of the noise coefficients obtained by filtering the white pulses at different wavelengths. The center wavelength of the pump pulse is 1535 nm.

The relation of the noise coefficient to the pump pulse power is dependent on the pulse width of the pump pulse and the chromatic dispersion characteristics in the optical medium, but commonly, the plots of the noise coefficient to the pump pulse power show the following features.

As indicated in FIG. 33, the noise coefficient shows local minima with respect to pump pulse power, and the pump pulse powers where the noise coefficient has local minima shift upwards as the wavelength of the filtered white pulse shifts further from the pump wavelength. For example, at a wavelength 1505.03 nm (indicated by circles), the noise coefficient has local minima at around 2.25 and 2.45 W, but for a wavelength 1476.92 nm (squares), it has the corresponding local minima at around 2.35 and 2.51 W. It was also observed that the higher the pump pulse power, the smaller the noise coefficient as a whole for each wavelength component.

When the noise coefficient is higher than 0 dB, power fluctuations in the pump pulse are amplified and transferred to the wavelength components in the white pulse, therefore, the waveform of the white pulse becomes distorted and the signal/noise ratio is degraded. If the noise coefficient is less than 0 dB, power fluctuation in the pump pulse are suppressed and barely transferred to the wavelength components in the white pulses, therefore, the waveform is not distorted and the signal/noise ratio is rather improved.

Based on the relation of noise coefficient during the white pulse generation to pump pulse power described above, it is possible to reduce the noise component in the white pulses produced by controlling the pump pulse power, thereby producing low-noise white pulses of a stable output power.

In the following, the white pulse sources developed in this section will be described in more detail.

Figure 30:
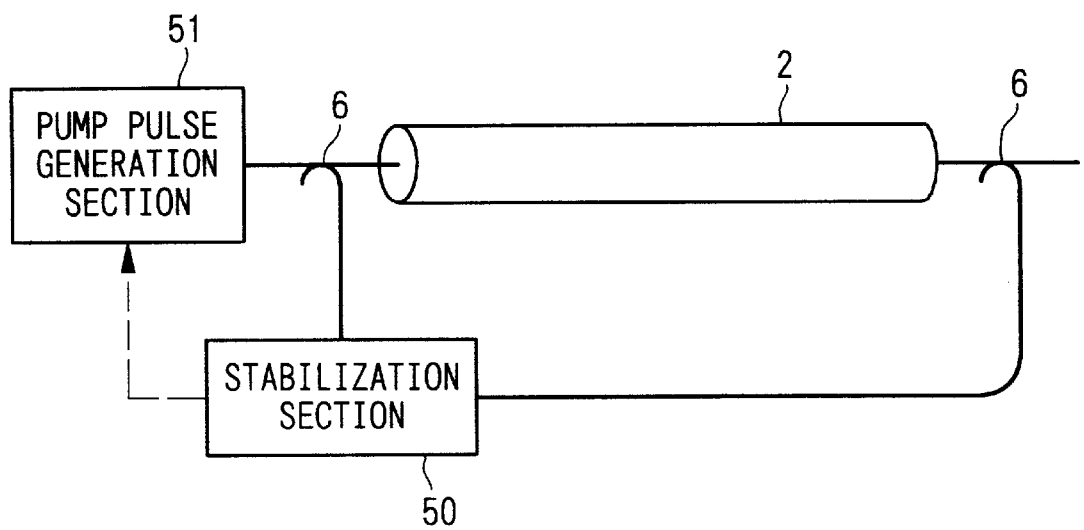
FIG. 30 is a block diagram of the basic configuration of the stable-output white pulse source of the present invention.

FIG. 30 is a schematic configuration of a stable-output white pulse source which inputs pump pulses generated in a pump pulse generation section 51 into the optical medium 2, and a stabilization section 50 is further provided to stabilize the optical power of white pulses output from the optical medium 2.

The stabilization section 50 is provided with a function to control the optical power of pump pulse to be input into the optical medium 2 to reduce the noise component in the output white pulses according to the relation of the noise coefficient of the white pulses generated in the optical medium 2 to optical power of the pump pulses. Also, an optical branching section 6 is provided before the input end, or after the output end or on both ends of the optical medium 2 for the purpose of monitoring the optical power by the stabilization section 50 to obtain noise coefficients. The stabilization section 50 stabilizes the output power of the white pulses by controlling the pump pulse generation section 51 according to the noise coefficient thus obtained, thereby reducing the noise in the white pulses.

In the following, preferred embodiments of the stable-output white pulse source will be discussed in detail.

S2E1 Embodiment 1 in Section 2

Figure 31:
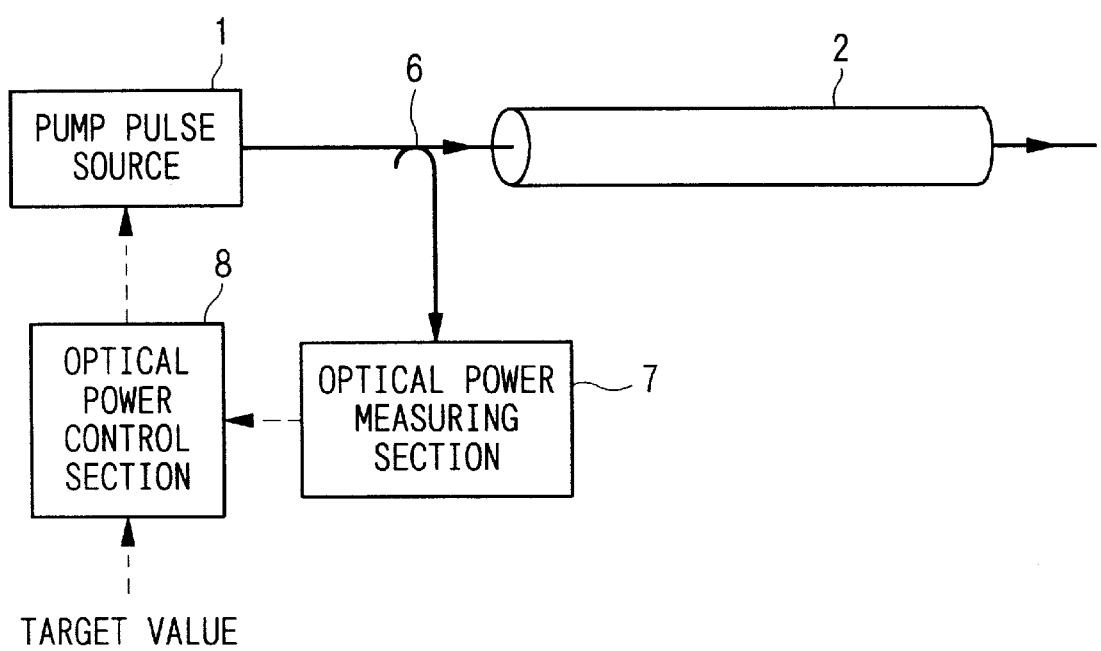
FIG. 31 is a block diagram of a configuration of the stable-output white pulse source in Embodiment 1 in Section 2.

FIG. 31 shows a stable-output white pulse source of Embodiment 1.

In this embodiment, the pump pulse generation section 51 shown in FIG. 30 is comprised by: a pump pulse source 1 which is capable of adjusting the output power; and the stabilization section 50 shown in FIG. 30 is comprised by an optical power measuring section 7 to monitor the optical power of pump pulses through a branching section 6 before the input end of the optical medium 2, and an optical power control section 8 to control the output power from the pump pulse source 1 so as to adjust the optical power of the pump pulses input into the optical medium 2 to be at a target value. The relation of the noise coefficient to the pump pulse power is predetermined, and the target value is selected to reduce the noise in the white pulses according to the pre-determined relation.

For example, when this relation is as shown in FIG. 33, the pump pulse power is adjusted to be in the vicinity of 2.25 or 2.45 W to reduce the noise coefficient at wavelength 1505.03 nm to its lowest value. Similarly, for 1490.77 nm wavelength, the pump pulse power is adjusted to be in the vicinity of 2.31 or 2.49 W; and for 1476.92 nm wavelength, the power is adjusted to be 2.35 or 2.51 W. To produce white pulses with overall low noise level, the pump pulse power is adjusted to be about 2.5 W Optical power control section 8 adjusts the pump pulse power to be a target value by comparing the target value with the power level monitored by the optical power measuring section 7 and feeding-back any difference to the pump pulse generation section 51.

S2E2 Embodiment 2

In Embodiment 1, the pump pulse generation section 51 is comprised by a pump pulse source whose output power is adjustable, but in Embodiment 2, the pump pulse generation section 51 is comprised by a pump pulse source and an in-line optical power adjusting section which controls the optical power of pump pulses to be input into the optical medium 2.

Figure 34A:
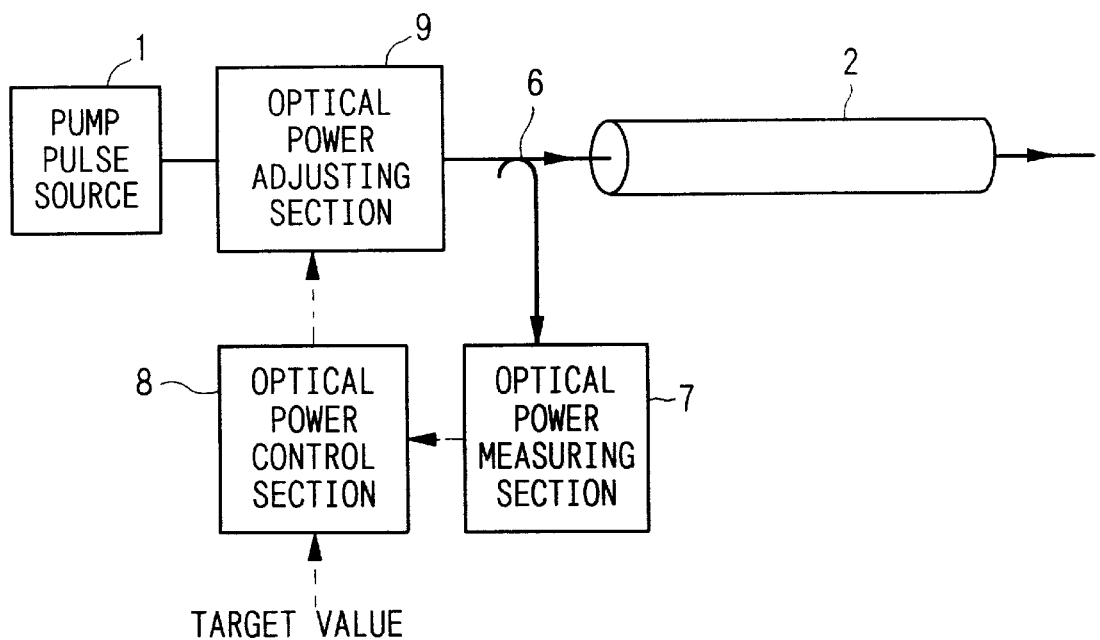
FIGS. 34A and 34B are a block diagrams of the stable-output white pulse source in Embodiment 2 in Section 2.
Figure 34B:
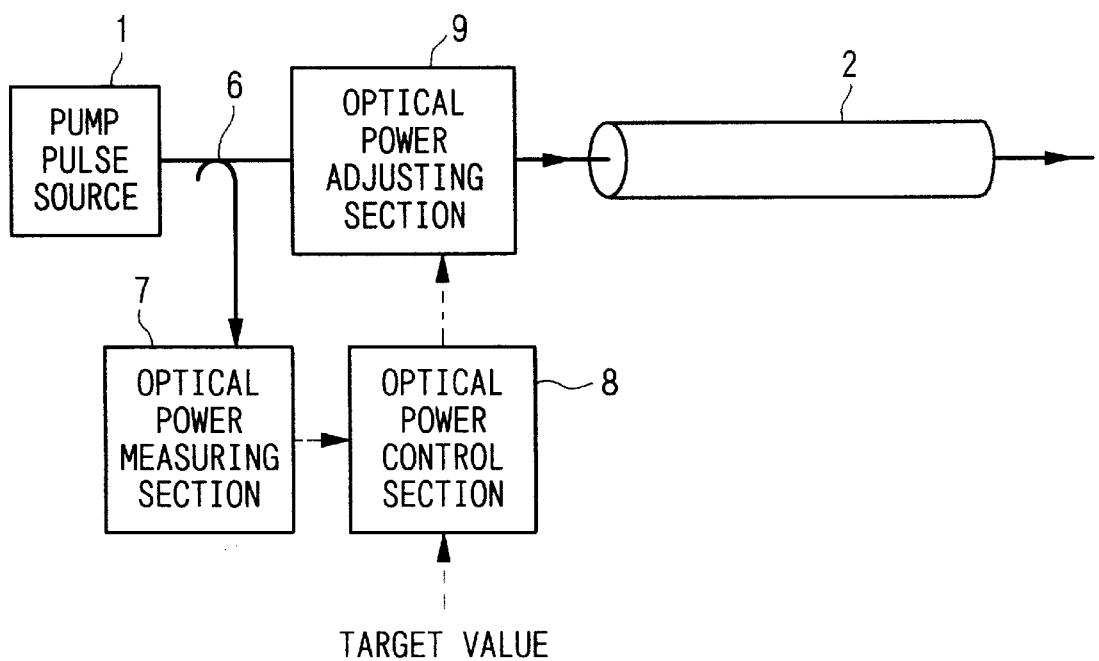

FIG. 34A, 34B show schematic configurations of a second embodiment of the stable-output white pulse source. FIG. 34A shows a feed-back scheme and FIG. 34B shows a feed-forward scheme. The stabilization section 50 is comprised by an optical power measuring section 7 and an optical power control section 8.

Pump pulse generated in the pump pulse source 1 is input through the optical power adjusting section 9 into the optical medium 2 which outputs white pulses. The optical power of the pump pulses is monitored by the optical power measuring section 7 through the optical branching section 6 disposed on the fore- or aft-stage of the optical power adjusting section 9. The optical power control section 8 controls the power adjusting section 9 to minimize the difference between a optical power of pump pulses monitored by the power measuring section 7 and a target value so that the pump pulse power input into the optical medium 2 is at the target value. Also, the optical power adjusting section 9 may use either or both of optical ampliiying device or optical attenuating device.

S2E3 to S2E8

This section describes Embodiments 3 to 8 in Section 2. In Embodiments 1 and 2, the relation of noise coefficient to pump pulse power was pre-determined and a target value of pump pulse power was selected to reduce the noise coefficient. In Embodiments S2E3~S2E8, fluctuation components are deliberately superimposed on the pump pulses and the noise coefficient is measured in real-time, so that the pump pulse power can be feedback-controlled according to the measured noise coefficient.

Figure 35:
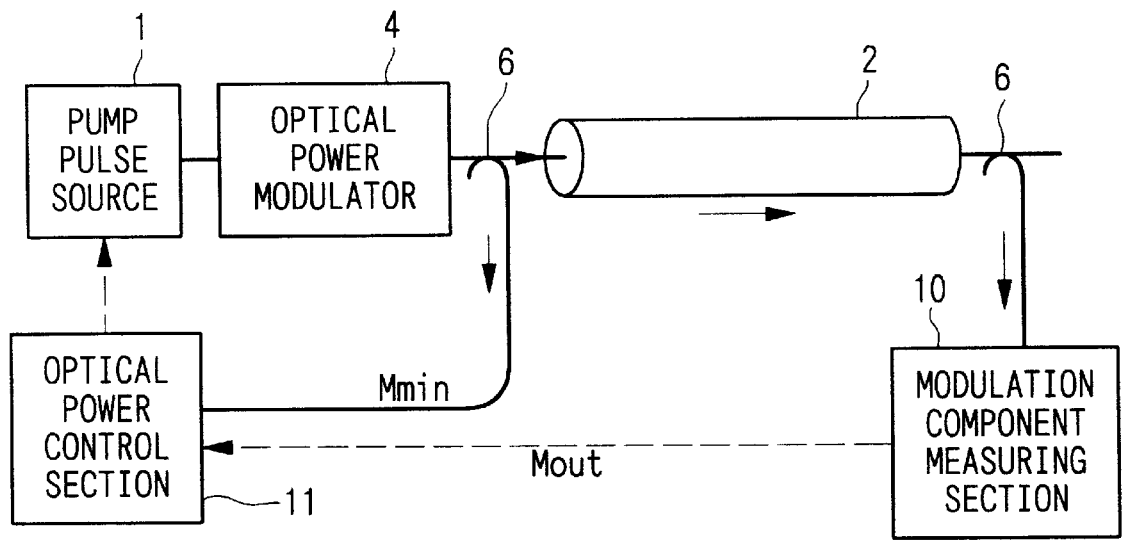
FIG. 35 is a block diagram of the stable-output white pulse source in Embodiment 3 in Section 2.

FIG. 35 shows Embodiment 3 in Section 2.

In this embodiment, the pump pulse generation section 51 shown in FIG. 30 is comprised by: a pump pulse source 1 which is capable of adjusting the output power and an optical power modulator 4; and the stabilization section 50 shown in FIG. 30 is comprised by an optical power control section 11 and a modulation component measuring section 10.

Pump pulses generated in the pump pulse source 1 are input through the optical power modulator 4 to superimpose a power fluctuation of a given level of modulation index $M_{in}$ into the optical medium 2 which generates white pulses. The modulation index $M_{out}$ contained in the output white pulses is measured by the modulation component measuring section 10 through an optical branching section 6 after the output end of the optical medium 2. Optical power control section 11 figures out a noise coefficient as a ratio $M_{out}/M_{in}$, and controls the pump pulse source 1 to minimize the noise coefficient related to pump pulse power.

Figure 36:
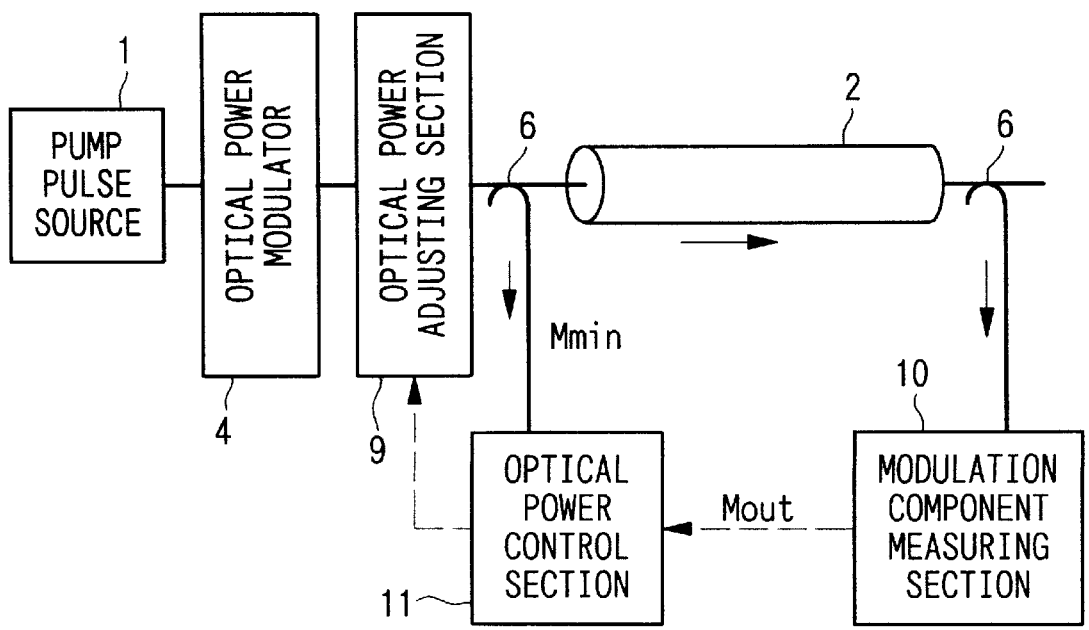
FIG. 36 is a block diagram of the stable-output white pulse source in Embodiment 4 in Section 2.

FIG. 36 shows Embodiment 4 in Section 2.

In this embodiment, the pump pulse generation section 51 shown in FIG. 30 is comprised by: a pump pulse source 1, an in-line optical power adjusting section 9, and an optical power modulator 4; and the stabilization section 50 shown in FIG. 30 is comprised by an optical power control section 11 and a modulation component measuring section 10.

Pump pulses output from the pump pulse source 1 are input through the optical power modulator 4 to superimpose a power fluctuation of a given level of modulation index $M_{in}$ and are then input through an optical power adjusting section 9, into the optical medium 2 which generates white pulses. The modulation index $M_{out}$ contained in the output white pulses is measured by monitoring the optical power of the white pulse in the modulation component measuring section 10 through an optical branching section 6 after the output end of the optical medium 2. Optical power control section 11 figures out a noise coefficient as a ratio $M_{out}/M_{in}$, and controls the optical power adjusting section 9 to minimize the noise coefficient related to pump pulse power. Also, the optical power control section 9 may use either or both of optical amplifier device or optical attenuator device.

In FIG. 36, the optical power adjusting section 9 is located before the optical power modulation device 4, but it is permissible to locate the optical power modulation device 4 after the optical power adjusting section.

In Embodiments 5 and 6, the modulation index $M_{in}$ to be superimposed on the pump pulse at the input side of the optical medium 2 is made constant. In this case, the pump pulse power is adjusted according to the modulation index $M_{out}$ because the noise coefficient corresponds to the modulation index $M_{out}$ contained in the white pulses.

Figure 37:
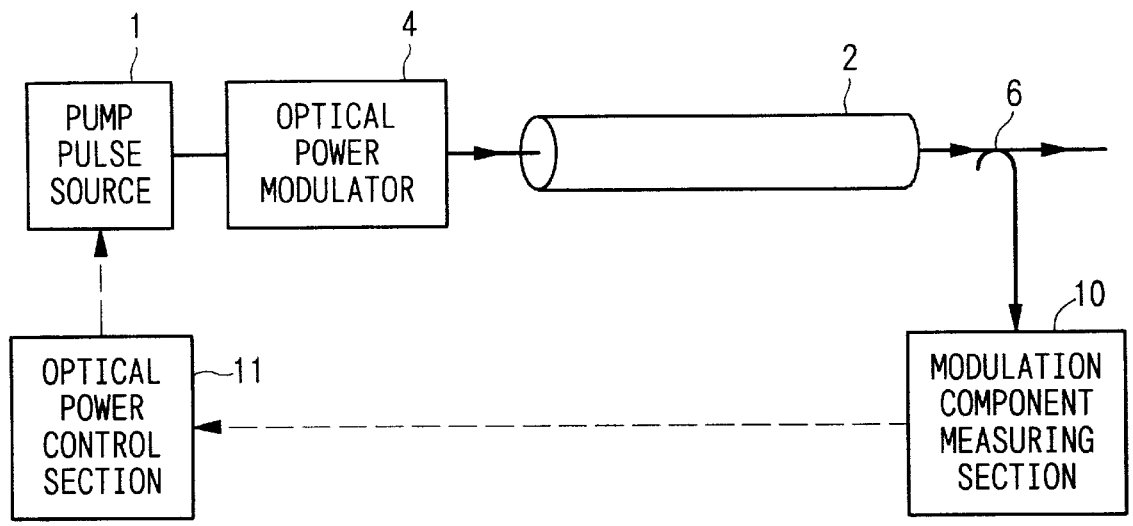
FIG. 37 is a block diagram of the stable-output white pulse source in Embodiment 5 in Section 2.

FIG. 37 shows Embodiment 5 in Section 2.

In this embodiment, the pump pulse generation section 51 shown in FIG. 30 is comprised by: a pump pulse source 1 which is capable of adjusting the output power and an optical power modulator 4; and the stabilization section 50 shown in FIG. 30 is comprised by an optical power control section 11 and a modulation component measuring section 10.

Pump pulses generated in the pump pulse source 1 are input through the optical power modulator 4 to superimpose a power fluctuation of a given level of modulation index $M_{in}$, and into the optical medium 2 which generates white pulses. The modulation index $M_{out}$ contained in the output white pulses is measured by monitoring the optical power of the white pulse in the modulation component measuring section 10 through an optical branching section 6 after the output end of the optical medium 2. Optical power control section 11 controls the pump pulse source 1 to minimize the modulation index $M_{out}$ of the white pulses being measured by the modulation component measuring section 10, and adjusts the pump pulse power to be input into the optical medium 2.

Figure 38:
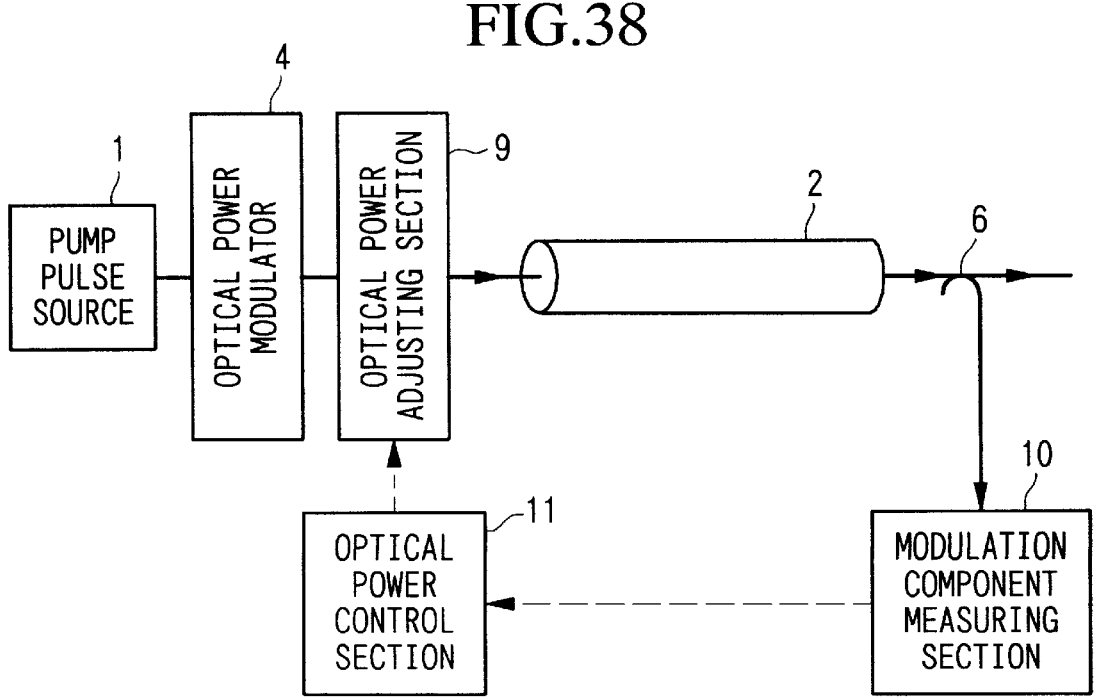
FIG. 38 is a block diagram of the stable-output white pulse source in Embodiment 6 in Section 2.

FIG. 38 shows Embodiment 6 in Section 2.

In this embodiment, the pump pulse generation section 51 shown in FIG. 30 is comprised by: a pump pulse source 1, an in-line optical power adjusting section 9, and an optical power modulator 4; and the stabilization section 50 shown in FIG. 30 is comprised by an optical power control section 11 and a modulation component measuring section 10.

Pump pulses generated in the pump pulse source 1 are input through the optical power modulator 4 to superimpose a power fluctuation of a given level of modulation index $M_{in}$ and are then input through the optical power adjusting section 9, into the optical medium 2 which generates white pulses. The modulation index $M_{out}$ contained in the output white pulses is measured by moninoring the optical power of the white pulse in the modulation component measuring section 10 through an optical branching section 6 after the output end of the optical medium 2. Optical power control section 11 controls the optical power adjusting section 9 to minimize the modulation index $M_{out}$ of the white pulses being measured by the modulation component measuring section 10, and adjusts the pump pulse power to be input into the optical medium 2. Also, the optical power control section 9 may use either or both of optical amplifying device or optical attenuating device.

In FIG. 38, the optical power adjusting section 9 is located before the optical power modulation device 4, but it is permissible to locate the optical power modulation device 4 after the optical power adjusting section.

Embodiments 3~6 utilized modulation index $M_{out}$ of the white pulses, i.e., overall values of the modulation index for all wavelengths are being measured. Thus, the pump pulse power is controlled so as to achieve overall low noise in the white pulses. In contrast, Embodiments 7 and 8 presented in the following are directed to controlling the pump pulse power to minimize the noise in a particular wavelength component in the white pulse. In these embodiments, the configurations correspond to those used in Embodiments 5 and 6, but this technique can be applied equally well to the configurations in Embodiments 3 and 4.

Figure 39:
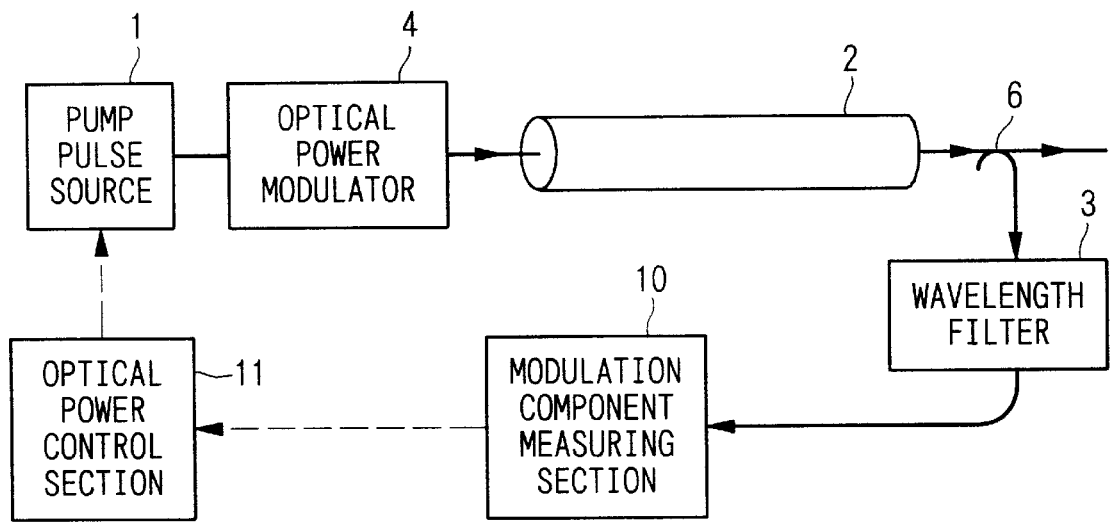
FIG. 39 is a block diagram of the stable-output white pulse source in Embodiment 7 in Section 2.

FIG. 39 shows Embodiment 7 in Section 2.

In this embodiment, the pump pulse generation section 51 shown in FIG. 30 is comprised by: a pump pulse source 1 which is capable of adjusting the output power and an optical power modulator 4; and the stabilization section 50 shown in FIG. 30 is comprised by an optical power control section 11, a modulation component measuring section 10 and a wavelength filter 3.

The feature of this embodiment is that white pulses split in the optical branching section 6 (refer to FIG. 37) is monitored by the modulation component measuring section 10 through a wavelength filter 3 having a specific wavelength band. The modulation component measuring section 10 measures a modulation component for the wavelength band transmitted through the optical filter 3, therefore, the noise component in the white pulses is minimized particularly in the wavelength band designated by the wavelength filter 3.

Figure 40:
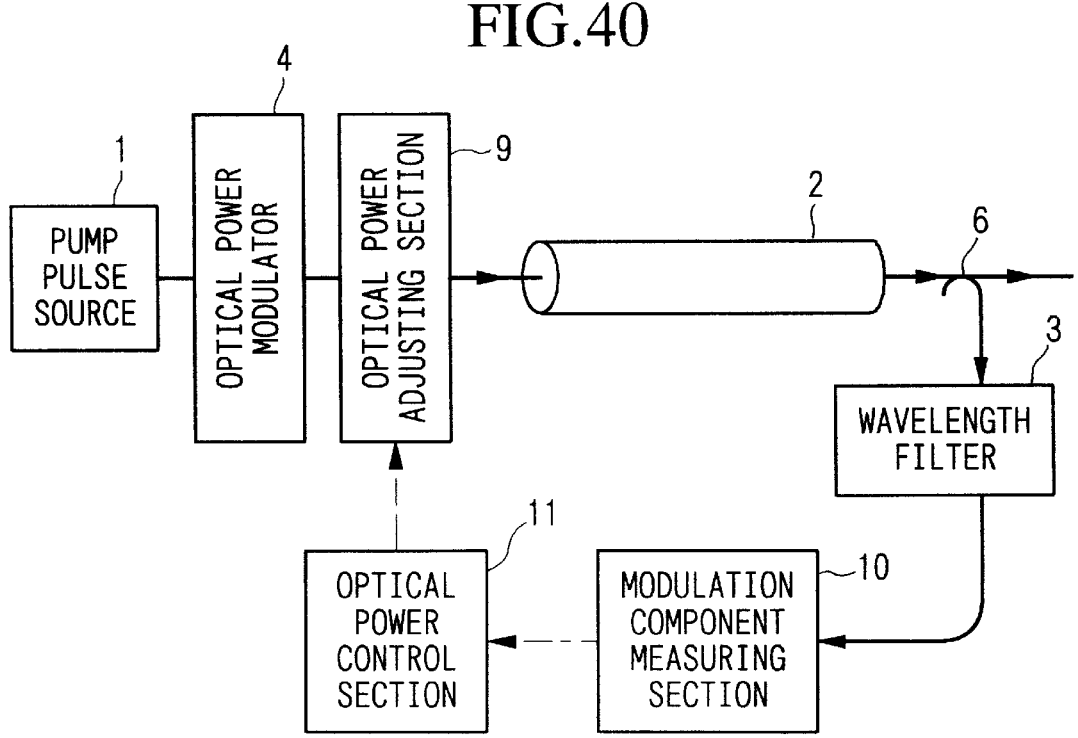
FIG. 40 is a block diagram of the stable-output white pulse source in Embodiment 8 in Section 2.

FIG. 40 shows Embodiment 8 in Section 2.

In this embodiment, the pump pulse generation section 51 shown in FIG. 30 is comprised by: a pump pulse source 1, an in-line optical power adjusting section 9, and an optical power modulator 4; and the stabilization section 50 shown in FIG. 30 is comprised by an optical power control section 11, a modulation component measuring section 10 and a wavelength filter 3.

The feature of this embodiment is that white pulses split in the optical branching section 6 (refer to FIG. 38) is monitored by the modulation component measuring section 10 through a wavelength filter 3 having a specific wavelength band. The modulation component measuring section 10 measures a modulation component for the wavelength band transmitted through the optical filter 3, therefore, the noise component in the white pulses is minimized particularly in the wavelength band designated by the wavelength filter 3.

FIG. 40 shows the optical power adjusting section after the optical power modulator 4, but it can be placed before the modulator 4.

S2E9 and S2E10

The section presents Embodiments 9 and 10 in Section 2.

Embodiments 9, 10 directly measure the noise components in white pulses to control the pump pulse power and to reduce the noise components. The noise components originate from the pump pulse source, and are transferred from the pump pulses to the white pulses in the course of the white pulse generation.

Figure 41:
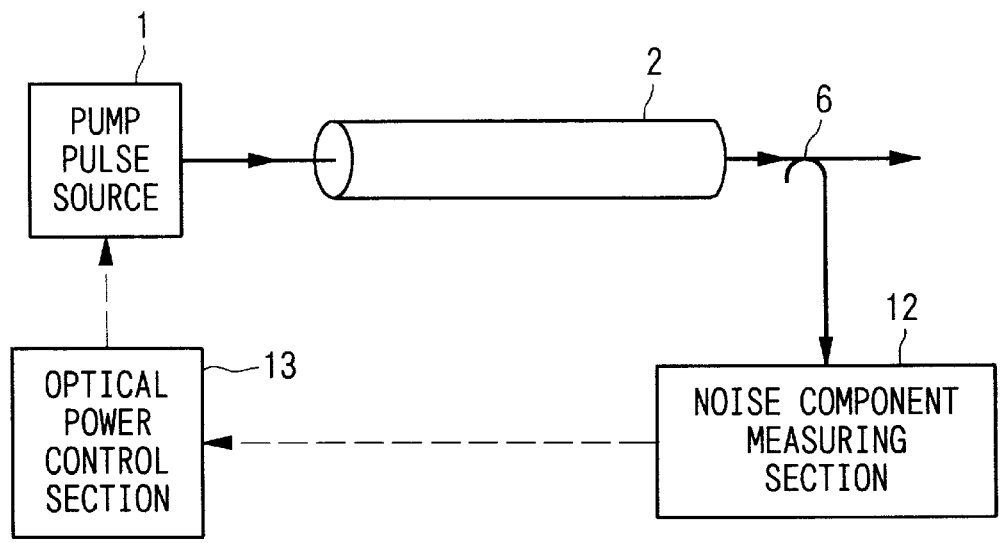
FIG. 41 is a block diagram of the stable-output white pulse source in Embodiment 9 in Section 2.

FIG. 41 shows Embodiment 9 in Section 2.

In this embodiment, the pump pulse generation section 51 shown in FIG. 30 is comprised by: a pump pulse source 1 which is capable of adjusting the output power; and the stabilization section 50 shown in FIG. 30 is comprised by an optical power control section 13 and a noise component measuring section 12.

Pump pulses generated in the pump pulse source 1 are input into the optical medium 2 which generates white pulses. The noise components contained in the output white pulses is measured by monitoring the optical power of the white pulse in the noise component measuring section 12 through an optical branching section 6 after the output end of the optical medium 2. Optical power control section 13 controls the pump pulse source 1 to minimize the noise component of the white pulses being measured by the noise component measuring section 12, and adjusts the pump pulse power to be input into the optical medium 2.

Figure 42:
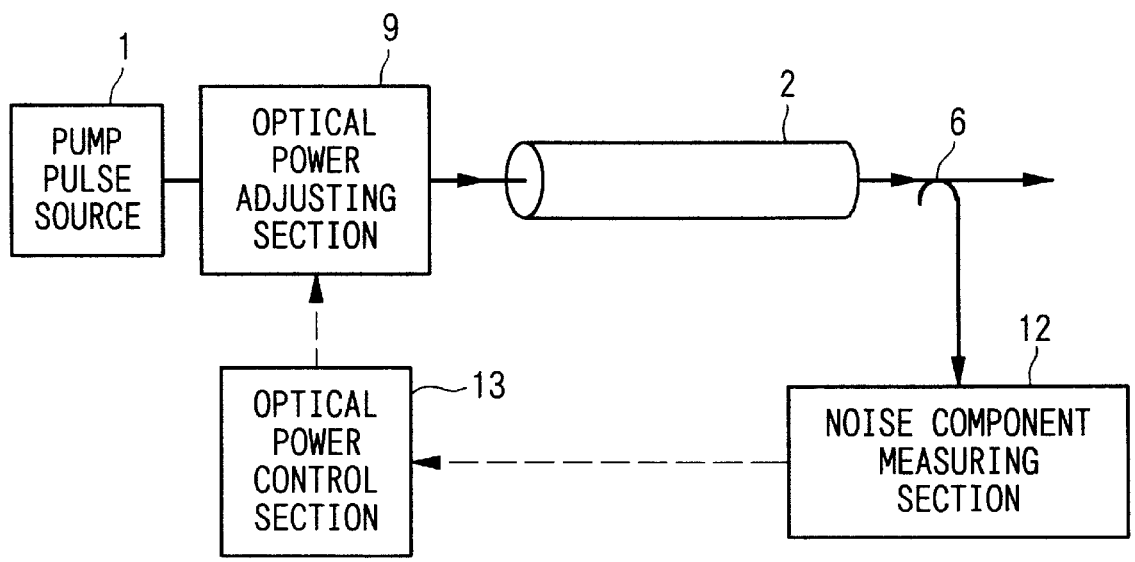
FIG. 42 is a block diagram of the stable-output white pulse source in Embodiment 10 in Section 2.

FIG. 42 shows Embodiment 10 in Section 2.

In this embodiment, the pump pulse generation section 51 shown in FIG. 30 is comprised by: a pump pulse source 1, and an in-line optical power adjusting section 9; and the stabilization section 50 shown in FIG. 30 is comprised by an optical power control section 13 and a noise component measuring section 12.

Pump pulses generated in the pump pulse source 1 are input, through the optical power adjusting section 9, into the optical medium 2 which generates white pulses. The noise components contained in the output white pulses is measured by monitoring the optical power of the white pulse in the noise component measuring section 12 through an optical branching section 6 after the output end of the optical medium 2. Optical power control section 13 controls the optical power adjusting section 9 to minimize the noise component of the white pulses being measured by the noise component measuring section 10, and adjusts the pump pulse power to be input into the optical medium 2. Also, either or both optical amplifier and optical attenuator may be used in the optical power control section 9.

It is permissible to apply the configurations used for Embodiments 7 and 8 to Embodiments 9, 10 to control the noise in the white pulses, by disposing a wavelength filter 3 between the optical branching section 6 after the output end of the optical medium 2 and the noise component measuring section 12.

S2E11 Embodiment 11

In each of the foregoing embodiments 2, 4, 6, 8 and 10 in Section 2, it is also permissible to input with external pump pulses for generating white pulses.

Figure 45:
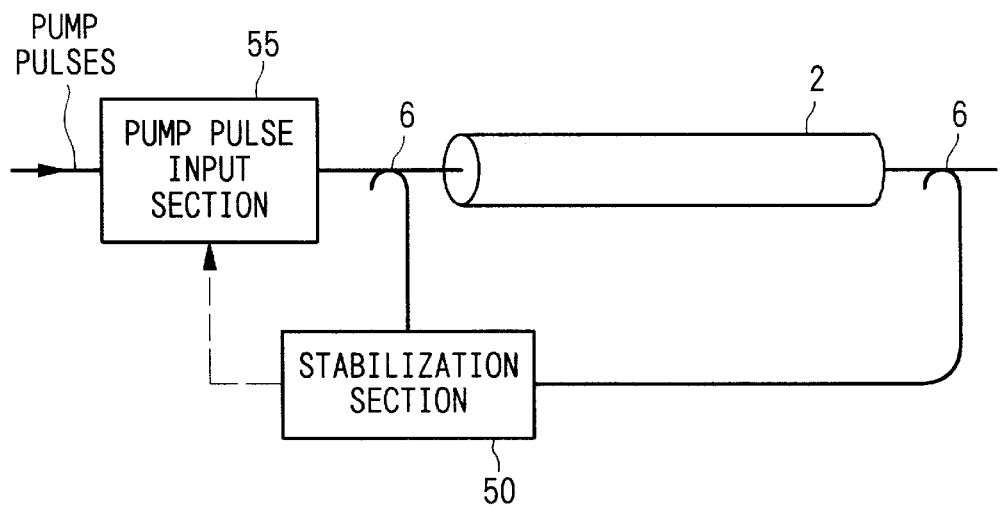
FIG. 45 is a block diagram of the stable-output white pulse source in Embodiment 11 in Section 2.

FIG. 45 shows Embodiment 11 in Section 2 which accepts external pump pulses through a pump pulse input section 55 into the optical medium 2, and a stabilization section 50 is provided to stabilize the optical power of white pulses output from the optical medium 2.

As is mentioned in those corresponding embodiments 2, 4, 6, 8 and 10, the stabilization section 50 is provided with a function to control the pump pulse input section 55 to adjust optical power of pump pulse to be input into the optical medium 2 to reduce the noise component in the output white pulses according to the relation of the noise coefficient of the white pulses generated in the optical medium 2 to optical power of the pump pulses.

Section 2a Noise Components Measuring Method

Figure 43:
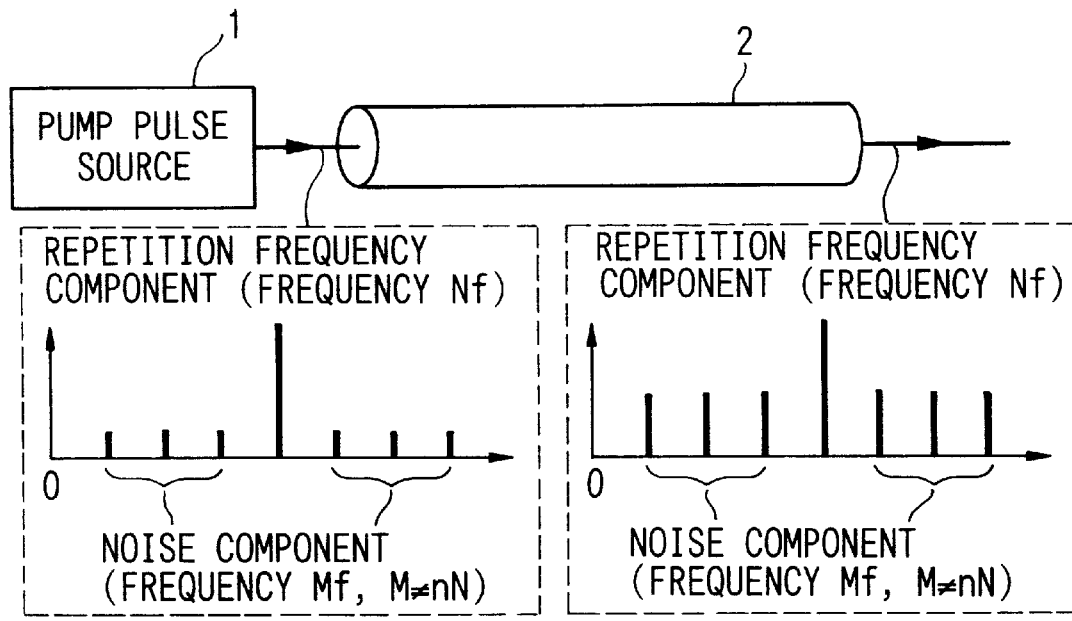
FIG. 43 is an example of noise components in a harmonically mode-locked laser as a pump pulse source.

FIG. 43 shows an example of measuring the noise components output from a white pulse source utilizing a harmonically mode-locked pulse laser as a pump pulse source.

This method is valid when using a harmonically mode-locked pulse laser generating repetition frequency components Nf (where f is fundamental mode frequency and N is an integer larger than 2) as the pump pulse source 1. Frequency components other than the repetition frequency components or their harmonic components nNf(n is an integer) contribute as intensity noise to the output pump pulses, therefore, these frequency components Mf(M is an integer other than nN) are monitored and the pump pulse power is adjusted to minimize components at frequencies Mf in the white pulses.

Figure 44:
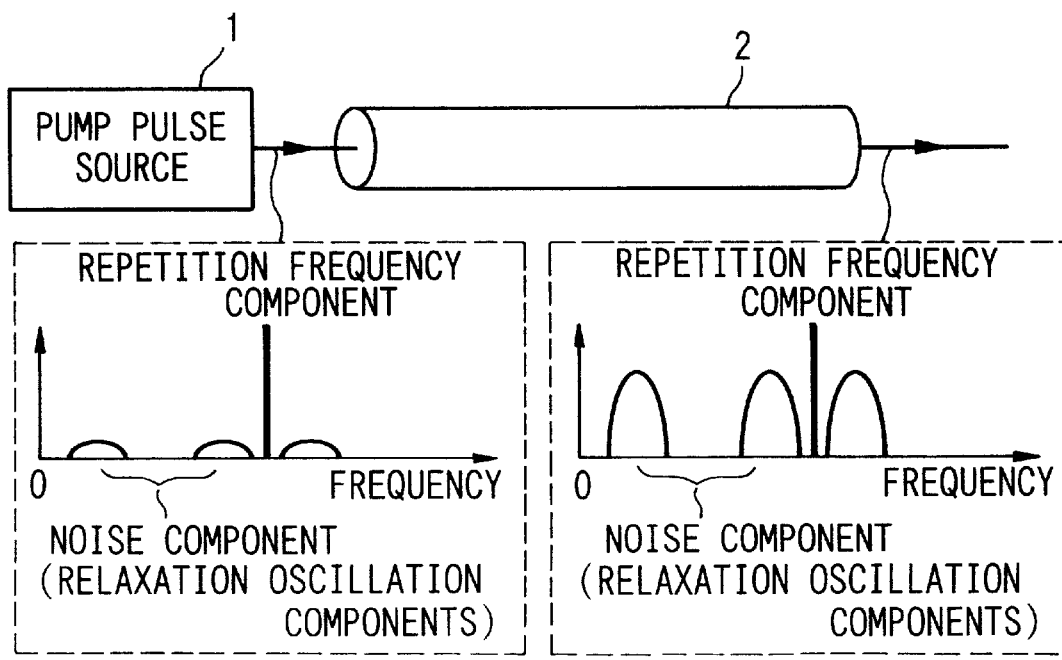
FIG. 44 is another example of low-frequency noise components in a mode-locked laser as a pump pulse source.

FIG. 44 shows an example of measuring the low-frequency noise components output from a white pulse source.

This method is valid when using a mode-locked pulse laser as the pump pulse source 1. Spectral components at a relaxation oscillation frequency from such laser source contribute as low-frequency intensity noise, which can be monitored and used as a feedback flag to reduce its value.

Section 2b Other Embodiments

In each of the foregoing embodiments, by using a white pulse source which generates a equalized spectrum over a wide bandwidth, the wavelength-dependency of the spectrum of the output white pulses can be reduced considerably. Such a white pulse source, as explained in Section 1, can be realized by using a waveguided nonlinear optical medium 2 that exhibits a chromatic dispersion characteristics shown in FIGS. 1, 13 and 15.

In other words, the optical medium 2 should satisfy the requirements that: (1) the chromatic dispersion at the wavelength of the pump pulse decreases from positive value to less than zero in the propagation direction of the pump pulse; and (2) over the entire or partial range of propagation distance in the optical medium, the chromatic dispersion characteristic shows two zero-dispersion wavelengths, both of which approach the wavelength of the pump pulse with the propagation distance from the input end.

It will be recalled that FIG. 1 is an example of the chromatic dispersion characteristic where the center wavelength $\lambda 0$ of pump pulses coincides with the peak wavelength of the chromatic dispersion, and FIG. 12 is an example of the chromatic dispersion characteristic where the center wavelength $\lambda 0$ of pump pulses does not necessarily coincide with the peak wavelength of the chromatic dispersion, and FIG. 14 is an example in which the peak wavelength of the chromatic dispersion varies along the propagation direction.

By using a waveguided nonlinear optical medium designed according to the present embodiment, a stable-output white pulse source will be able to generate white pulses having a equalized-output optical power over a wide bandwidth.

Also, in each of the foregoing embodiments, it is possible to stabilize the polarization of the output white pulses by providing the waveguided nonlinear optical medium with polarization-maintaining property for generating stable-output white pulses.

Also, in each of the foregoing embodiments, it is permissible to provide an optical amplifier to amplify pump pulses before the input end of the optical medium 2. This will enable to generate white pulses even by using a pump pulse source with low power output.

In each of the foregoing embodiments, it is also permissible to provide a wavelength filter to eliminate or suppress the spectral peak at the pump pulse wavelength which corresponds to the pedestal of the pump pulse as described in Section 1. This enables to eliminate or suppress the spectral peak whose optical power density is higher than that of the white pulse.

Summarizing the above, the present stable-output white pulse source enables to minimize noise in the output white pulses by controlling the optical power of pump pulses input into the optical medium, thereby generating low-noise white pulses that are unaffected by the power fluctuations occurring in the pump pulses.

Section 3 Low-Noise Optical Pulses from White Pulse Sources

First, the features of the low-noise white pulse source in Section 3 will be explained.

A low-noise white pulse source filters out a specific wavelength from the output white pulses, and minimizes the noise coefficient at the specific wavelength by controlling the pump pulse power according to a relation of the noise coefficient to the pump pulse power in the white pulse generation.

As explained in regard to FIG. 33 in Section 2, the noise coefficient in the white pulse generation depends sensitively on the optical power of pump pulses, and there is a specific values of pump pulse power at which the noise coefficient is reduced to less than 0 dB. The pump pulse powers where the noise coefficient has local minima shift upwards as the wavelength of the filtered white pulse shifts further from the pump wavelength. For example, at a wavelength 1505.03 nm (indicated by circles), the noise coefficient has local minima at around 2.25 and 2.45 W, but for a wavelength 1476.92 nm (squares), it has the corresponding local minima at around 2.35 and 2.51 W.

Figure 48:
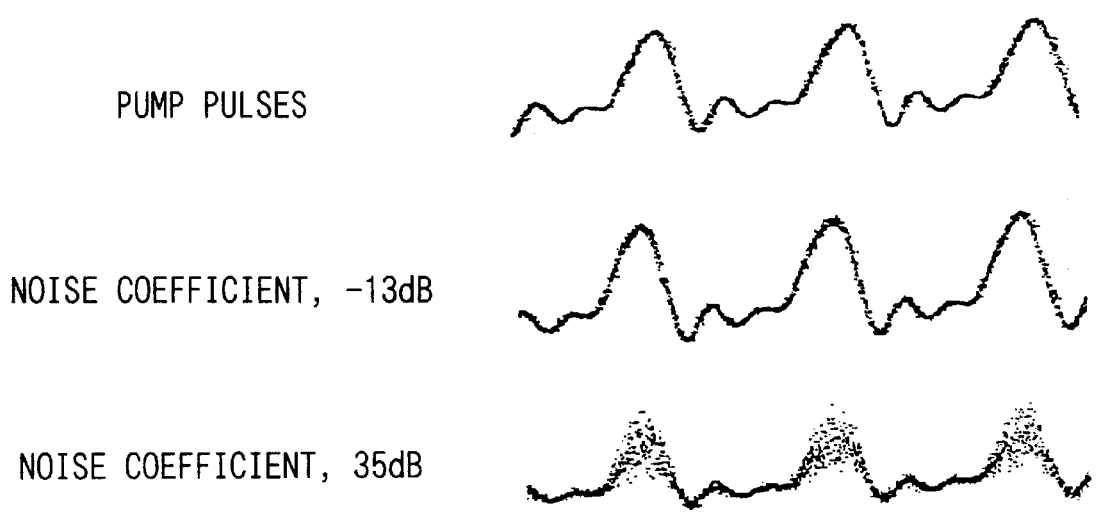
FIG. 48 illustrates the dependence of intensity fluctuation in optical pulses filtered from white pulses for different noise coefficients.

The signal to noise ratio of optical pulses obtained by filtering the white pulses at a specific wavelength is given by a product of the noise coefficient and the signal to noise ratio of the pump pulse, therefore, the level of the noise coefficient affects the purity of the optical pulses obtained by filtering the white pulses at a specific wavelength, as illustrated in FIG. 48. When the level of the noise coefficient is higher than 0 dB (35 dB in FIG. 48), the power fluctuation in the pump pulse is amplified and transferred onto the white pulses, so that the waveform of the optical pulse obtained by filtering from the white pulses is also seriously degraded. On the other hand, when the level of the noise coefficient is less than 0 dB (−13 dB in FIG. 48), the power fluctuation occurring in the pump pulse is suppressed and is barely transferred onto the white pulses so that the waveform is not degraded and may even be improved. It follows that, by controlling the pump pulse power so that the noise coefficient at a specific wavelength will be less than 0 dB, according to a relation of the noise coefficient to pump pulse power, it is possible to generate optical pulses having a lower noise level than that in the pump pulses.

The low-noise pulse sources will be explained in detail in the following.

Figure 46:
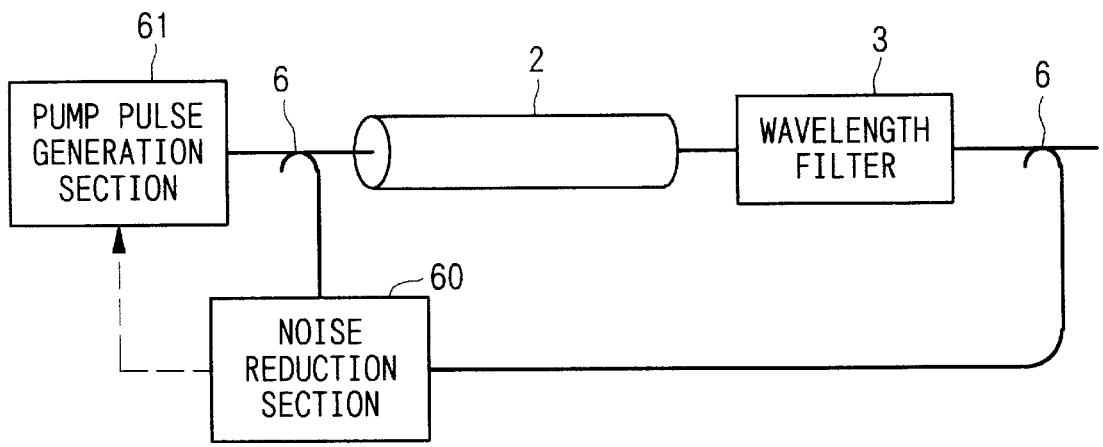
FIG. 46 is a block diagram of a basic configuration of the low-noise pulse source of the present invention.

FIG. 46 is a schematic configuration of a low-noise-output white pulse source in which pump pulses generated in a pump pulse generation section 61 are input into the optical medium 2, and white pulses generated in the optical medium 2 are filtered through a wavelength filter 3 to output an optical pulse of a specific wavelength. A noise reduction section 60 is further provided to minimize the noise components in the output pulses of the wavelength filter 3.

The noise reduction section 60 is provided with a function to control the optical power of pump pulse to be input into the optical medium 2, according to a relation of noise coefficient to pump pulse power, so as to minimize the noise coefficient to less than 0 dB. An optical branching section 6 is provided either before the input end of the optical medium 2 or after the wavelength filter 3 or at both ends, for the purpose of monitoring the optical power by the noise reduction section 60 to obtain a noise coefficient. The noise reduction section 60 controls the pump pulse generation section 61 according to the noise coefficient thus obtained, thereby reducing the noise in the output pulses from the wavelength filter 3.

Some examples of the noise reduction configurations will be explained in detail in the following.

S3E1 Embodiment 1 in Section 3

Figure 47:
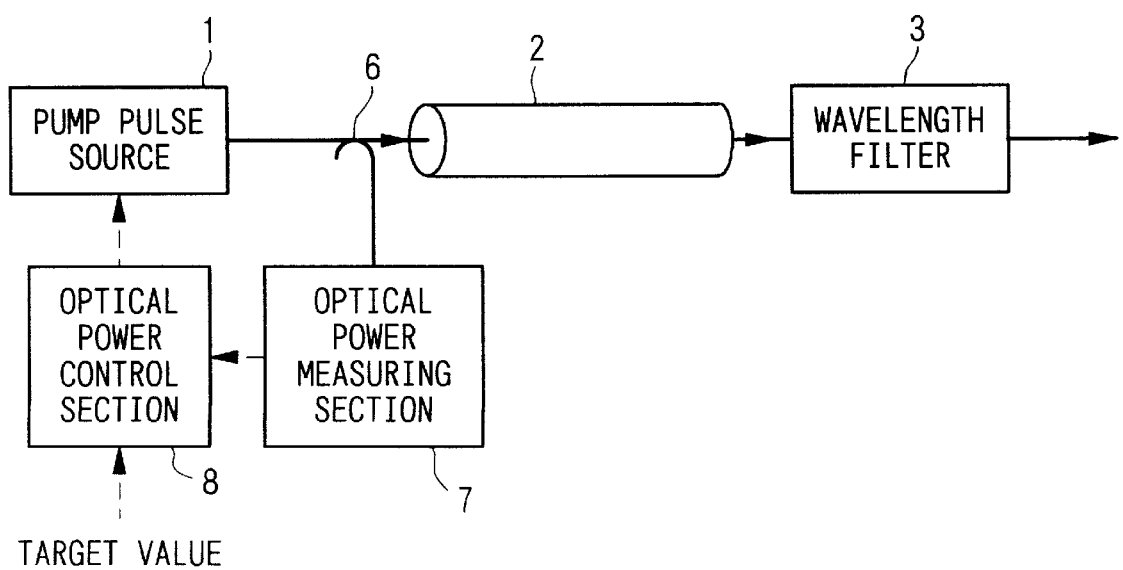
FIG. 47 is a block diagram of a configuration of the low-noise pulse source of the present invention in Embodiment 1 in Section 3.

FIG. 47 is a schematic configuration of the low-noise pulse source of Embodiment 1 in Section 3.

In this embodiment, the pump pulse generation section 61 shown in FIG. 46 is comprised by: a pump pulse source 1 which is capable of adjusting the output power; and the noise reduction section 60 shown in FIG. 46 is comprised by an optical power measuring section 7 to monitor the optical power of pump pulses through a branching section 6 before the input end of the optical medium 2, and an optical power control section 8 to control the output power from the pump pulse source 1 so as to adjust the optical power of the pump pulses input into the optical medium 2 to be at a target value. The relation of the noise coefficient to the pump pulse power is pre-determined, and the target value is selected to reduce the noise coefficient for the specific wavelength of the wavelength filter 3, at less than 0 dB according to the pre-determined relation.

For example, when this relation is as shown in FIG. 33, the pump pulse power is adjusted to be in the vicinity of 2.25 or 2.45 W to minimize the noise coefficient to less than 0 dB at a wavelength of 1505.03 nm. Similarly, for 1490.77 nm wavelength, the pump pulse power is adjusted to be in the vicinity of 2.31 or 2.49 W; and at a wavelength of 1476.92 nm, the power is adjusted to be 2.35 or 2.51 W. Optical power control section 8 adjusts the pump pulse power to be a selected target value by comparing the target value with the power level monitored by the optical power measuring section 7 and feeding-back any difference to the pump pulse source 1.

S3E1 Embodiment 2 in Section 3

In Embodiment 1, pump pulse generation section 61 was comprised by a pump pulse source whose output power is adjustable, but in Embodiment 2, pump pulse generation section 61 is comprised by a pump pulse source and an in-line optical power adjusting section which controls the pump pulse power to be input into the optical medium 2.

Figure 49A:
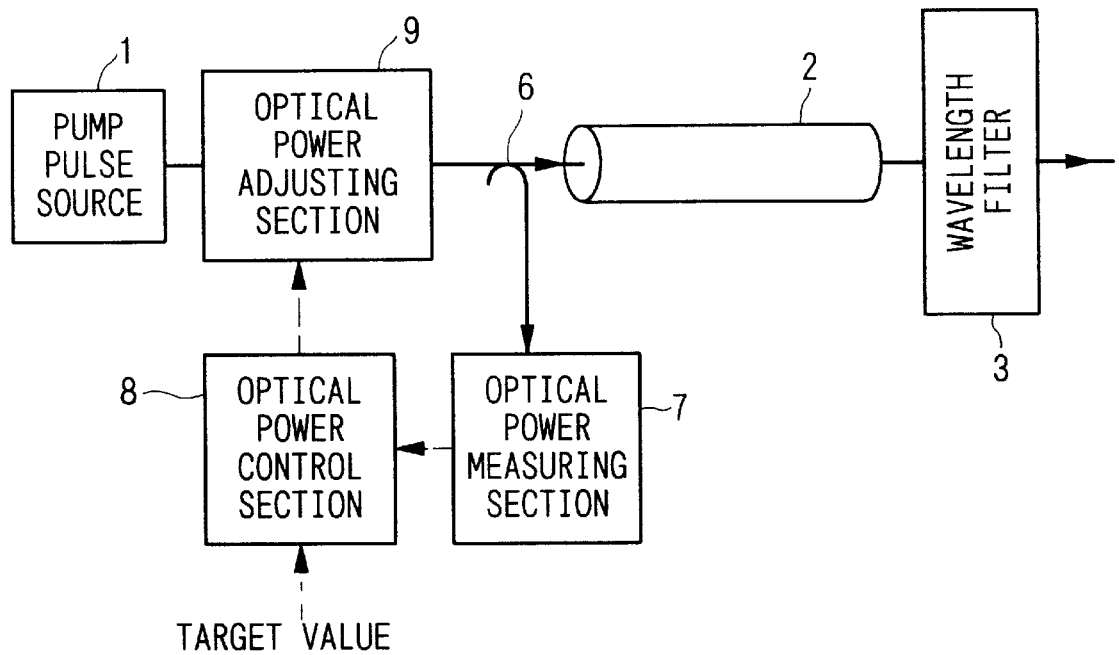
FIGS. 49A, 49B are block diagrams of the low-noise pulse source of Embodiment 2 in Section 3.
Figure 49B:
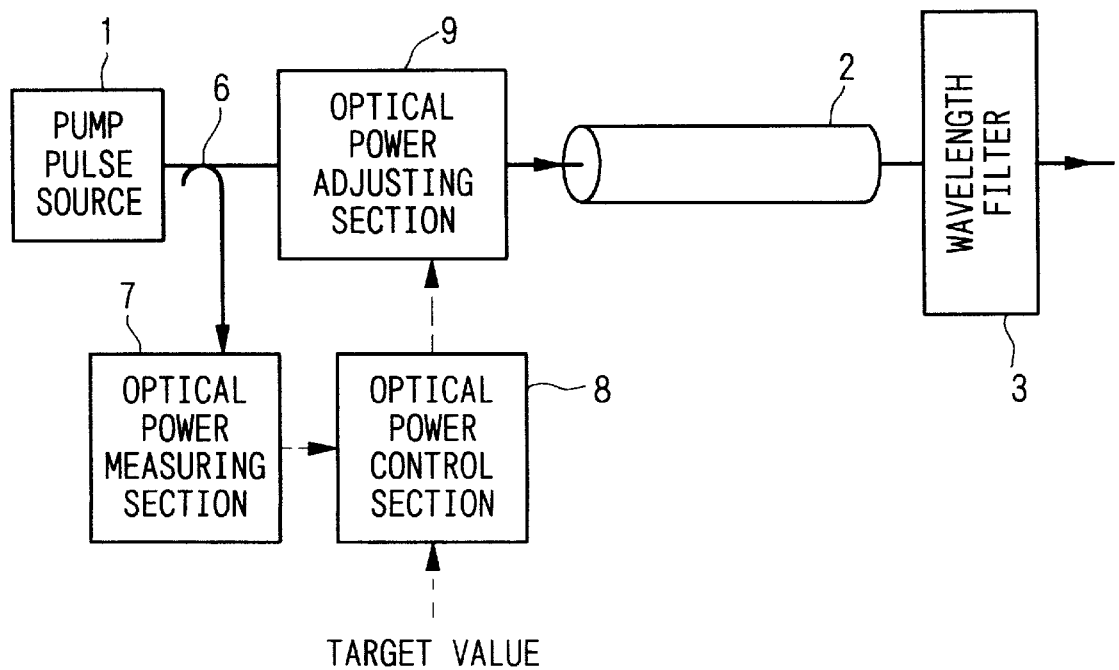

FIG. 49 is a schematic configuration of the low-noise optical pulse source of Embodiment 2 in Section 3. FIG. 49A shows a feed-back scheme and FIG. 49B shows a feed-forward scheme. The stabilization section 60 is comprised by an optical power measuring section 7 and an optical power control section 8.

Pump pulses generated in the pump pulse source 1 are input, through the optical power adjusting section 9, into the optical medium 2, and the output white pulses are filtered by a wavelength filter 3 to output optical pulses of a specific wavelength. The optical power of pump pulses is monitored by the optical power measuring section 7 through the optical branching section 6 disposed on the fore- or aft-stage of the optical power adjusting section 9. The optical power control section 8 controls the optical power adjusting section 9 to minimize the difference between the optical power of pump pulses monitored by the power measuring section 7 and a target value to adjust the pump pulse power into the optical medium 2 at the target value. The optical power control section 9 may be represented by either or both of optical amplifier and optical attenuator.

S3E3~S3E6 Embodiments 3 to 6 in Section 3

Embodiments 1 and 2 were based on an approach of pre-determining a relation of the noise coefficient to pump pulse power, and the pump pulse power was controlled so that the noise coefficient at the wavelength specified by a wavelength filter 3 is minimized to less than 0 dB. In contrast, in the following Embodiments 3~6, fluctuation components are deliberately superimposed on the pump pulses and the noise coefficient depending on pump pulse power is measured in real-time, so that the pump pulse power can be feedback-controlled according to the measured noise coefficient.

Figure 50:
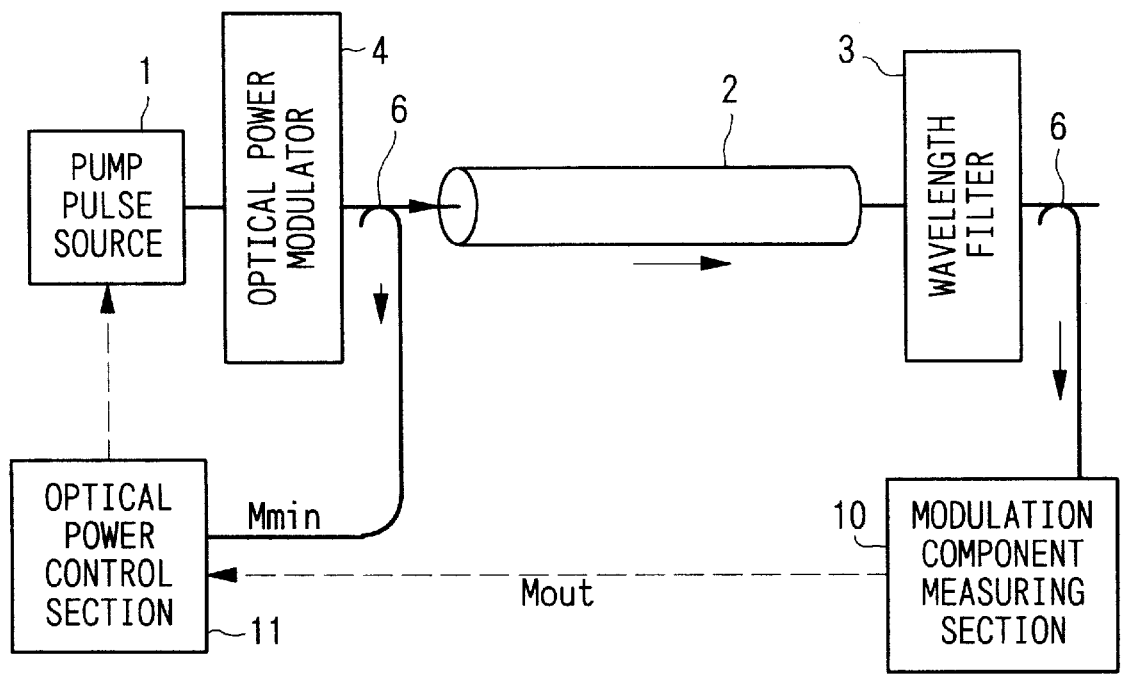
FIG. 50 is a block diagram of the low-noise pulse source of Embodiment 3 in Section 3.

FIG. 50 shows Embodiment 3 in Section 3.

In this embodiment, the pump pulse generation section 61 shown in FIG. 46 is comprised by: a pump pulse source 1 which is capable of adjusting the output power and an optical power modulator 4; and the noise reduction section 60 shown in FIG. 46 is comprised by an optical power control section 11 and a modulation component measuring section 10.

Pump pulses generated in the pump pulse source 1 are input through the optical power modulator 4 to superimpose a power fluctuation of a given level of modulation index $M_{in}$ into the optical medium 2 which generates white pulses which are filtered through a wavelength filter 3 to produce optical pulses of a specific wavelength. The modulation index $M_{out}$ contained in the output pulses from the wavelength filter 3 is measured by the modulation component measuring section 10 through an optical branching section 6 disposed after the output end of the wavelength filter 3. Optical power control section 11 figures out a noise coefficient as a ratio $M_{out/Min}$, and controls the pump pulse source 1 so as to minimize the noise coefficient related to pump pulse power.

Figure 51:
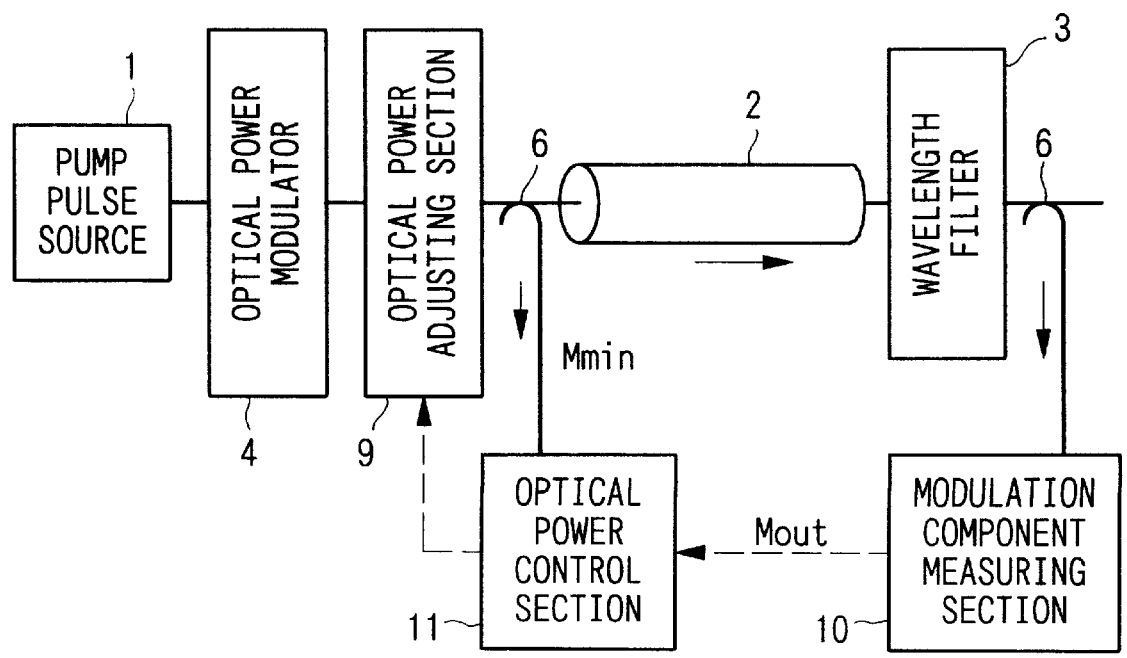
FIG. 51 is a block diagram of the low-noise pulse source of Embodiment 4 in Section 3.

FIG. 51 shows Embodiment 4 in Section 3.

In this embodiment, the pump pulse generation section 61 shown in FIG. 46 is comprised by: a pump pulse source 1, an in-line optical power adjusting section 9, and an optical power modulator 4; and the noise reduction section 60 shown in FIG. 46 is comprised by an optical power control section 11 and a modulation component measuring section 10.

Pump pulses generated in the pump pulse source 1 are input through the optical power modulator 4 to superimpose a power fluctuation of a given level of modulation index $M_{in}$ and are then input through an optical power adjusting section 9, into the optical medium 2 which generates white pulses which are filtered through a wavelength filter 3 to produce optical pulses of a specific wavelength. The modulation index $M_{out}$ contained in the output pulses from the wavelength filter 3 is measured by the modulation component measuring section 10 through an optical branching section 6 disposed after the output end of the wavelength filter 3. Optical power control section 11 figures out a noise coefficient as a ratio $M_{out}/M_{in}$, and controls the optical power adjusting section 9 so as to minimize the noise coefficient related to pump pulse power. Also, the optical power control section 9 may use either or both of optical amplifying device or optical attenuating device.

In FIG. 51, the optical power adjusting section is provided after the optical power modulation device 4, but it may be provided before the device 4.

Embodiments 5 and 6 controlled the pump pulse power according to $M_{out}$ contained in the white pulses, because for a constant value of the modulation index Min superimposed on the pump pulse, the noise coefficient is equivalent to modulation index $M_{out}$.

Figure 52:
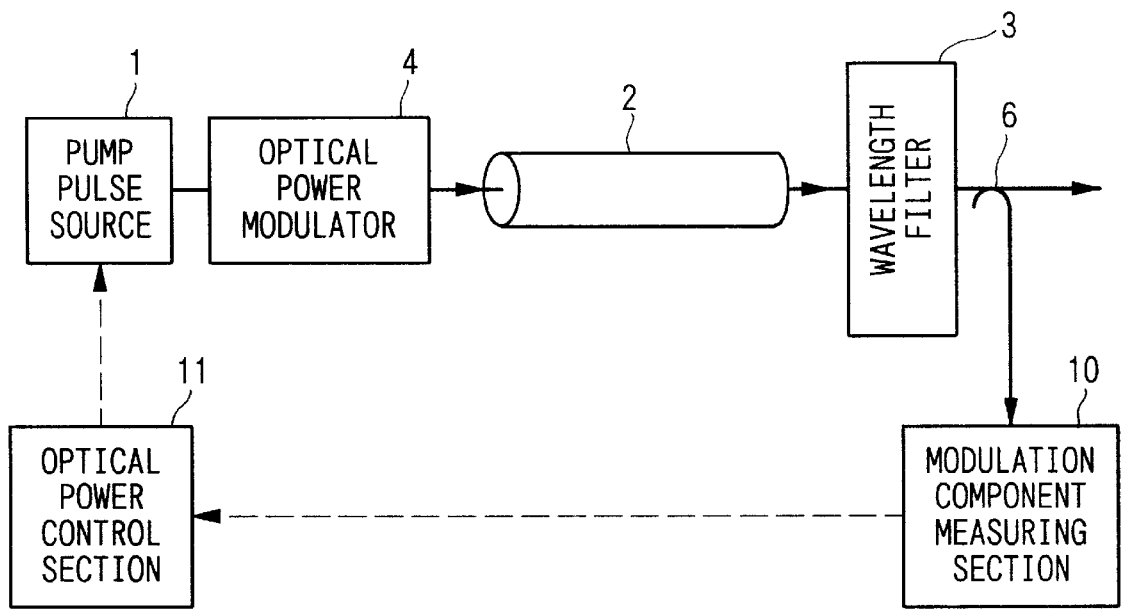
FIG. 52 is a block diagram of the low-noise pulse source of Embodiment 5 in Section 3.

FIG. 52 shows Embodiment 5 in Section 3.

In this embodiment, the pump pulse generation section 61 shown in FIG. 46 is comprised by: a pump pulse source 1 which is capable of adjusting the output power and an optical power modulator 4; and the noise reduction section 60 shown in FIG. 46 is comprised by an optical power control section 11 and a modulation component measuring section 10.

Pump pulses generated in the pump pulse source 1 are input through the optical power modulator 4 to superimpose a power fluctuation of a given level of modulation index $M_{in}$ and are then input into the optical medium 2 which generates white pulses which are filtered through a wavelength filter 3 to produce optical pulses of a specific wavelength. The modulation index $M_{out}$ contained in the output pulses from the wavelength filter 3 is measured by the modulation component measuring section 10 through an optical branching section 6 disposed after the output end of the wavelength filter 3. Optical power control section 11 controls the pump pulse source 1 so as to minimize the modulation index $M_{out}$ equivalent to noise coefficient related to pump pulse power.

Figure 53:
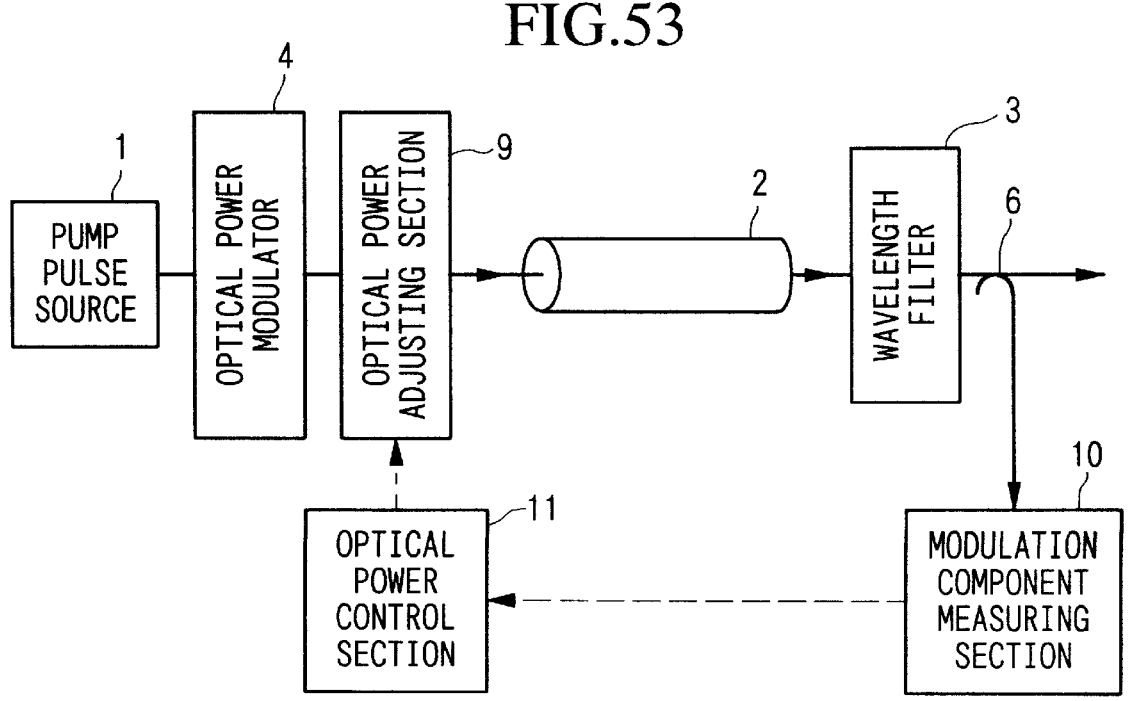
FIG. 53 is a block diagram of the low-noise pulse source of Embodiment 6 in Section 3.

FIG. 53 shows Embodiment 6 in Section 3.

In this embodiment, the pump pulse generation section 61 shown in FIG. 46 is comprised by: a pump pulse source 1, an in-line optical power adjusting section 9, and an optical power modulator 4; and the noise reduction section 60 shown in FIG. 46 is comprised by an optical power control section 11 and a modulation component measuring section 10.

Pump pulses generated in the pump pulse source 1 are input through the optical power modulator 4 to superimpose a power fluctuation of a given level of modulation index Min and are then input through an optical power adjusting section 9, into the optical medium 2 which generates white pulses which are filtered through a wavelength filter 3 to produce optical pulses of a specific wavelength. The modulation index $M_{out}$ contained in the output pulses from the wavelength filter 3 is measured by the modulation component measuring section 10 through an optical branching section 6 disposed after the output end of the wavelength filter 3. Optical power control section 11 controls the optical power adjusting section 9 so as to minimize the modulation index $M_{out}$ equivalent to noise coefficient related to pump pulse power. Also, the optical power control section 9 may use either or both of optical amplifying device or optical attenuating device.

In FIG. 53, the optical power adjusting section is provided after the optical power modulation device 4, but it may be provided before the device 4.

S3E7 and S3E8 Embodiments 7 and 8

The section presents Embodiments 7 and 8 in Section 3.

Embodiments 7, 8 are based on the direct measurement and feedback control of noise components in an optical pulse obtained by filtering white pulses with a wavelength filter 3 to reduce the noise components. The noise components originate from the pump pulse source, and are transferred from the pump pulses to the white pulses in the course of the white pulse generation.

Figure 54:
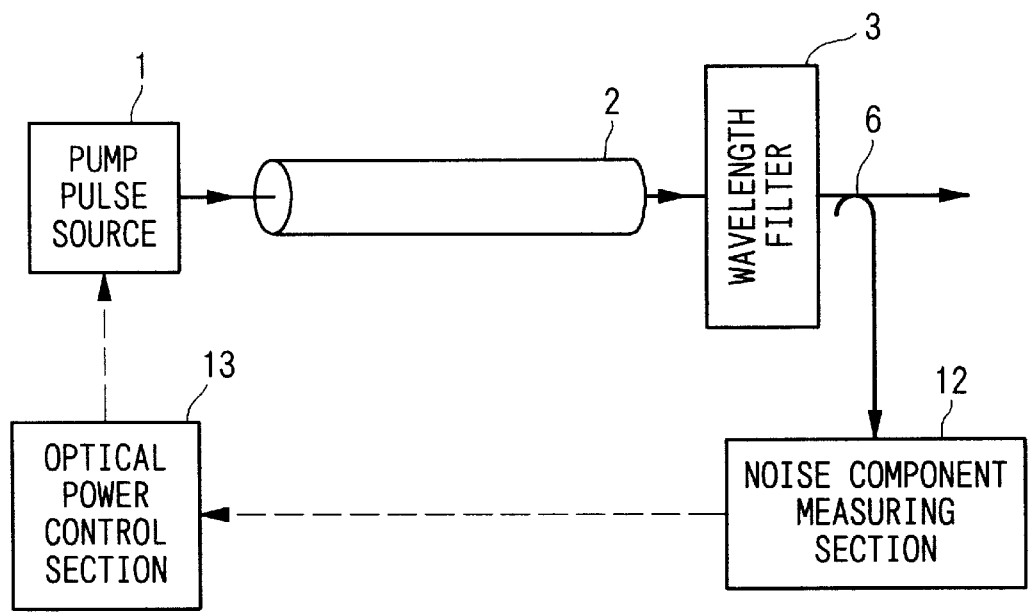
FIG. 54 is a block diagram of the low-noise pulse source of Embodiment 7 in Section 3.

FIG. 54 shows Embodiment 7 in Section 3.

In this embodiment, the pump pulse generation section 61 shown in FIG. 46 is comprised by: a pump pulse source 1 which is capable of adjusting the output power; and the noise reduction section 60 shown in FIG. 46 is comprised by an optical power control section 13 and a noise component measuring section 12.

Pump pulses generated in the pump pulse source 1 are input into the optical medium 2 to generate white pulses which are filtered through a wavelength filter 3 to produce optical pulses of a specific wavelength. The noise component contained in the output pulses from the wavelength filter 3 is measured by the noise component measuring section 12 through an optical branching section 6 disposed after the output end of the wavelength filter 3. The optical power control section 13 controls the pump pulse source 1 so as to minimize the noise components monitored by the noise component measuring section 12.

Figure 55:
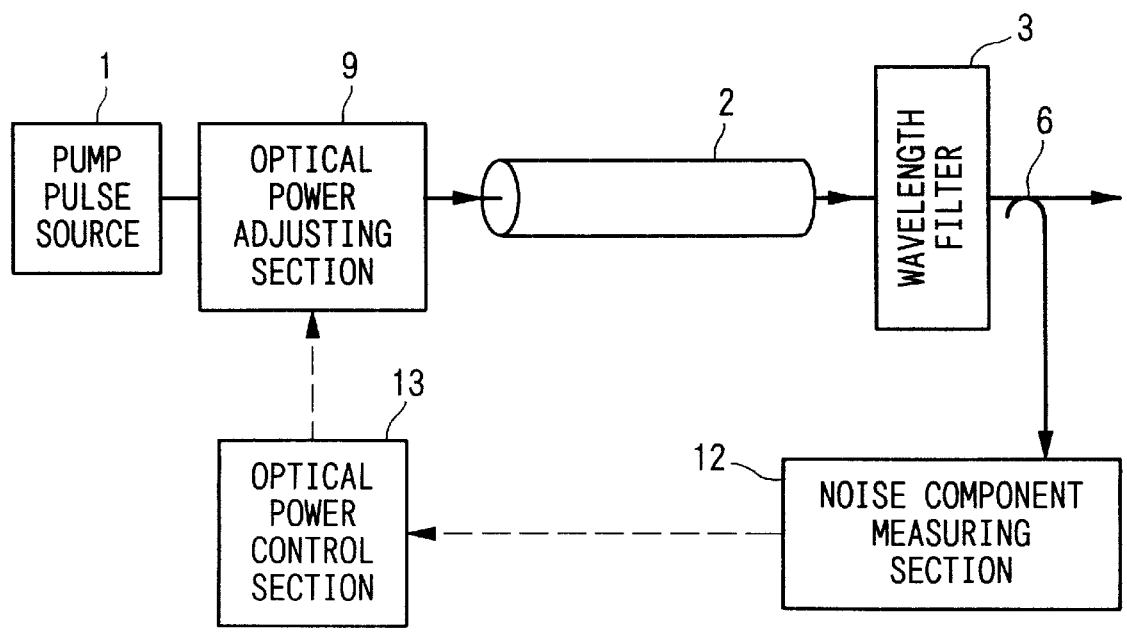
FIG. 55 is a block diagram of the low-noise pulse source of Embodiment 8 in Section 3

FIG. 55 shows Embodiment 8 in Section 3.

In this embodiment, the pump pulse generation section 61 shown in FIG. 46 is comprised by: a pump pulse source 1 and an in-line optical power adjusting section 9; and the noise reduction section 60 shown in FIG. 46 is comprised by an optical power control section 13 and a noise component measuring section 12.

Pump pulses generated in the pump pulse source 1 are input through the optical power adjusting section 9, and are input into the optical medium 2 to generate optical pulses which are filtered through a wavelength filter 3 to produce optical pulses of a specific wavelength. The noise component contained in the output pulses from the wavelength filter 3 is measured by the noise component measuring section 12 through an optical branching section 6 disposed after the output end of the wavelength filter 3. The optical power control section 13 controls the optical power adjusting section 9 so as to minimize the noise components monitored by the noise component measuring section 12. Also, either or both optical amplifier and optical attenuator may be used in the optical power control section 9.

S3E9 Embodiment 9

In each of the foregoing embodiments 2, 4, 6 and 8 in Section 3, it is also permissible to input with external pump pulses for generating white pulses.

Figure 56:
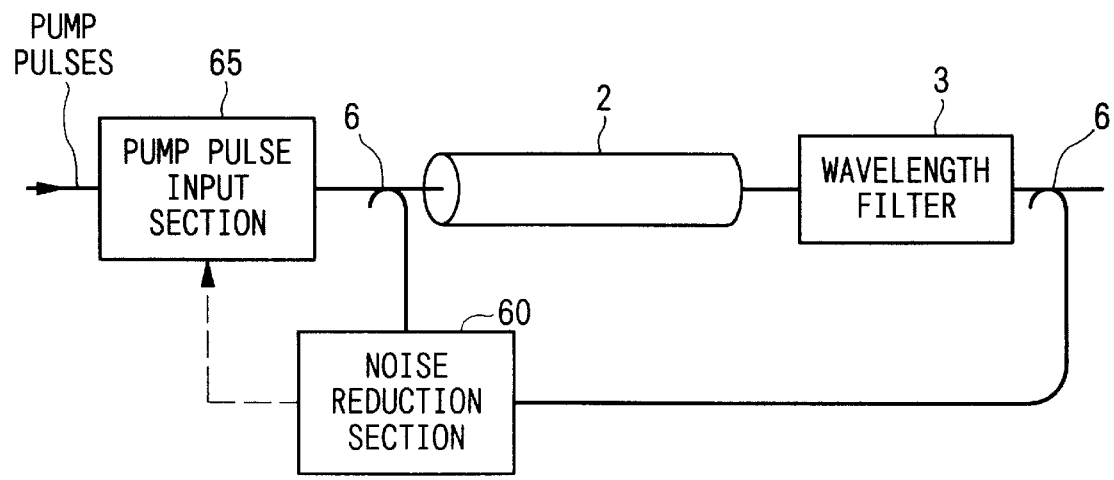
FIG. 56 is a block diagram of the stable-output white pulse source in Embodiment 9 in Section 3.

FIG. 56 shows Embodiment 9 in Section 3 which accepts external pump pulses through a pump pulse input section 65 into the optical medium 2, and a noise reduction section 60 is provided to minimize the noise level in the optical pulses output from the wavelength filter 3.

As is mentioned in those corresponding embodiments 2, 4, 6 and 8, the noise reduction section 60 is provided with a function to control the pump pulse input section 65 to adjust optical power of pump pulse to be input into the optical medium 2 to reduce the noise level in the optical pulses output from the wavelength filter 3 even lower than that of the pump pulses according to the relation of the noise coefficient to pump pulse power.

S3a Noise Components Measuring Method

The method of measuring the noise components is the same as that explained in Section 2 with reference to FIGS. 44 and 45, and it will not be repeated.

Section 3b Other Embodiments

The effects of the low-noise white pulse source described in Section 3 are very much the same as those in Section 2 and will not be repeated.

It is important to emphasize, however, that the optical medium 2 should again satisfy the same requirements as expressed previously, namely that: (1) the chromatic dispersion at the wavelength of the pump pulse decreases from positive value to less than zero in the propagation direction of the pump pulse; and (2) over the entire or partial range of propagation distance in the optical medium, the chromatic dispersion characteristic shows two zero-dispersion wavelengths, both of which approach the wavelength of the pump pulse with the propagation distance from the input end.

By using the present design of the waveguided nonlinear optical medium as explained in this section, it is possible to reduce the wavelength-dependency of the filtered optical pulse from the white pulse generated because of its equalized spectrum over a wide bandwidth.

In each of the foregoing embodiments, the filter 3 may be a single wavelength, a multiple wavelengths or a variable wavelength filter. When using a multiple-wavelength filter, the modulation component or noise component to be monitored are the maximums in each wavelength band.

As in Section 2, the waveguided nonlinear optical medium 2 in each of the foregoing embodiments may be provided with polarization-maintaining property to generate polarization-maintaining white pulses so that optical waves having a stable polarization may be propagated in the optical medium. It follows that any filtered optical pulse would also have a stable optical polarization.

As in Section 2, in each of the foregoing embodiments, it is permissible to provide an optical amplifier to amplify pump pulses before the input end of the optical medium 2. This will enable to generate white pulses even by using a pump pulse source with low power output.

Summarizing the above, the present low-noise pulse source minimizes the noise coefficient of the filtered optical pulse from the white pulses to less than 0 dB by controlling the optical power of pump pulses input into the optical medium, thereby generating optical pulses which have lower noise than that of the pump pulses.

What is claimed is:

1. A white pulse source comprised by a pump pulse source for generating pump pulses having a center wavelength $\lambda 0$ and a waveguided nonlinear optical medium having a length of an L meter, wherein said waveguided nonlinear optical medium is characterized by two properties: a first property being that chromatic dispersion $D(\lambda 0, z)$ at the center wavelength of pump pulses in ps/nm/km is positive at an input end of said waveguided nonlinear optical medium, where $z=0$, and decreases towards an output end; and a second property being that said chromatic dispersion $D(\lambda, z)$ has a maximum value $D(\lambda p(z), z)$ at a peak wavelength $\lambda p(z)$ within a range of propagation distance given by $L1 \leq z \leq L$ where $0 \leq L1 \leq L$, and that said chromatic dispersion $D(\lambda, z)$ has two zero-dispersion wavelengths, $\lambda 1(z)$ and $\lambda 2(z)$, where $D(\lambda 1(z), z) = D(\lambda 2(z), z) = 0$ ps/nm/km, within a range of propagation distance z where $D(\lambda p(z), z)$ shows a positive value.

2. A white pulse source according to claim 1, wherein said two zero-dispersion wavelengths, $\lambda 1(z)$ and $\lambda 2(z)$ move closer to each other as said maximum value $D(\lambda p(z), z)$ of chromatic dispersion decreases towards zero ps/nm/km.

3. A white pulse source according to claim 1, wherein said center wavelength $\lambda 0$ of said pump pulse and said peak wavelength $\lambda p(L0)$ where $D(\lambda p(L0), L0) = 0$ ps/nm/km may be separated by a wavelength difference $\Lambda$, according to a relation:

$\lambda p(L0) - \Lambda \leq \lambda 0 \leq \lambda p(L0) + \Lambda$.

4. A white pulse source according to claim 3, wherein said wavelength difference $\Lambda$ is not more than 50 nm.

5. A white pulse source according to claim 1, wherein chromatic dispersion $D(\lambda 0, 0)$ at $z=0$ and chromatic dispersion $D(\lambda 0, L)$ at $z=L$, at the center wavelength $\lambda 0$ of said pump pulse, are specified by a relation:

$D(\lambda 0, L) \leq D(\lambda 0, 0)/40$.

6. A white pulse source according to claim 1, wherein chromatic dispersion $D(\lambda 0, 0)$ at $z=0$ and chromatic dispersion $D(\lambda 0, L)$ at $z=L$, for the center wavelength $\lambda 0$ of said pump pulse, are specified by a relation:

$D(\lambda 0, L) \leq -D(\lambda 0, 0)/40$.

7. A white pulse source according to claim 1, wherein chromatic dispersion $D(\lambda 0, 0)$ in ps/nm/km at $z=0$ for the center wavelength $\lambda 0$ of said pump pulse and a value of full-width half-maximum $\Delta t$ in ps, of pump pulses are related according to a relation:

$0.005 \, \Delta t^2 \leq D(\lambda 0, 0) \leq 3.0 \, \Delta t^2$.

8. A white pulse source according to claim 7, wherein a peak power P0 in W of said pump pulse and a effective medium length L0 of said waveguided nonlinear optical medium where $D(\lambda p(L0), L0)$ is zero in ps/nm/km are related by an expression:

$\gamma P0 \, L0 \geq 4.6$, where $\gamma = (\omega 0 \, n_{NL})/(c0 \, A)$; c0 in m/s is the speed of light in a vacuum; $\omega 0 = (2\pi c0)/\lambda 0$ in 1/s is an angular frequency of the pump pulse; $n_{NL}$ in m$^2$/W is a nonlinear refractive index of said waveguided nonlinear optical medium; and A is a mode field area in m$^2$.

9. A white pulse source according to claim 1, wherein chromatic dispersion $D(\lambda 0, 0)$ in ps/nm/km at $z=0$ for the center wavelength $\lambda 0$ of said pump pulse and a value of full-width half-maximum $\Delta t$ in ps, of pump pulses are related according to a relation:

$0.1 \, \Delta t^2 \leq D(\lambda 0, 0) \leq 1.7 \, \Delta t^2$.

10. A white pulse source according to claim 9, wherein a peak power P0 in W of said pump pulse and a effective medium length L0 of said waveguided nonlinear optical medium where $D(\lambda p(L0), L0)$ is zero in ps/nm/km are related by an expression:

$\gamma P0 \, L0 \geq 3.4$, where $\gamma = (\omega 0 \, n_{NL})/(c0 \, A)$; c0 in m/s is the speed of light in a vacuum; $\omega = (2\pi c0)/\lambda 0$ in 1/s is an angular frequency of the pump pulse; $n_{NL}$ in m$^2$/W is a nonlinear refractive index of said waveguided nonlinear optical medium; and A is a mode field area in m$^2$.

11. A white pulse source according to claim 1, wherein a normalized effective medium length Ln and normalized chromatic dispersion Dn at $z=0$ in said waveguided nonlinear optical medium are related by:

$Ln \geq a/Dn + b + c \, Dn + d \, Dn^2$ where $a = 0.30 \times 10^{20}$, $b = 2.9$, $c = -0.17 \times 10^{-20}$ and $d = 0.40 \times 10^{-40}$ and said normalized effective medium length Ln is given by $Ln = \gamma P0 \, L0$, and the normalized chromatic dispersion at $z=0$ is given by $Dn = D(\lambda 0, 0)/(\gamma P0 \, \Delta t^2)$; P0 in W is a peak power of said pump pulse; $\Delta t$ in second is a full-width half-maximum of said pump pulse; L0 is a effective medium length of said waveguided nonlinear optical medium where $D(\lambda p(L0), L0)$ is zero in ps/nm/km.

12. A white pulse source according to claim 1, wherein said waveguided nonlinear optical medium is comprised by either a double clad, a triple clad or a quadruple clad configuration, and diameters or a refractive indices of a core or claddings are varied along said waveguided nonlinear optical medium to change chromatic dispersion characteristics in said waveguided nonlinear optical medium.

13. A white pulse source according to claim 12, wherein said waveguided nonlinear optical medium has a double cladding configuration wherein average refractive indices in a core, a first cladding and a second cladding denoted by n0, n1 and n2, respectively, are related such that n0>n2>n1.

14. A white pulse source according to claim 12, wherein said waveguided nonlinear optical medium has a triple cladding configuration wherein average refractive indices in a core, a first cladding, a second cladding and third cladding denoted by n0, n1, n2 and n3, respectively, are related such that n0>n2>n3>n1.

15. A white pulse source according to claim 12, wherein said waveguided nonlinear optical medium has a triple cladding configuration wherein average refractive indices in a core, a first cladding, a second cladding, a third cladding and a fourth cladding denoted by n0, n1, n2, n3 and n4, respectively, are related such that:

n0>n2>n4>n3>n1 or n0>n2>n4>n3=n1.

16. A white pulse source according to claim 1, wherein said waveguided nonlinear optical medium is a polarization-maintaining waveguided nonlinear optical medium.

17. A white pulse source according to claim 1, wherein said waveguided nonlinear optical medium is provided with an optical amplifying device.

18. A white pulse source according to claim 1, wherein a wavelength filter is provided at an output end of said waveguided nonlinear optical medium to eliminate or suppress a spectral peak of white pulses output from said waveguided nonlinear optical medium at a center wavelength of said pump pulse.

19. A white pulse source according to claim 1, wherein said waveguided nonlinear optical medium is a waveguided nonlinear optical medium with gain for amplifying pump pulses.

20. A white pulse source according to claim 19 provided with optical isolator(s) to prevent laser oscillation in said waveguided nonlinear optical medium.

21. A white pulse source according to claim 1, wherein waveguided nonlinear optical medium is a rare-earth-element doped nonlinear optical medium; a pump light source is provided for causing population inversion in said rare-earth-element doped nonlinear optical medium; and a pump light input section is provided for inputting pump light into said rare-earth-element doped nonlinear optical medium.

22. A white pulse source according to claim 21 provided with optical isolator(s) to prevent laser oscillation in said waveguided nonlinear optical medium.

23. A white pulse source according to claim 1, wherein said waveguided nonlinear optical medium is susceptible to Raman effect.

24. A white pulse source according to claim 23, wherein a normalized effective medium length Ln and normalized chromatic dispersion Dn at z=0 in said waveguided nonlinear optical medium are related by:

$Ln \geq a/Dn+b+c\ Dn+d\ Dn^2$ where $a=0.26\times10^{20}$, $b=2.3$, $c=-0.16\times10^{-20}$ and $d=0.21\times10^{-40}$ and said normalized effective medium length Ln is given by Ln=γP0 L0, and the normalized chromatic dispersion at z=0 is given by $Dn=D(\lambda 0, 0)/(\gamma P0\ \Delta t^2)$; P0 in W is a peak power of said pump pulse; Δt in second is a full-width half-maximum of said pump pulse; L0 is a effective medium length of said waveguided nonlinear optical medium where D(λp(L0), L0) is zero in ps/nm/km.

25. A white pulse source according to claim 23 provided with a pump light source to yield Raman gain in said waveguided nonlinear optical medium and a pump light input section for inputting pump light into said waveguided nonlinear optical medium.

26. A white pulse source according to claim 21 provided with optical isolator(s) to prevent laser oscillation in said waveguided nonlinear optical medium.

27. A white pulse source, having a pump pulse generation section for generating pump pulses and a waveguided nonlinear optical medium for generating white pulses by being injected with said pump pulses, comprising a power stabilization section which controls optical power of pump pulses to be input into said waveguided nonlinear optical medium for reducing a noise component in said white pulses according to a dependence of noise coefficients related to a white pulse generating process on optical power of pump pulses.

28. A white pulse source according to claim 27, wherein said power stabilization section controls optical power of pump pulses to be input into said waveguided nonlinear optical medium for reducing a noise coefficients in said white pulses according to a pre-determined dependence of noise coefficients related to a white pulse generating process on optical power of pump pulses.

29. A white pulse source according to claim 27, wherein said pump pulse generation section is comprised by:
   an optical modulation section for superimposing a modulation component on pump pulses to be input into said waveguided nonlinear optical medium; and said power stabilization section is comprised by:
   a modulation component measuring section for monitoring a modulation component contained in white pulses output from said waveguided nonlinear optical medium; and
   an optical power control section for obtaining a noise coefficient as a ratio of a modulation component being monitored by said modulation component measuring section to a superimposed modulation component on said pump pulses, and for controlling optical power of said pump pulses to be input into said waveguided nonlinear optical medium to reduce said noise coefficient.

30. A white pulse source according to claim 29, wherein said power stabilization section includes a wavelength filter disposed in front of said modulation component measuring section for filtering optical component in a specific wavelength band contained in optical input into said modulation component measuring section.

31. A white pulse source according to claim 27, wherein said pump pulse generation section is comprised by:
   an optical modulation section for superimposing a constant modulation component on pump pulses to be input into said waveguided nonlinear optical medium; and said power stabilization section is comprised by:
   a modulation component measuring section for monitoring a modulation component contained in white pulses output from said waveguided nonlinear optical medium; and
   an optical power control section for controlling optical power of said pump pulses for generating pump pulses to be input into said waveguided nonlinear optical medium to reduce a modulation component being monitored by said modulation component measuring section.

32. A white pulse source according to claim 31, wherein said power stabilization section includes a wavelength filter disposed in front of said modulation component measuring section for filtering optical component in a specific wavelength band contained in optical input into said modulation component measuring section.

33. A white pulse source according to claim 27, wherein said power stabilization section is comprised by:
   a noise component measuring section for monitoring a noise component contained in white pulses output from said waveguided nonlinear optical medium; and an optical power control section for controlling pump pulse power to reduce a noise component being measured by said noise component measuring section.

34. A white pulse source according to claim 33, wherein said power stabilization section includes a wavelength filter disposed in front of said modulation component measuring section for filtering optical component in a specific wavelength band contained in optical input into said modulation component measuring section.

35. A white pulse source according to claim 33, wherein said pump pulse source is comprised by a harmonically mode-locked pulse laser having a repetition frequency component Nf where f is a fundamental mode frequency and N is an integer not less than 2; and said noise component measuring section monitors said frequency components at Mf where M is an integer different from a multiple integer of N.

36. A white pulse source according to claim 33, wherein said noise component measuring section monitors low frequency noise components contained in pump pulses.

37. A white pulse source according to claim 36, wherein said pump pulse source is comprised by a mode-locked pulse laser and said noise component measuring section monitors a relaxation oscillation component contained in optical output of a mode-locked pulse laser as a noise component.

38. A white pulse source according to claim 27, wherein a noise coefficient related to a white pulse generating process is given by a ratio of an power fluctuation component contained in white pulses output from said waveguided nonlinear optical medium, to an power fluctuation component contained in pump pulses to be input into said waveguided nonlinear optical medium.

39. A white pulse source according to claim 27, wherein said pump pulse generation section includes a pump pulse source whose optical output power is adjustable.

40. A white pulse source according to claim 27, wherein said pump pulse generation section includes an optical power adjusting section for adjusting an output power of pump pulses output from said pump pulse generation section.

41. A white pulse source according to claim 27, wherein said waveguided nonlinear optical medium is comprised by a waveguided nonlinear optical medium claimed in claim 1.

42. A white pulse source according to claim 27, wherein said waveguided nonlinear optical medium is a polarization-maintaining waveguided optical medium.

43. A white pulse source according to claim 27 provided with an optical amplifying device to amplify pump pulses to be input into said waveguided nonlinear optical medium.

44. A white pulse source according to claim 27 provided with a wavelength filter to eliminate or suppress a spectral peak of white pulses output from said waveguided nonlinear optical medium at a center wavelength of said pump pulse.

45. A white pulse source according to claim 27, wherein said pump pulse generation section is comprised by:
an pump pulse input section for accepting external pump pulses.

46. An optical pulse source, having a pump pulse generation section for generating pump pulses and a waveguided nonlinear optical medium for generating white pulses by being injected with said pump pulses, and a wavelength filter for filtering said white pulses to produce optical pulses having specific wavelength component(s), comprising a noise reduction section which controls optical power of pump pulses to be input into said waveguided nonlinear optical medium for reducing a noise component in said specific wavelength component(s) according to a dependence of noise coefficients related to a white pulse generating process on optical power of pump pulses.

47. An optical pulse source according to claim 46, wherein said noise reduction section controls optical power of pump pulses to be input into said waveguided nonlinear optical medium for minimizing a noise coefficient to not more than 0 dB, according to a pre-determined dependence of noise coefficients related to a white pulse generating process on optical power of pump pulses.

48. An optical pulse source according to claim 46, wherein said pump pulse generation section is comprised by:
an optical modulation section for superimposing a modulation component on pump pulses to be input into said waveguided nonlinear optical medium; and
said noise reduction section is comprised by:
a modulation component measuring section for monitoring a modulation component contained in said optical pulses output from said wavelength filter; and
an optical power control section for obtaining a noise coefficient as a ratio of a modulation component being monitored by said modulation component measuring section to a superimposed modulation component on said pump pulses, and for controlling optical power of said pump pulses to be input into said waveguided nonlinear optical medium so as to minimize said noise coefficient to not more than 0 dB.

49. An optical pulse source according to claim 46, wherein said pump pulse generation section is comprised by:
an optical modulation section for superimposing a modulation component on pump pulses to be input into said waveguided nonlinear optical medium; and said noise reduction section is comprised by:
a modulation component measuring section for monitoring a modulation component contained in optical pulses filtered in said wavelength filer; and
an optical power control section for controlling optical power of said pump pulses to be input into said waveguided nonlinear optical medium so as to minimize said modulation component contained in optical pulses filtered in said wavelength filer being monitored by said modulation component measuring section.

50. An optical pulse source according to claim 46, wherein said noise reduction section is comprised by:
a noise component measuring section for monitoring a noise component contained in optical pulses filtered by said wavelength filter; and
an optical power control section for controlling pump pulse power so as to minimize said noise component contained in optical pulses filtered in said wavelength filer being measured by said noise component measuring section.

51. A white pulse source according to claim 50, wherein said pump pulse source is comprised by a harmonically mode-locked pulse laser having a repetition frequency component Nf where f is a fundamental mode frequency and N is an integer not less than 2; and said noise component measuring section monitors said frequency components at Mf where M is an integer different from a multiple integer of N.

52. A white pulse source according to claim 50, wherein said noise component measuring section monitors low frequency noise components contained in pump pulses.

53. A white pulse source according to claim 52, wherein said pump pulse source is comprised by a mode-locked pulse laser and said noise component measuring section monitors a relaxation oscillation component contained in optical output of a mode-locked pulse laser as a noise component.

54. An optical pulse source according to claim 46, wherein said wavelength filter for filtering white pulses is a single wavelength filter, a multiple band filter or a wavelength-tunable filter.

55. An optical pulse source according to claim 46, wherein a noise coefficient related to a white pulse generating process is given by a ratio of an power fluctuation component contained in white pulses output from said waveguided nonlinear optical medium, to an power fluctuation component contained in pump pulses to be input into said waveguided nonlinear optical medium.

56. A white pulse source according to claim 46, wherein said pump pulse generation section includes a pump pulse source whose optical output power is adjustable.

57. A white pulse source according to claim 46, wherein said pump pulse generation section includes an optical power adjusting section for adjusting an output power of pump pulses output from said pump pulse generation section.

58. A white pulse source according to claim 46, wherein said waveguided nonlinear optical medium is comprised by a waveguided nonlinear optical medium claimed in claim 1.

59. A white pulse source according to claim 46, wherein said waveguided nonlinear optical medium is a polarization-maintaining waveguided optical medium.

60. A white pulse source according to claim 46 provided with an optical amplifying device to amplify pump pulses to be input into said waveguided nonlinear optical medium.

61. A white pulse source according to claim 46, wherein said pump pulse generation section is comprised by:

an pump pulse input section for accepting external pump pulses.

* * * * *